(12) United States Patent
Bridges

(10) Patent No.: US 9,395,174 B2
(45) Date of Patent: Jul. 19, 2016

(54) DETERMINING RETROREFLECTOR ORIENTATION BY OPTIMIZING SPATIAL FIT

(71) Applicant: FARO Technologies, Inc., Lake Mary, FL (US)

(72) Inventor: Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 14/750,149

(22) Filed: Jun. 25, 2015

(65) Prior Publication Data

US 2015/0377605 A1     Dec. 31, 2015

Related U.S. Application Data

(60) Provisional application No. 62/017,996, filed on Jun. 27, 2014, provisional application No. 62/018,774, filed on Jun. 30, 2014.

(51) Int. Cl.
| | |
|---|---|
| *G06T 7/00* | (2006.01) |
| *G01B 11/00* | (2006.01) |
| *G01B 11/26* | (2006.01) |
| *G01S 17/42* | (2006.01) |
| *G06T 5/10* | (2006.01) |
| *G01C 15/00* | (2006.01) |
| *G01C 15/06* | (2006.01) |

(Continued)

(52) U.S. Cl.
CPC .............. *G01B 11/002* (2013.01); *G01B 11/26* (2013.01); *G01C 15/002* (2013.01); *G01C 15/06* (2013.01); *G01S 5/163* (2013.01); *G01S 7/481* (2013.01); *G01S 17/42* (2013.01); *G01S 17/66* (2013.01); *G02B 5/122* (2013.01); *G06T 5/10* (2013.01); *G06T 7/0042* (2013.01); *G06T 2207/10004* (2013.01)

(58) Field of Classification Search
None
See application file for complete search history.

(56) References Cited

U.S. PATENT DOCUMENTS

| | | | |
|---|---|---|---|
| 2,612,994 | A | 10/1952 | Woodland |
| 2,682,804 | A | 7/1954 | Clifford et al. |

(Continued)

FOREIGN PATENT DOCUMENTS

| | | |
|---|---|---|
| CA | 2811444 A1 | 3/2012 |
| CN | 1263807 A | 8/2000 |

(Continued)

OTHER PUBLICATIONS

International Search Report and Written Opinion for Application No. PCT/US2015/037876 dated Oct. 1, 2015; 12 pages.

(Continued)

*Primary Examiner* — Siamak Harandi
*Assistant Examiner* — Mai Tran
(74) *Attorney, Agent, or Firm* — Cantor Colburn LLP

(57) ABSTRACT

A program storage device having instructions that cause a programmable control device to obtain a two-dimensional (2D) image of markings on a retroreflector, determine a 2D mathematical representation of the markings on the retroreflector, extract a first collection of 2D coordinates from the 2D mathematical representation and a corresponding second collection of 2D coordinates from the 2D image of markings, determine a figure of merit, and adjust guess values for three orientation angles of the retroreflector to improve the figure of merit.

14 Claims, 56 Drawing Sheets

(51) Int. Cl.
  *G01S 17/66* (2006.01)
  *G01S 5/16* (2006.01)
  *G01S 7/481* (2006.01)
  *G02B 5/122* (2006.01)

(56) References Cited

U.S. PATENT DOCUMENTS

| | | |
|---|---|---|
| 2,484,641 A | 3/1957 | Keuffel et al. |
| 2,784,641 A | 3/1957 | Keuffel et al. |
| 3,339,457 A | 9/1967 | Pun |
| 3,365,717 A | 1/1968 | Holscher |
| 3,464,770 A | 9/1969 | Schmidt |
| 3,497,695 A | 2/1970 | Smith et al. |
| 3,508,828 A | 4/1970 | Froome et al. |
| 3,619,058 A | 11/1971 | Hewlett et al. |
| 3,627,429 A | 12/1971 | Jaenicke et al. |
| 3,658,426 A | 4/1972 | Vyce |
| 3,728,025 A | 4/1973 | Madigan et al. |
| 3,740,141 A | 6/1973 | DeWitt, Jr. |
| 3,779,645 A | 12/1973 | Nakazawa et al. |
| 3,813,165 A | 5/1974 | Hines et al. |
| 3,832,056 A | 8/1974 | Shipp et al. |
| 3,900,260 A | 8/1975 | Wendt |
| 3,914,052 A | 10/1975 | Wiklund |
| 4,113,381 A | 9/1978 | Epstein |
| 4,178,515 A | 12/1979 | Tarasevich |
| 4,297,030 A | 10/1981 | Chaborski |
| 4,403,857 A | 9/1983 | Holscher |
| 4,413,907 A | 11/1983 | Lane |
| 4,453,825 A | 6/1984 | Buck et al. |
| 4,498,764 A | 2/1985 | Bolkow et al. |
| 4,521,107 A | 6/1985 | Chaborski et al. |
| 4,531,833 A | 7/1985 | Ohtomo |
| 4,537,475 A | 8/1985 | Summers et al. |
| 4,560,270 A | 12/1985 | Wiklund et al. |
| 4,632,547 A | 12/1986 | Kaplan et al. |
| 4,652,130 A | 3/1987 | Tank |
| 4,689,489 A | 8/1987 | Cole |
| 4,692,023 A | 9/1987 | Ohtomo et al. |
| 4,699,508 A | 10/1987 | Bolkow et al. |
| 4,707,129 A | 11/1987 | Hashimoto et al. |
| 4,714,339 A | 12/1987 | Lau et al. |
| 4,731,812 A | 3/1988 | Akerberg |
| 4,731,879 A | 3/1988 | Sepp et al. |
| 4,767,257 A | 8/1988 | Kato |
| 4,777,660 A | 10/1988 | Gould et al. |
| 4,790,651 A | 12/1988 | Brown et al. |
| 4,839,507 A | 6/1989 | May |
| 4,983,021 A | 1/1991 | Fergason |
| 5,002,388 A | 3/1991 | Ohishi et al. |
| 5,051,934 A | 9/1991 | Wiklund |
| 5,069,524 A | 12/1991 | Watanabe et al. |
| 5,082,364 A | 1/1992 | Russell |
| 5,090,131 A | 2/1992 | Deer |
| 5,121,242 A | 6/1992 | Kennedy |
| 5,137,354 A | 8/1992 | DeVos et al. |
| 5,138,154 A | 8/1992 | Hotelling |
| 5,162,862 A | 11/1992 | Bartram et al. |
| 5,198,868 A | 3/1993 | Saito et al. |
| 5,237,384 A | 8/1993 | Fukunaga et al. |
| 5,263,103 A | 11/1993 | Kosinski |
| 5,267,014 A | 11/1993 | Prenninger |
| 5,301,005 A | 4/1994 | DeVos et al. |
| 5,313,409 A | 5/1994 | Wiklund et al. |
| 5,319,434 A | 6/1994 | Croteau et al. |
| 5,347,306 A | 9/1994 | Nitta |
| 5,392,521 A | 2/1995 | Allen |
| 5,400,130 A | 3/1995 | Tsujimoto et al. |
| 5,402,193 A | 3/1995 | Choate |
| 5,416,321 A | 5/1995 | Sebastian et al. |
| 5,440,112 A | 8/1995 | Sakimura et al. |
| 5,440,326 A | 8/1995 | Quinn |
| 5,448,505 A | 9/1995 | Novak |
| 5,455,670 A | 10/1995 | Payne et al. |
| 5,500,737 A | 3/1996 | Donaldson et al. |
| 5,532,816 A | 7/1996 | Spann et al. |
| 5,534,992 A | 7/1996 | Takeshima et al. |
| 5,594,169 A | 1/1997 | Field et al. |
| D378,751 S | 4/1997 | Smith |
| 5,671,160 A | 9/1997 | Julian |
| 5,698,784 A | 12/1997 | Hotelling et al. |
| 5,724,264 A | 3/1998 | Rosenberg et al. |
| 5,737,068 A | 4/1998 | Kaneko et al. |
| 5,742,379 A | 4/1998 | Reifer |
| 5,754,284 A | 5/1998 | Leblanc et al. |
| RE35,816 E | 6/1998 | Schulz |
| 5,764,360 A | 6/1998 | Meier |
| 5,767,952 A | 6/1998 | Ohtomo et al. |
| 5,771,623 A | 6/1998 | Pernstich et al. |
| 5,817,243 A | 10/1998 | Shaffer |
| 5,825,350 A | 10/1998 | Case, Jr. et al. |
| 5,828,057 A | 10/1998 | Hertzman et al. |
| 5,861,956 A | 1/1999 | Bridges et al. |
| 5,880,822 A | 3/1999 | Kubo |
| 5,886,775 A | 3/1999 | Houser et al. |
| 5,886,777 A | 3/1999 | Hirunuma |
| 5,892,575 A | 4/1999 | Marino |
| 5,893,214 A | 4/1999 | Meier et al. |
| 5,898,421 A | 4/1999 | Quinn |
| 5,926,388 A | 7/1999 | Kimbrough et al. |
| 5,930,030 A | 7/1999 | Scifres |
| 5,957,559 A | 9/1999 | Rueb et al. |
| 5,973,788 A | 10/1999 | Pettersen et al. |
| 5,991,011 A | 11/1999 | Damm |
| 6,017,125 A | 1/2000 | Vann |
| 6,023,326 A | 2/2000 | Katayama et al. |
| 6,034,722 A | 3/2000 | Viney et al. |
| 6,036,319 A | 3/2000 | Rueb et al. |
| 6,052,190 A | 4/2000 | Sekowski et al. |
| D427,087 S | 6/2000 | Kaneko et al. |
| 6,085,155 A | 7/2000 | Hayase et al. |
| 6,097,491 A | 8/2000 | Hartrumpf |
| 6,097,897 A | 8/2000 | Ide |
| 6,100,540 A | 8/2000 | Ducharme et al. |
| 6,111,563 A | 8/2000 | Hines |
| 6,122,058 A | 9/2000 | Van Der Werf et al. |
| 6,133,998 A | 10/2000 | Monz et al. |
| 6,166,809 A | 12/2000 | Pettersen et al. |
| 6,171,018 B1 | 1/2001 | Ohtomo et al. |
| 6,193,371 B1 | 2/2001 | Snook |
| 6,222,465 B1 | 4/2001 | Kumar et al. |
| 6,262,801 B1 | 7/2001 | Shibuya et al. |
| 6,295,174 B1 | 9/2001 | Ishinabe et al. |
| 6,317,954 B1 | 11/2001 | Cunningham et al. |
| 6,324,024 B1 | 11/2001 | Shirai et al. |
| 6,330,379 B1 | 12/2001 | Hendriksen |
| 6,344,846 B1 | 2/2002 | Hines |
| 6,347,290 B1 | 2/2002 | Bartlett |
| 6,351,483 B1 | 2/2002 | Chen |
| 6,353,764 B1 | 3/2002 | Imagawa et al. |
| 6,369,794 B1 | 4/2002 | Sakurai et al. |
| 6,369,880 B1 | 4/2002 | Steinlechner |
| 6,433,866 B1 | 8/2002 | Nichols |
| 6,437,859 B1 | 8/2002 | Ohtomo et al. |
| 6,445,446 B1 | 9/2002 | Kumagai et al. |
| 6,462,810 B1 | 10/2002 | Muraoka et al. |
| 6,463,393 B1 | 10/2002 | Giger |
| 6,490,027 B1 | 12/2002 | Rajchel et al. |
| 6,501,543 B2 | 12/2002 | Hedges et al. |
| 6,532,060 B1 | 3/2003 | Kindaichi et al. |
| 6,559,931 B2 | 5/2003 | Kawamura et al. |
| 6,563,569 B2 | 5/2003 | Osawa et al. |
| 6,567,101 B1 | 5/2003 | Thomas |
| 6,573,883 B1 | 6/2003 | Bartlett |
| 6,573,981 B2 | 6/2003 | Kumagai et al. |
| 6,583,862 B1 | 6/2003 | Perger |
| 6,587,244 B1 | 7/2003 | Ishinabe et al. |
| 6,611,617 B1 | 8/2003 | Crampton |
| 6,624,916 B1 | 9/2003 | Green et al. |
| 6,630,993 B1 | 10/2003 | Hedges et al. |
| 6,633,367 B2 | 10/2003 | Gogolla |
| 6,646,732 B2 | 11/2003 | Ohtomo et al. |
| 6,650,222 B2 | 11/2003 | Darr |
| 6,667,798 B1 | 12/2003 | Markendorf et al. |

(56) References Cited

U.S. PATENT DOCUMENTS

| | | |
|---|---|---|
| 6,668,466 B1 | 12/2003 | Bieg et al. |
| 6,678,059 B2 | 1/2004 | Cho et al. |
| 6,681,031 B2 | 1/2004 | Cohen et al. |
| 6,727,984 B2 | 4/2004 | Becht |
| 6,727,985 B2 | 4/2004 | Giger |
| 6,754,370 B1 | 6/2004 | Hall-Holt et al. |
| 6,765,653 B2 | 7/2004 | Shirai et al. |
| 6,802,133 B2 | 10/2004 | Jordil et al. |
| 6,847,436 B2 | 1/2005 | Bridges |
| 6,859,744 B2 | 2/2005 | Giger |
| 6,864,966 B2 | 3/2005 | Giger |
| 6,935,036 B2 | 8/2005 | Raab |
| 6,957,493 B2 | 10/2005 | Kumagai et al. |
| 6,964,113 B2 | 11/2005 | Bridges et al. |
| 6,965,843 B2 | 11/2005 | Raab et al. |
| 6,980,881 B2 | 12/2005 | Greenwood et al. |
| 6,996,912 B2 | 2/2006 | Raab |
| 6,996,914 B1 | 2/2006 | Istre et al. |
| 7,022,971 B2 | 4/2006 | Ura et al. |
| 7,023,531 B2 | 4/2006 | Gogolla et al. |
| 7,055,253 B2 | 6/2006 | Kaneko |
| 7,072,032 B2 | 7/2006 | Kumagai et al. |
| 7,086,169 B1 | 8/2006 | Bayham et al. |
| 7,095,490 B2 | 8/2006 | Ohtomo et al. |
| 7,099,000 B2 | 8/2006 | Connolly |
| 7,129,927 B2 | 10/2006 | Mattsson |
| 7,130,035 B2 | 10/2006 | Ohtomo et al. |
| 7,168,174 B2 | 1/2007 | Piekutowski |
| 7,177,014 B2 | 2/2007 | Mori et al. |
| 7,193,695 B2 | 3/2007 | Sugiura |
| 7,196,776 B2 | 3/2007 | Ohtomo et al. |
| 7,222,021 B2 | 5/2007 | Ootomo et al. |
| 7,224,444 B2 | 5/2007 | Stierle et al. |
| 7,230,689 B2 | 6/2007 | Lau |
| 7,233,316 B2 | 6/2007 | Smith et al. |
| 7,246,030 B2 | 7/2007 | Raab et al. |
| 7,248,374 B2 | 7/2007 | Bridges |
| 7,253,891 B2 | 8/2007 | Toker et al. |
| 7,256,899 B1 | 8/2007 | Faul et al. |
| 7,262,863 B2 | 8/2007 | Schmidt et al. |
| 7,274,802 B2 | 9/2007 | Kumagai et al. |
| 7,285,793 B2 | 10/2007 | Husted |
| 7,286,246 B2 | 10/2007 | Yoshida |
| 7,304,729 B2 | 12/2007 | Yasutomi et al. |
| 7,307,710 B2 | 12/2007 | Gatsios et al. |
| 7,312,862 B2 | 12/2007 | Zumbrunn et al. |
| 7,321,420 B2 | 1/2008 | Yasutomi et al. |
| 7,325,326 B1 | 2/2008 | Istre et al. |
| 7,327,446 B2 | 2/2008 | Cramer et al. |
| 7,336,346 B2 | 2/2008 | Aoki et al. |
| 7,336,375 B1 | 2/2008 | Faul et al. |
| 7,339,655 B2 | 3/2008 | Nakamura et al. |
| 7,345,748 B2 | 3/2008 | Sugiura et al. |
| 7,352,446 B2 | 4/2008 | Bridges et al. |
| 7,372,558 B2 | 5/2008 | Kaufman et al. |
| 7,388,654 B2 | 6/2008 | Raab et al. |
| 7,388,658 B2 | 6/2008 | Glimm |
| 7,401,783 B2 | 7/2008 | Pryor |
| 7,423,742 B2 | 9/2008 | Gatsios et al. |
| 7,429,112 B2 | 9/2008 | Metcalfe |
| 7,446,863 B2 | 11/2008 | Nishita et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,503,123 B2 | 3/2009 | Matsuo et al. |
| 7,511,824 B2 | 3/2009 | Sebastian et al. |
| 7,518,709 B2 | 4/2009 | Oishi et al. |
| 7,535,555 B2 | 5/2009 | Nishizawa et al. |
| 7,541,965 B2 | 6/2009 | Ouchi et al. |
| 7,552,539 B2 | 6/2009 | Piekutowski |
| 7,555,766 B2 | 6/2009 | Kondo et al. |
| 7,562,459 B2 | 7/2009 | Fourquin et al. |
| 7,564,538 B2 | 7/2009 | Sakimura et al. |
| 7,565,216 B2 | 7/2009 | Soucy |
| 7,583,375 B2 | 9/2009 | Cramer et al. |
| 7,586,586 B2 | 9/2009 | Constantikes |
| 7,613,501 B2 | 11/2009 | Scherch |
| 7,614,019 B2 | 11/2009 | Rimas-Ribikauskas et al. |
| D605,959 S | 12/2009 | Apotheloz |
| 7,634,374 B2 | 12/2009 | Chouinard et al. |
| 7,634,381 B2 | 12/2009 | Westermark et al. |
| 7,692,628 B2 | 4/2010 | Smith et al. |
| 7,701,559 B2 | 4/2010 | Bridges et al. |
| 7,701,566 B2 | 4/2010 | Kumagai et al. |
| 7,705,830 B2 | 4/2010 | Westerman et al. |
| 7,710,396 B2 | 5/2010 | Smith et al. |
| 7,724,380 B2 | 5/2010 | Horita et al. |
| 7,728,963 B2 | 6/2010 | Kirschner |
| 7,738,083 B2 | 6/2010 | Luo et al. |
| 7,751,654 B2 | 7/2010 | Lipson et al. |
| 7,761,814 B2 | 7/2010 | Rimas-Ribikauskas et al. |
| 7,765,084 B2 | 7/2010 | Westermark et al. |
| 7,782,298 B2 | 8/2010 | Smith et al. |
| 7,800,758 B1 | 9/2010 | Bridges et al. |
| 7,804,051 B2 | 9/2010 | Hingerling et al. |
| 7,804,602 B2 | 9/2010 | Raab |
| 7,812,736 B2 | 10/2010 | Collingwood et al. |
| 7,812,969 B2 | 10/2010 | Morimoto et al. |
| D629,314 S | 12/2010 | Ogasawara |
| 7,876,457 B2 | 1/2011 | Rueb |
| 7,894,079 B1 | 2/2011 | Altendorf et al. |
| 7,903,237 B1 | 3/2011 | Li |
| 7,929,150 B1 | 4/2011 | Schweiger |
| 7,954,250 B2 | 6/2011 | Crampton |
| 7,976,387 B2 | 7/2011 | Venkatesh et al. |
| 7,983,872 B2 | 7/2011 | Makino et al. |
| 7,990,523 B2 | 8/2011 | Schlierbach et al. |
| 7,990,550 B2 | 8/2011 | Aebischer et al. |
| 8,087,315 B2 | 1/2012 | Goossen et al. |
| 8,094,121 B2 | 1/2012 | Obermeyer et al. |
| 8,094,212 B2 | 1/2012 | Jelinek |
| 8,125,629 B2 | 2/2012 | Dold et al. |
| 8,151,477 B2 | 4/2012 | Tait |
| 8,190,030 B2 | 5/2012 | Leclair et al. |
| 8,217,893 B2 | 7/2012 | Quinn et al. |
| 8,237,934 B1 | 8/2012 | Cooke et al. |
| 8,244,023 B2 | 8/2012 | Yamada |
| 8,279,430 B2 | 10/2012 | Dold et al. |
| 8,314,939 B2 | 11/2012 | Kato |
| 8,320,708 B2 | 11/2012 | Kurzweil et al. |
| 8,360,240 B2 | 1/2013 | Kallabis |
| 8,387,961 B2 | 3/2013 | Im |
| 8,405,604 B2 | 3/2013 | Pryor et al. |
| 8,422,034 B2 | 4/2013 | Steffensen et al. |
| 8,437,011 B2 | 5/2013 | Steffensen et al. |
| 8,438,747 B2 | 5/2013 | Ferrari |
| 8,467,071 B2 | 6/2013 | Steffey et al. |
| 8,467,072 B2 | 6/2013 | Cramer et al. |
| 8,483,512 B2 | 7/2013 | Moeller |
| 8,509,949 B2 | 8/2013 | Bordyn et al. |
| 8,525,983 B2 | 9/2013 | Bridges et al. |
| 8,537,371 B2 | 9/2013 | Steffensen et al. |
| 8,537,375 B2 | 9/2013 | Steffensen et al. |
| 8,553,212 B2 | 10/2013 | Jaeger et al. |
| 8,593,648 B2 | 11/2013 | Cramer et al. |
| 8,619,265 B2 | 12/2013 | Steffey et al. |
| 8,630,314 B2 | 1/2014 | York |
| 8,638,984 B2 | 1/2014 | Roithmeier |
| 8,654,354 B2 | 2/2014 | Steffensen et al. |
| 8,659,749 B2 | 2/2014 | Bridges |
| 8,670,114 B2 | 3/2014 | Bridges et al. |
| 8,681,317 B2 | 3/2014 | Moser et al. |
| 8,699,756 B2 | 4/2014 | Jensen |
| 8,717,545 B2 | 5/2014 | Sebastian et al. |
| 8,740,396 B2 | 6/2014 | Brown et al. |
| 8,772,719 B2 | 7/2014 | Böckem et al. |
| 8,773,667 B2 | 7/2014 | Edmonds et al. |
| 8,848,203 B2 | 9/2014 | Bridges et al. |
| 8,874,406 B2 | 10/2014 | Rotvold et al. |
| 8,902,408 B2 | 12/2014 | Bridges |
| 8,931,183 B2 | 1/2015 | Jonas |

(56) References Cited

U.S. PATENT DOCUMENTS

| | | |
|---|---|---|
| 9,151,830 B2 | 10/2015 | Bridges |
| 2001/0045534 A1 | 11/2001 | Kimura |
| 2002/0033940 A1 | 3/2002 | Hedges et al. |
| 2002/0093646 A1 | 7/2002 | Muraoka |
| 2002/0148133 A1 | 10/2002 | Bridges et al. |
| 2002/0179866 A1 | 12/2002 | Hoeller et al. |
| 2003/0014212 A1 | 1/2003 | Ralston et al. |
| 2003/0020895 A1 | 1/2003 | Bridges |
| 2003/0033041 A1 | 2/2003 | Richey |
| 2003/0035195 A1 | 2/2003 | Blech et al. |
| 2003/0048459 A1 | 3/2003 | Gooch |
| 2003/0066202 A1 | 4/2003 | Eaton |
| 2003/0090682 A1 | 5/2003 | Gooch et al. |
| 2003/0112449 A1 | 6/2003 | Tu et al. |
| 2003/0125901 A1 | 7/2003 | Steffey et al. |
| 2003/0133092 A1 | 7/2003 | Rogers |
| 2003/0179362 A1 | 9/2003 | Osawa et al. |
| 2003/0206285 A1 | 11/2003 | Lau |
| 2004/0035277 A1 | 2/2004 | Hubbs |
| 2004/0041996 A1 | 3/2004 | Abe |
| 2004/0075823 A1 | 4/2004 | Lewis et al. |
| 2004/0100705 A1 | 5/2004 | Hubbs |
| 2004/0170363 A1 | 9/2004 | Angela |
| 2004/0189944 A1 | 9/2004 | Kaufman et al. |
| 2004/0218104 A1 | 11/2004 | Smith et al. |
| 2004/0223139 A1 | 11/2004 | Vogel |
| 2005/0058179 A1 | 3/2005 | Phipps |
| 2005/0147477 A1 | 7/2005 | Clark |
| 2005/0179890 A1 | 8/2005 | Cramer et al. |
| 2005/0185182 A1 | 8/2005 | Raab et al. |
| 2005/0197145 A1 | 9/2005 | Chae et al. |
| 2005/0254043 A1 | 11/2005 | Chiba |
| 2005/0284937 A1 | 12/2005 | Xi et al. |
| 2006/0009929 A1 | 1/2006 | Boyette et al. |
| 2006/0053647 A1 | 3/2006 | Raab et al. |
| 2006/0055662 A1 | 3/2006 | Rimas-Ribikauskas et al. |
| 2006/0055685 A1 | 3/2006 | Rimas-Ribikauskas et al. |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0140473 A1 | 6/2006 | Brooksby et al. |
| 2006/0141435 A1 | 6/2006 | Chiang |
| 2006/0145703 A1 | 7/2006 | Steinbichler et al. |
| 2006/0146009 A1 | 7/2006 | Syrbe et al. |
| 2006/0161379 A1 | 7/2006 | Ellenby et al. |
| 2006/0164384 A1 | 7/2006 | Smith et al. |
| 2006/0164385 A1 | 7/2006 | Smith et al. |
| 2006/0164386 A1 | 7/2006 | Smith et al. |
| 2006/0222237 A1 | 10/2006 | Du et al. |
| 2006/0222314 A1* | 10/2006 | Zumbrunn ............... G01S 5/163 385/147 |
| 2006/0235611 A1 | 10/2006 | Deaton et al. |
| 2006/0262001 A1 | 11/2006 | Ouchi et al. |
| 2006/0279246 A1 | 12/2006 | Hashimoto et al. |
| 2007/0016386 A1 | 1/2007 | Husted |
| 2007/0019212 A1 | 1/2007 | Gatsios et al. |
| 2007/0024842 A1 | 2/2007 | Nishizawa et al. |
| 2007/0090309 A1 | 4/2007 | Hu et al. |
| 2007/0121095 A1 | 5/2007 | Lewis |
| 2007/0127013 A1 | 6/2007 | Hertzman et al. |
| 2007/0130785 A1 | 6/2007 | Bublitz et al. |
| 2007/0236452 A1 | 10/2007 | Venkatesh et al. |
| 2007/0247615 A1 | 10/2007 | Bridges et al. |
| 2007/0285672 A1 | 12/2007 | Mukai et al. |
| 2008/0002866 A1 | 1/2008 | Fujiwara |
| 2008/0024795 A1 | 1/2008 | Yamamoto et al. |
| 2008/0043409 A1 | 2/2008 | Kallabis |
| 2008/0107305 A1 | 5/2008 | Vanderkooy et al. |
| 2008/0122786 A1 | 5/2008 | Pryor et al. |
| 2008/0203299 A1 | 8/2008 | Kozuma et al. |
| 2008/0229592 A1 | 9/2008 | Hinderling et al. |
| 2008/0239281 A1 | 10/2008 | Bridges |
| 2008/0246974 A1 | 10/2008 | Wilson et al. |
| 2008/0250659 A1 | 10/2008 | Bellerose et al. |
| 2008/0279446 A1 | 11/2008 | Hassebrook et al. |
| 2008/0297808 A1 | 12/2008 | Riza et al. |
| 2008/0302200 A1 | 12/2008 | Tobey |
| 2008/0309949 A1 | 12/2008 | Rueb |
| 2008/0316497 A1 | 12/2008 | Taketomi et al. |
| 2008/0316503 A1 | 12/2008 | Smarsh et al. |
| 2009/0000136 A1 | 1/2009 | Crampton |
| 2009/0009747 A1 | 1/2009 | Wolf et al. |
| 2009/0033621 A1 | 2/2009 | Quinn et al. |
| 2009/0046271 A1 | 2/2009 | Constantikes |
| 2009/0066932 A1 | 3/2009 | Bridges et al. |
| 2009/0109426 A1 | 4/2009 | Cramer et al. |
| 2009/0153817 A1 | 6/2009 | Kawakubo |
| 2009/0157226 A1 | 6/2009 | De Smet |
| 2009/0171618 A1 | 7/2009 | Kumagai et al. |
| 2009/0187373 A1 | 7/2009 | Atwell et al. |
| 2009/0190125 A1 | 7/2009 | Foster et al. |
| 2009/0205088 A1 | 8/2009 | Crampton et al. |
| 2009/0213073 A1 | 8/2009 | Obermeyer et al. |
| 2009/0239581 A1 | 9/2009 | Lee |
| 2009/0240372 A1 | 9/2009 | Bordyn et al. |
| 2009/0240461 A1 | 9/2009 | Makino et al. |
| 2009/0240462 A1 | 9/2009 | Lee |
| 2009/0244277 A1 | 10/2009 | Nagashima et al. |
| 2009/0260240 A1 | 10/2009 | Bernhard |
| 2010/0008543 A1 | 1/2010 | Yamada et al. |
| 2010/0025746 A1 | 2/2010 | Chapman et al. |
| 2010/0058252 A1 | 3/2010 | Ko |
| 2010/0091112 A1 | 4/2010 | Veeser et al. |
| 2010/0103431 A1 | 4/2010 | Demopoulos |
| 2010/0128259 A1 | 5/2010 | Bridges et al. |
| 2010/0142798 A1 | 6/2010 | Weston et al. |
| 2010/0149518 A1 | 6/2010 | Nordenfelt et al. |
| 2010/0149525 A1 | 6/2010 | Lau |
| 2010/0158361 A1 | 6/2010 | Grafinger et al. |
| 2010/0176270 A1 | 7/2010 | Lau et al. |
| 2010/0207938 A1 | 8/2010 | Yau et al. |
| 2010/0225746 A1 | 9/2010 | Shpunt et al. |
| 2010/0234094 A1 | 9/2010 | Gagner et al. |
| 2010/0235786 A1 | 9/2010 | Maizels et al. |
| 2010/0245851 A1 | 9/2010 | Teodorescu |
| 2010/0250175 A1 | 9/2010 | Briggs et al. |
| 2010/0250188 A1 | 9/2010 | Brown |
| 2010/0251148 A1 | 9/2010 | Brown |
| 2010/0265316 A1 | 10/2010 | Sali et al. |
| 2010/0277747 A1 | 11/2010 | Rueb et al. |
| 2010/0284082 A1 | 11/2010 | Shpunt et al. |
| 2010/0299103 A1 | 11/2010 | Yoshikawa |
| 2011/0001958 A1 | 1/2011 | Bridges et al. |
| 2011/0003507 A1 | 1/2011 | Van Swearingen et al. |
| 2011/0007154 A1 | 1/2011 | Vogel et al. |
| 2011/0013281 A1* | 1/2011 | Mimura ............... B60R 13/00 359/530 |
| 2011/0023578 A1 | 2/2011 | Grasser |
| 2011/0025827 A1 | 2/2011 | Shpunt et al. |
| 2011/0032509 A1 | 2/2011 | Bridges et al. |
| 2011/0035952 A1 | 2/2011 | Roithmeier |
| 2011/0043620 A1 | 2/2011 | Svanholm et al. |
| 2011/0043808 A1 | 2/2011 | Isozaki et al. |
| 2011/0052006 A1 | 3/2011 | Gurman et al. |
| 2011/0069322 A1 | 3/2011 | Hoffer, Jr. |
| 2011/0107611 A1 | 5/2011 | Desforges et al. |
| 2011/0107612 A1 | 5/2011 | Ferrari et al. |
| 2011/0107614 A1 | 5/2011 | Champ |
| 2011/0109502 A1 | 5/2011 | Sullivan |
| 2011/0112786 A1 | 5/2011 | Desforges et al. |
| 2011/0123097 A1 | 5/2011 | Van Coppenolle et al. |
| 2011/0128625 A1 | 6/2011 | Larsen et al. |
| 2011/0166824 A1 | 7/2011 | Haisty et al. |
| 2011/0169924 A1 | 7/2011 | Haisty et al. |
| 2011/0170534 A1 | 7/2011 | York |
| 2011/0173827 A1 | 7/2011 | Bailey et al. |
| 2011/0175745 A1 | 7/2011 | Atwell et al. |
| 2011/0176145 A1 | 7/2011 | Edmonds et al. |
| 2011/0179281 A1 | 7/2011 | Chevallier-Mames et al. |
| 2011/0181872 A1 | 7/2011 | Dold et al. |
| 2011/0260033 A1 | 10/2011 | Steffensen et al. |
| 2011/0301902 A1 | 12/2011 | Panagas et al. |
| 2012/0050255 A1 | 3/2012 | Thomas et al. |
| 2012/0062706 A1 | 3/2012 | Keshavmurthy et al. |

(56) References Cited

U.S. PATENT DOCUMENTS

| | | |
|---|---|---|
| 2012/0065928 A1 | 3/2012 | Rotvold et al. |
| 2012/0099117 A1 | 4/2012 | Hanchett et al. |
| 2012/0105821 A1 | 5/2012 | Moser et al. |
| 2012/0120391 A1 | 5/2012 | Dold et al. |
| 2012/0120415 A1 | 5/2012 | Steffensen et al. |
| 2012/0124850 A1 | 5/2012 | Ortleb et al. |
| 2012/0154577 A1 | 6/2012 | Yoshikawa et al. |
| 2012/0188559 A1 | 7/2012 | Becker et al. |
| 2012/0206808 A1 | 8/2012 | Brown et al. |
| 2012/0218563 A1 | 8/2012 | Spruck et al. |
| 2012/0236320 A1 | 9/2012 | Steffey et al. |
| 2012/0242795 A1 | 9/2012 | Kane et al. |
| 2012/0262550 A1 | 10/2012 | Bridges |
| 2012/0262573 A1 | 10/2012 | Bridges et al. |
| 2012/0262728 A1 | 10/2012 | Bridges et al. |
| 2012/0265479 A1 | 10/2012 | Bridges et al. |
| 2012/0317826 A1 | 12/2012 | Jonas |
| 2013/0037694 A1 | 2/2013 | Steffensen et al. |
| 2013/0096873 A1 | 4/2013 | Rosengaus et al. |
| 2013/0100282 A1 | 4/2013 | Siercks et al. |
| 2013/0128284 A1 | 5/2013 | Steffey et al. |
| 2013/0155386 A1 | 6/2013 | Bridges et al. |
| 2013/0162469 A1 | 6/2013 | Zogg et al. |
| 2013/0197852 A1 | 8/2013 | Grau et al. |
| 2013/0201470 A1 | 8/2013 | Cramer et al. |
| 2013/0293684 A1 | 11/2013 | Becker et al. |
| 2014/0002806 A1 | 1/2014 | Buchel et al. |
| 2014/0028805 A1 | 1/2014 | Tohme et al. |
| 2014/0267629 A1 | 9/2014 | Tohme et al. |
| 2014/0320643 A1 | 10/2014 | Markendorf |
| 2015/0331159 A1 | 11/2015 | Bridges et al. |
| 2015/0365653 A1 | 12/2015 | Yazid |
| 2015/0373321 A1 | 12/2015 | Bridges |

FOREIGN PATENT DOCUMENTS

| | | |
|---|---|---|
| CN | 1290850 A | 4/2001 |
| CN | 1362692 A | 8/2002 |
| CN | 1531659 A | 9/2004 |
| CN | 1608212 A | 4/2005 |
| CN | 1926400 A | 3/2007 |
| CN | 101031817 A | 9/2007 |
| CN | 101203730 A | 6/2008 |
| CN | 101297176 A | 10/2008 |
| CN | 101371160 A | 2/2009 |
| CN | 101427155 A | 5/2009 |
| CN | 101750012 A | 6/2010 |
| CN | 101776982 A | 7/2010 |
| CN | 201548192 U | 8/2010 |
| DE | 7704949 U1 | 6/1977 |
| DE | 3530922 A1 | 4/1986 |
| DE | 3827458 A1 | 2/1990 |
| DE | 10160090 A1 | 7/2002 |
| DE | 202004004945 U1 | 10/2004 |
| DE | 102004024171 A1 | 9/2005 |
| DE | 102005019058 A1 | 12/2005 |
| DE | 102006013185 A1 | 9/2007 |
| DE | 202006020299 U1 | 5/2008 |
| DE | 60319016 T2 | 4/2009 |
| DE | 102009040837 A1 | 3/2011 |
| EP | 0166106 | 1/1986 |
| EP | 598523 A1 | 5/1994 |
| EP | 0598523 A1 | 5/1994 |
| EP | 0797076 A2 | 9/1997 |
| EP | 0919831 A2 | 6/1999 |
| EP | 0957336 A2 | 11/1999 |
| EP | 1067363 A2 | 1/2001 |
| EP | 1519141 A2 | 3/2005 |
| EP | 1607767 A1 | 12/2005 |
| EP | 2136178 A1 | 12/2009 |
| EP | 2177868 A2 | 4/2010 |
| EP | 2219011 A1 | 8/2010 |
| EP | 2259010 A1 | 12/2010 |
| EP | 2259013 A1 | 12/2010 |
| EP | 2322901 A2 | 5/2011 |
| EP | 2446300 A1 | 5/2012 |
| GB | 2503179 A | 12/2013 |
| GB | 2503390 A | 12/2013 |
| GB | 2516528 A | 1/2015 |
| GB | 2518544 A | 3/2015 |
| GB | 2518769 A | 4/2015 |
| GB | 2518998 A | 4/2015 |
| JP | S57147800 | 9/1982 |
| JP | S5804881 | 1/1983 |
| JP | S6097288 A | 5/1985 |
| JP | 2184788 A1 | 7/1990 |
| JP | H0331715 A | 2/1991 |
| JP | H0371116 A | 3/1991 |
| JP | H0465631 A | 3/1992 |
| JP | H05257005 A | 10/1993 |
| JP | H05302976 A | 11/1993 |
| JP | H6097288 | 4/1994 |
| JP | H06214186 A | 8/1994 |
| JP | H06229715 A | 8/1994 |
| JP | H0665818 | 9/1994 |
| JP | H06265355 | 9/1994 |
| JP | H074967 A | 1/1995 |
| JP | H08145679 A | 6/1996 |
| JP | H0914965 A | 1/1997 |
| JP | H09113223 A | 5/1997 |
| JP | H102722 A | 1/1998 |
| JP | H10107357 A | 4/1998 |
| JP | H10317874 A | 12/1998 |
| JP | 11502629 A | 3/1999 |
| JP | H11304465 A | 11/1999 |
| JP | H11513495 A | 11/1999 |
| JP | H11337642 | 12/1999 |
| JP | 2000503476 A | 3/2000 |
| JP | 2000275042 A | 10/2000 |
| JP | 2000346645 A | 12/2000 |
| JP | 2001013247 A | 1/2001 |
| JP | 2001165662 A | 6/2001 |
| JP | 2001513204 A | 8/2001 |
| JP | 2001272468 A | 10/2001 |
| JP | 2001284317 A | 10/2001 |
| JP | 2001353112 A | 12/2001 |
| JP | 2002089184 A | 3/2002 |
| JP | 2002098762 A | 4/2002 |
| JP | 2002139310 A | 5/2002 |
| JP | 2002209361 A | 7/2002 |
| JP | 2003506691 A | 2/2003 |
| JP | 2004508954 A | 3/2004 |
| JP | 2004108939 A | 4/2004 |
| JP | 2004527751 A | 9/2004 |
| JP | 2005010585 A | 1/2005 |
| JP | 3109969 U | 6/2005 |
| JP | 2005265700 A | 9/2005 |
| JP | 2006003127 A | 1/2006 |
| JP | 2006058091 A | 3/2006 |
| JP | 2006084460 A | 3/2006 |
| JP | 2006220514 A | 8/2006 |
| JP | 2006276012 A | 10/2006 |
| JP | 2006526844 A | 11/2006 |
| JP | 2007504459 A | 3/2007 |
| JP | 2007165331 A | 6/2007 |
| JP | 2007523357 A | 8/2007 |
| JP | 2007256872 A | 10/2007 |
| JP | 2008027308 A | 2/2008 |
| JP | 2008514967 A | 5/2008 |
| JP | 2008544215 A | 12/2008 |
| JP | 2009014639 A | 1/2009 |
| JP | 2009134761 A | 6/2009 |
| JP | 2009229350 A | 10/2009 |
| JP | 2010169633 A | 8/2010 |
| JP | 2011158371 A | 8/2011 |
| JP | 2011526706 A | 10/2011 |
| JP | 2013525787 A | 10/2011 |
| JP | H04504468 A | 10/2011 |
| JP | 2012509464 A | 4/2012 |
| JP | 2012530909 A | 12/2012 |
| JP | 5302976 B2 | 10/2013 |
| TW | 381361 B | 2/2000 |
| WO | 9012284 | 10/1990 |

(56) References Cited

FOREIGN PATENT DOCUMENTS

| WO | 9534849 | A1 | 12/1995 |
|---|---|---|---|
| WO | 0109642 | A1 | 2/2001 |
| WO | 0177613 | A1 | 10/2001 |
| WO | 0223121 | A1 | 3/2002 |
| WO | 0237466 | A1 | 5/2002 |
| WO | 02084327 | A2 | 10/2002 |
| WO | 03062744 | A1 | 7/2003 |
| WO | 03073121 | A1 | 9/2003 |
| WO | 2004063668 | A2 | 7/2004 |
| WO | 2005026772 | A2 | 3/2005 |
| WO | 2006039682 | A1 | 4/2006 |
| WO | 2006052259 | A1 | 5/2006 |
| WO | 2006055770 | A2 | 5/2006 |
| WO | 2006133799 | A1 | 12/2006 |
| WO | 2007079601 | A1 | 7/2007 |
| WO | 2007084209 | A3 | 7/2007 |
| WO | 2007123604 | A1 | 11/2007 |
| WO | 2007124010 | A2 | 11/2007 |
| WO | 2008052348 | A1 | 5/2008 |
| WO | 2008119073 | A2 | 10/2008 |
| WO | 2008121919 | A1 | 10/2008 |
| WO | 2010057169 | A2 | 5/2010 |
| WO | 2010100043 | A1 | 9/2010 |
| WO | 2010107434 | A1 | 9/2010 |
| WO | 2010141120 | A2 | 12/2010 |
| WO | 2010148525 | A1 | 12/2010 |
| WO | 2010148526 | A1 | 12/2010 |
| WO | 2011035290 | A4 | 3/2011 |
| WO | 2011057130 | A2 | 5/2011 |
| WO | 2011107729 | A1 | 9/2011 |
| WO | 2011112277 | A1 | 9/2011 |
| WO | 2012142074 | A2 | 10/2012 |
| WO | 2014143644 | A1 | 9/2014 |
| WO | 2014149701 | A1 | 9/2014 |
| WO | 2014149704 | A1 | 9/2014 |
| WO | 2014149705 | A1 | 9/2014 |
| WO | 2014149706 | A1 | 9/2014 |
| WO | 2014149702 | A1 | 9/2015 |

OTHER PUBLICATIONS

Newport Company "Fiber Optic Scribes" https://web.archive.org/web/20120903063012/http://www.newport.com/Fiber-Optic-Scribes/835171/1033/info.aspx; 2012, 2 pages.

Newport Corporation "Projects in Fiber Optics: Applications Handbook", 1986; 3 pages.

Takeuchi et al., "Ultraprecision 3D Micromachining of Glass"; Annals of the CIRP; Jan. 4, 1996; vol. 45; 401-404 pages.

Thorlabs "Ruby Dualscribe Fiber Optic Scribe" a Mechanical Drawing, 2014, 1 page.

"Fiber Optic Rotary Joints Product Guide"; Moog Inc; MS1071, rev. 2; p. 1-4; 2010; Retrieved on Nov. 13, 2013 from http://www.moog.com/literature/ICD/Moog-Fiber-Optic-Rotary-Joint_Catalog-en.pdf.

"Technical Brief: Fiber Optic Rotary Joint"; Document No. 303; Moog Inc; p. 1-6; 2008; Retrieved on Nov. 13, 2013 from http://www.moog.com/literature/MCG/FORJtechbrief.pdf.

2×2 High Speed Lithium Niobate Interferometric Switch; [on-line]; JDS Uniphase Corporation; 2007; Retreived from www.jdsu.com 18 pages.

AO Modulator—M040-8J-FxS; [online—technical data sheet]; Gooch & Housego; Nov. 2006; Retrieved from http://www.goochandhousego.com/ 4 pages.

Automated Precision, Inc., Product Specifications, Radian, Featuring INNOVO Technology, info@apisensor.com, Copyright 2011, 2 pages.

Burge, James H., et al, Use of a commerical laser tracker for optical alignment, Proc, of SPIE vol. 6676, Sep. 21, 2007, pp. 66760E-1-6 6760E-12.

Cao, et al.; "VisionWand: Interaction Techniques for Large Displays using a Passive Wand Tracked in 3D"; Proceedings of the 16th Annual ACM Symposium on User Interface Software and Technology, UIST; vol. 5, issue 2; pp. 173-182; Jan. 2003.

Chen, J., "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131.

Chen, Jihua, et al, Research on the Principle of 5/6-DOF Laser Tracking Metrology, Journal of Astronautic Metrology and Measurement vol. 27, No. 3, May 31, 2007, pp. 58-62.

Computer Giants Embrace On-Chip Optics; Mar. 27, 2008; [on-line]; Optics.org; [Retreived on Apr. 2, 2008]; Retreived from http://optics.org/cws/article/research/33521;2pages.

Cuypers, W., et al., "Optical Measurement Techniques for Mobile and Large-Scale Dimensional Metrology" (2009) ; Optics and Lasers in Engineering pp. 292-300; vol. 47; Elsevier Ltd. XP 25914917A.

EOSpace—High-Speed Switches; [on-line technical brochure]; [Retrieved May 18, 2009]; Retrieved from http://www.cospace.com/Switches.htm; 2 pages.

FARO Laser Tracker ION; 2 pages; revised Apr. 23, 2010; FARO Technologies, Inc., www.lasertracker.faro.com.

FARO Technical Institute, Basic Measurement Training Workbook, Version 1.0, FARO Laster Tracker, Jan. 2008, Students Book, FAO CAM2 Measure; 20 pages.

Geng, Jason; "DLP-Based Structured Light 3D Imaging Technologies and Applications"; Proceedings of SPIE, vol. 7932. Published Feb. 11, 2011, 15 pages.

Gentile, Ken, Super-Nyquist Operation of the AD9912 Yields a High RF Output Signal; Analog Devices, Inc., AN-939 Application Note; www.analog.com; Copyright 2007; 4 pages.

Hanwei, X. et al., "The Development of Optical Fringe Measurement System integrated with a CMM for Products Inspection." Proceedings of SPIE, vol. 7855, Nov. 3, 2010, pp. 78551W-7855W-8, XP055118356. ISSN: 0277-786X.

Hecht,Photonic Frontiers:Gesture Recognition: Lasers Bring Gesture Recognition to the Home, Laser Focus World, pp. 1-5, Retrieved on Mar. 3, 2011:http://www.optoiq.com/optoiq-2/en-us/index/photonics-technologies-applications/lfw-display/lfw-display/lfw-arti.

Hui, E., et al., "Single-Step Assembly of Complex 3-D Microstructures", Jan. 23, 2000, IEEE; pp. 602-607.

Integrated Optical Amplitude Modulator; [on-line technical data sheet]; [Retrieved Oct. 14, 2010]; Jenoptik; Retrieved from http://www.jenoptik.com/cms/products.nsf/0/A6DF20B50AEE7819C12576FE0074E8E6/$File/amplitudemodulators_en.pdf?Open; 2pages.

Katowski "Optical 3-D Measurement Techniques—Applications in inspection, quality control and robotic" Vienna, Austria, Sep. 18-20, 1989; 11 pages.

Kester, W., Practical Analog Design Techniques, Analog Devices, Section 5, Undersampling Applications, Copyright 1995, pp. 5-1 to 5-34.

Kollorz, et al.,"Gesture recognition with a time-of-flight camera",Int. Jo. of Intelligent Sys Tech and Applications,vol. 5,No. 3/4,p. 334-343,Retreived Aug. 11, 2011;http://www5.informatik.uni-erlangen.de/Forschung/Publikationen/2008/Kollorz08-GRW.pdf, 2008.

LaserTRACER—measureing sub-micron in space; http://www.etalon-ag.com/index.php/en/products/lasertracer; 4 pages; Jun. 28, 2011; Etalon AG.

Leica Absolute Tracker AT401 Powerlock, Dec. 18, 2014; 3 pages.

Leica Absolute Tracker AT401-ASME B89.4.19-2006 Specifications; Hexagon Metrology; Leica Geosystems Metrology Products, Switzerland; 2 pages; www.leica-geosystems.com/metrology.

Leica Geosystems AG ED—"Leica Laser Tracker System", Internet Citation, Jun. 28, 2012, XP002678836, Retrieved from the Internet: URL:http://www.a-solution.com.au/pages/downloads/LTD500_Brochure_EN.pdf; 12 pages.

Leica Geosystems Metrology, "Leica Absolute Tracker AT401, White Paper," Hexagon AB; 2010; 16 Pages.

Leica Geosystems: "TPS1100 Professional Series", 1999, Retrieved from the Internet: URL:http://www.estig.ibeja.pt/-legvm/top_civil/TPS1100%20-%20A%20New%20Generation%20of%20Total%20Stations.pdf, [Retrieved on Jul. 2012] the whole document. 8 Pages.

(56) References Cited

OTHER PUBLICATIONS

Li, et al., "Real Time Hand Gesture Recognition using a Range Camera", Australasian Conference on Robotics and Automation (ACRA), [Retreived Aug. 10, 2011, http://www.araa.asn.au/acra/acra2009/papers/pap128s1.pdf] pp. 1-7 (2009).
Lightvision—High Speed Variable Optial Attenuators (VOA); [on-line]; A publication of Lightwaves 2020, Feb. 1, 2008; Retrieved from http://www.lightwaves2020.com/home/ 8 Pages.
Making the Big Step from Electronics to Photonics by Modulating a Beam of Light with Electricity; May 18, 2005; [on-line]; [Retrieved May 7, 2009]; Cornell University News Service; Retrieved from http://www.news.cornell.edu/stories/May05/LipsonElectroOptica.
Makynen, A. J. et al., Tracking Laser Radar for 3-D Shape Measurements of Large Industrial Objects Based on Time-of-Flight Laser Rangefinding and Position-Sensitive Detection Techniques, IEEE Transactions on Instrumentation and Measurement, Feb. 1994; p. 9.
Matsumaru, K., "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8.
MEMS Variable Optical Attenuators Single/Multi-Channel; [on-line]; Jan. 17, 2005; Retrieved from www.ozoptics.com; 3 Pages.
Nanona High Speed & Low Loss Optical Switch; [on-line technical data sheet]; [Retrieved Oct. 14, 2010]; Retrieved from http://www.bostonati.com/products/PI-FOS.pdf; 2 Pages.
Optical Circulator (3-Ports & 4-Ports); [on-line technical data sheet]; Alliance Fiber Optic Products, Inc. REV.D Jan. 15, 2004; Retrieved from www.afop.com; 2 Pages.
Optical Circulators Improve Bidirectional Fiber Systems; by Jay S. Van Delden; [online]; [Retrieved May 18, 2009]; Laser Focus World; Retrieved from http://www.laserfocusworld.com/display_article/28411/12/nonc/nonc/News/Optical-circulators-improve-bidirecti.
Ou-Yang, M., et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517; 6 Pages.
Parker, D., et al.,"Instrument for Setting Radio Telescope Surfaces" XP 55055817A; 4 pgs.
PCMM System Specifications Leica Absolute Tracker and Leica T-Products; Hexagon Metrology; Leica Geosystems Metrology Products, Switzerland; www.leica-geosystems.com/metrology; 8 Pages.
Poujouly, S., et al,, "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 2002.
Poujouly, S., et al., Digital Laser Range Finder: Phase-Shift Estimation by Undersampling Technique; IEEE, Copyright 1999; p. 1312-1317.
Rahman, et al., "Spatial-Geometric Approach to Physical Mobile Interaction Based on Accelerometer and IR Sensory Data Fusion", ACM Transactions on Multimedia Computing, Communications and Applications, vol. 6, No. 4, Article 28, Pub. date: Nov. 2010.
RS Series Remote Controlled Optical Switch; [on-line technical data sheet]; Sercalo Microtechnology, Ltd. [Retrieved Oct. 14, 2010]; Retreived from http://www.sercalo.com/document/PDFs/DataSheets/RS%20datasheet.pdf; 49pages.
Sladek, J., et al: "The Hybrid Contact-Optical Coordinate Measuring System." Measurement, vol. 44, No. 3, Mar. 1, 2011, pp. 503-510.
Stone, et al. "Automated Part Tracking on the Construction Job Site"; XP 55055816A; National Institute of Standards and Technology. 8 pages.
Tracker3; Ultra-Portable Laser Tracking System; 2010 Automated Precision Inc.; www.apisensor.com; 4 pages.
Turk, et al., "Perceptual Interfaces", UCSB Technical Report 2003-33, pp. 1-43 [Retreived Aug. 11, 2011, http://www.cs.ucsb.edu/research/tech_reports/reports/2003-33.pdf] (2003).
Zeiske, K., "A New Generation of Total Stations from Leica Geosystems" Leica Geosystems AG, May 1999, 8 pages.

\* cited by examiner

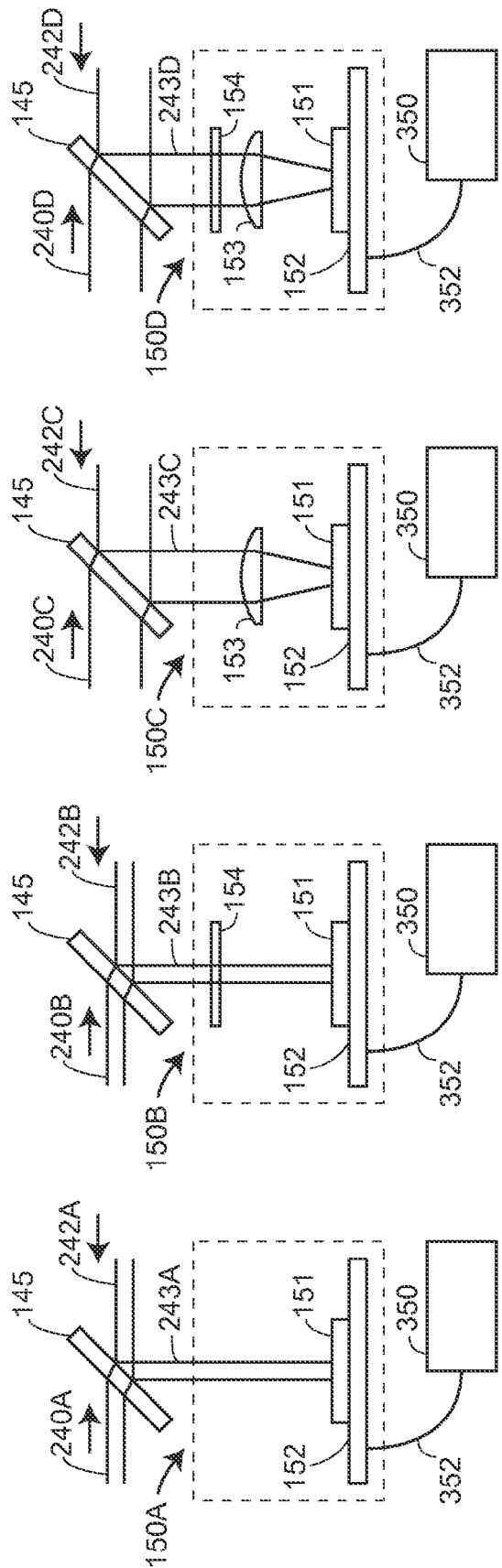

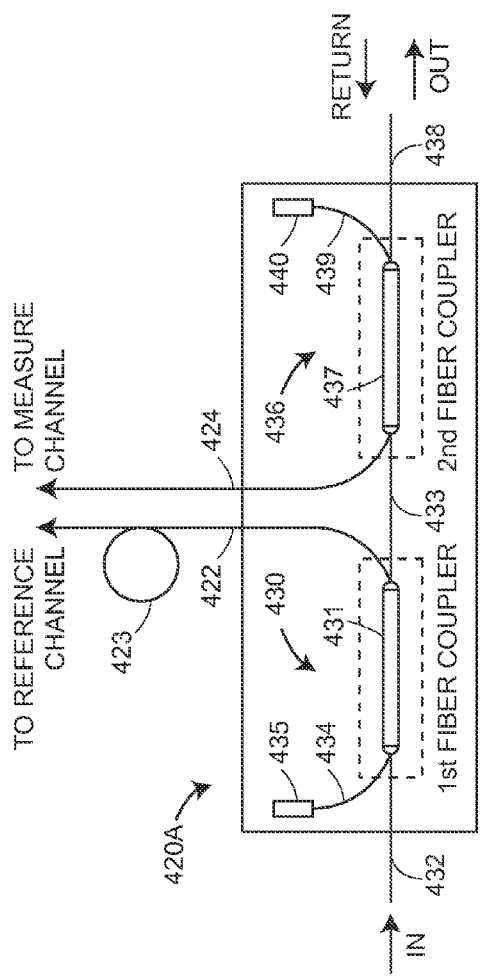
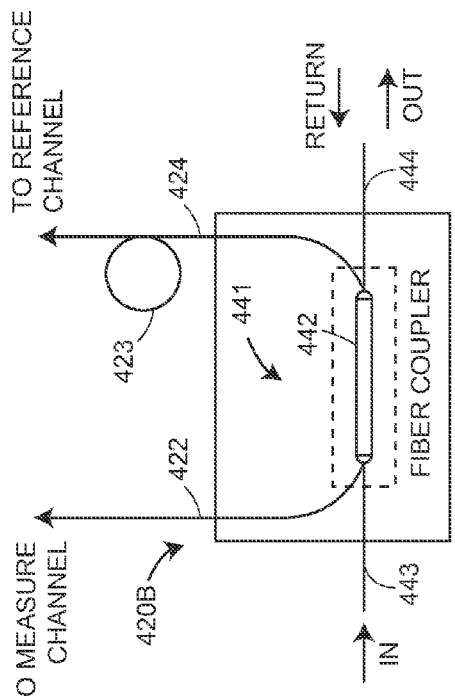
PRIOR ART
FIG. 8A
PRIOR ART
FIG. 8B

TOP VIEW

TOP VIEW

SECTION A-A

TOP VIEW

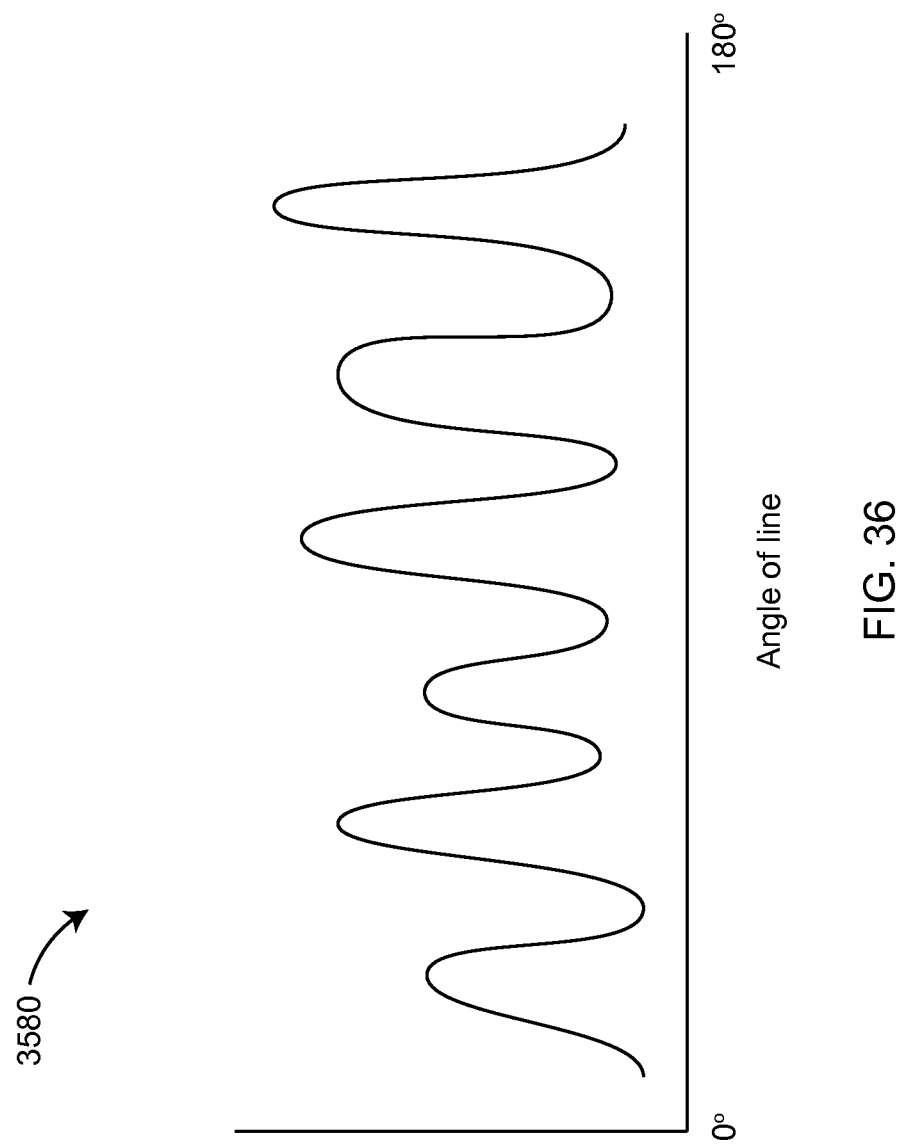

DETERMINING RETROREFLECTOR ORIENTATION BY OPTIMIZING SPATIAL FIT

CROSS REFERENCE TO RELATED APPLICATIONS

The present application claims the benefit of U.S. Provisional Patent Application No. 62/017,996, filed Jun. 27, 2014, and of U.S. Provisional Patent Application No. 62/018,774, filed Jun. 30, 2014, the contents of each of which are incorporated by reference herein.

BACKGROUND

The present disclosure relates to a coordinate-measuring device having the ability to determine three orientational degrees of freedom (DOF). Such a coordinate-measuring device may be used in conjunction with a device having the ability to measure three translational DOF, thereby enabling determination of the position and orientation of a rigid body in space.

Some coordinate-measuring devices have the ability to measure the three-dimensional (3D) coordinates of a point (the three translational degrees of freedom of the point) by sending a beam of light to the point. Some such devices send the beam of light onto a retroreflector target in contact with the point. The instrument determines the coordinates of the point by measuring the distance and the two angles to the target. The distance is measured with a distance-measuring device such as an absolute distance meter (ADM) or an interferometer. The angles are measured with an angle-measuring device such as an angular encoder. The device may include a gimbaled beam-steering mechanism to direct the beam of light to the point of interest.

The laser tracker is a particular type of coordinate-measuring device that tracks the retroreflector target with one or more beams of light it emits. A coordinate-measuring device closely related to the laser tracker is the total station. In many cases, the total station, which is most often used in surveying applications, may be used to measure the coordinates of a retroreflector. Hereinafter, the term laser tracker is used in a broad sense to include total stations.

Ordinarily the laser tracker sends a beam of light to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors that intersect in a common vertex point. For the case of a "hollow" SMR having a reflecting surface in contact with air, the vertex is located at the center of the sphere. Because of this placement of the cube corner within the sphere, the perpendicular distance from the vertex to a surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an ADM. If an object blocks the path of the beam of light from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. U.S. Pat. No. 7,352,446 ('446) to Bridges et al., the contents of which are herein incorporated by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct the beam of light from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest. The gimbal mechanism used for a laser tracker may be used for a variety of other applications. As a simple example, the laser tracker may be used in a gimbal steering device having a visible pointer beam but no distance meter to steer a light beam to series of retroreflector targets and measure the angles of each of the targets.

Angle-measuring devices such as angular encoders are attached to the mechanical axes of the tracker. The one distance measurement and two angle measurements performed by the laser tracker are sufficient to completely specify the three-dimensional location of the SMR.

Several laser trackers are available or have been proposed for measuring six, rather than the ordinary three, degrees of freedom. Such laser trackers combine measurement of three orientational DOF with measurement of three translational DOF to obtain measurement of six DOFs. Exemplary six-DOF systems are described by U.S. Pat. No. 7,800,758 ('758) to Bridges et al., the contents of which are herein incorporated by reference, and U.S. Pat. No. 5,267,014 ('014) to Prenninger, the contents of which are herein incorporated by reference.

One method of measuring three orientational DOF of a retroreflector is to project light onto a retroreflector that includes marks. The marks, which are captured by a camera, are evaluated to determine the three orientational DOF. Prior art methods have included markings at the lines of intersection of the three mutually perpendicular reflectors of a cube-corner retroreflector. For the case of a cube-corner retroreflector made of glass, prior art methods have also included marks placed on the front face of the retroreflector. Although these markings and methods are suitable for their intended purpose, there is a need for improved markings and methods.

SUMMARY

According to an embodiment of the present invention, a non-transitory program storage device, readable by a programmable control device and comprising instructions stored thereon causes the programmable control device to: obtain a two-dimensional (2D) image of markings on a retroreflector, the retroreflector being a glass prism having a first face, a second face, a third face, and a fourth face, the first face, the second face, and the third face being mutually perpendicular reflecting surfaces, the fourth face being a front face of the prism, the first surface and second surface intersecting in a first intersection line, the second surface and the third surface intersecting in a second intersection line, the third surface and the first surface intersecting in a third intersection line, the first intersection line having a straight first intersection mark, the second intersection line having a straight second intersection mark, the third intersection line having a straight third intersection mark, the front face having a first surface mark; determine a 2D mathematical representation of the markings on the retroreflector based at least in part on guess values for each of three orientation angles of the retroreflector; extract a first collection of 2D coordinates from the 2D mathematical representation and a corresponding second collection of 2D coordinates from the 2D image of markings; determine a figure of merit based at least in part on the first collection of 2D coordinates and the corresponding second collection of 2D coordinates; and adjust the guess values for the three orientation angles to improve the figure of merit.

According to another embodiment of the present invention, a method for determining three orientational degrees of freedom of a retroreflector comprises: obtaining a two-dimensional (2D) image of markings on the retroreflector, the retroreflector being a glass prism having a first face, a second face, a third face, and a fourth face, the first face, the second face, and the third face being mutually perpendicular reflecting surfaces, the fourth face being a front face of the prism, the first surface and second surface intersecting in a first intersection line, the second surface and the third surface intersecting in a second intersection line, the third surface and the first surface intersecting in a third intersection line, the first intersection line having a straight first intersection mark, the second intersection line having a straight second intersection mark, the third intersection line having a straight third intersection mark, the front face having a first surface mark; determining a 2D mathematical representation of the markings on the retroreflector based at least in part on guess values for each of three orientation angles of the retroreflector; extracting a first collection of 2D coordinates from the 2D mathematical representation and a corresponding second collection of 2D coordinates from the 2D image of markings; determining a figure of merit based at least in part on the first 2D coordinates and the corresponding second 2D coordinates; adjusting the guess values for the three orientation angles to improve the figure of merit; and storing the three orientation angles.

According to another embodiment of the present invention, a device for measuring three orientational degrees of freedom of a retroreflector includes: a memory; an image sensor; a light source configured to emit a light to illuminate the retroreflector; a display communicatively coupled to the memory; and a programmable control device communicatively coupled to the memory, display, and image sensor, wherein the memory includes instructions for causing the programmable control device to perform the method of claim 13.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 4A and 4B, shows two types of prior art afocal beam expanders;

FIGS. 6A-D are schematic figures that show four types of prior art position detector assemblies;

FIGS. 8A and 8B are schematic figures showing fiber-optic elements within a prior art fiber-optic network;

FIG. 36 shows six peaks obtained in a Fourier transform/binning method;

DETAILED DESCRIPTION

Figure 1:
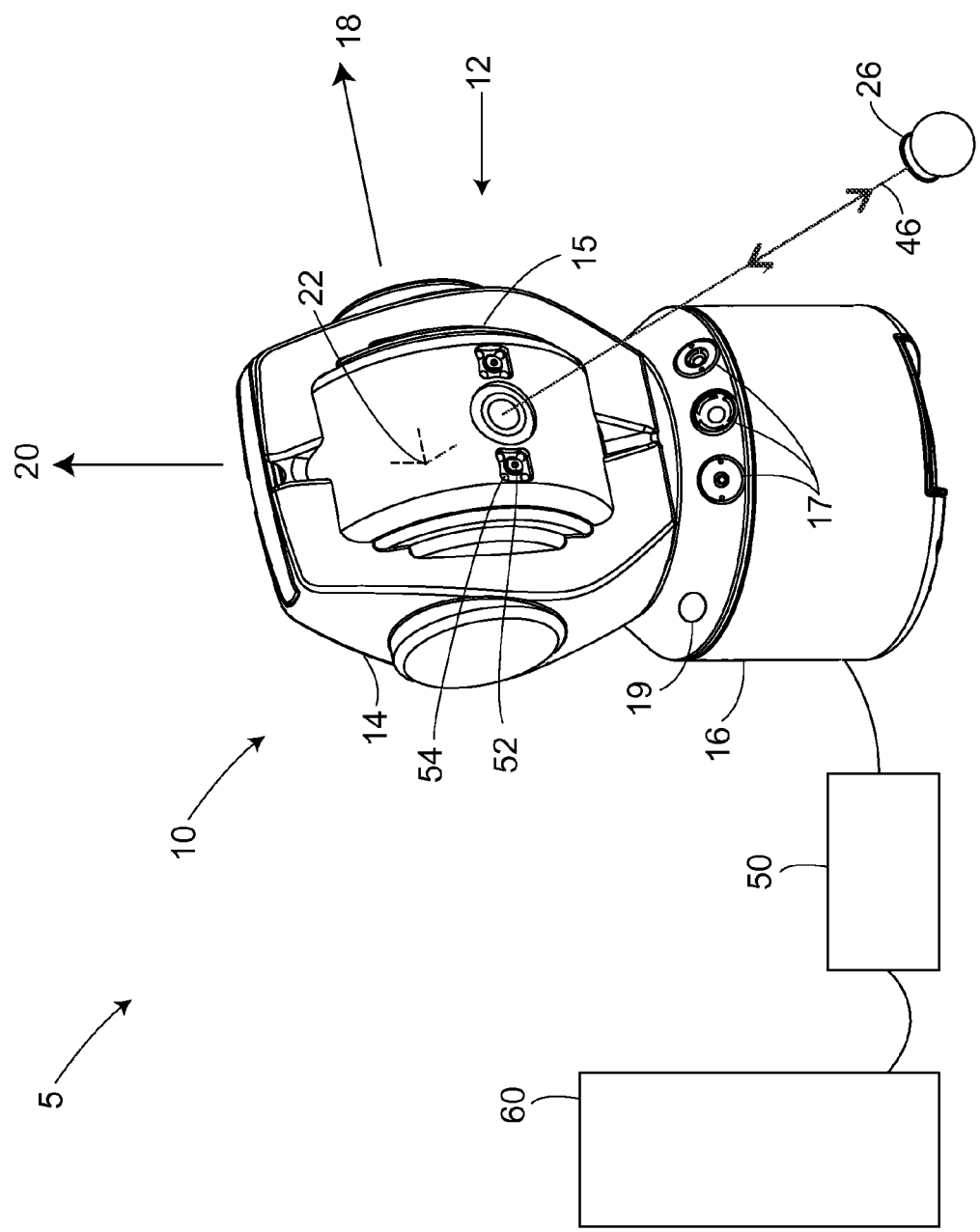
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A beam of light 46 virtually passes through the gimbal point 22 and is pointed orthogonal to zenith axis 18. In other words, beam of light 46 lies in a plane approximately perpendicular to the zenith axis 18 and passes through the azimuth axis 20. Outgoing beam of light 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing beam of light 46 travels to the retroreflector target 26, which might be, for example, an SMR as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing beam of light 46 may include one or more wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, ⅞, and ½ inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation, as described in U.S. Pat. No. 7,327,446, the contents of which are incorporated by reference.

Figure 2:
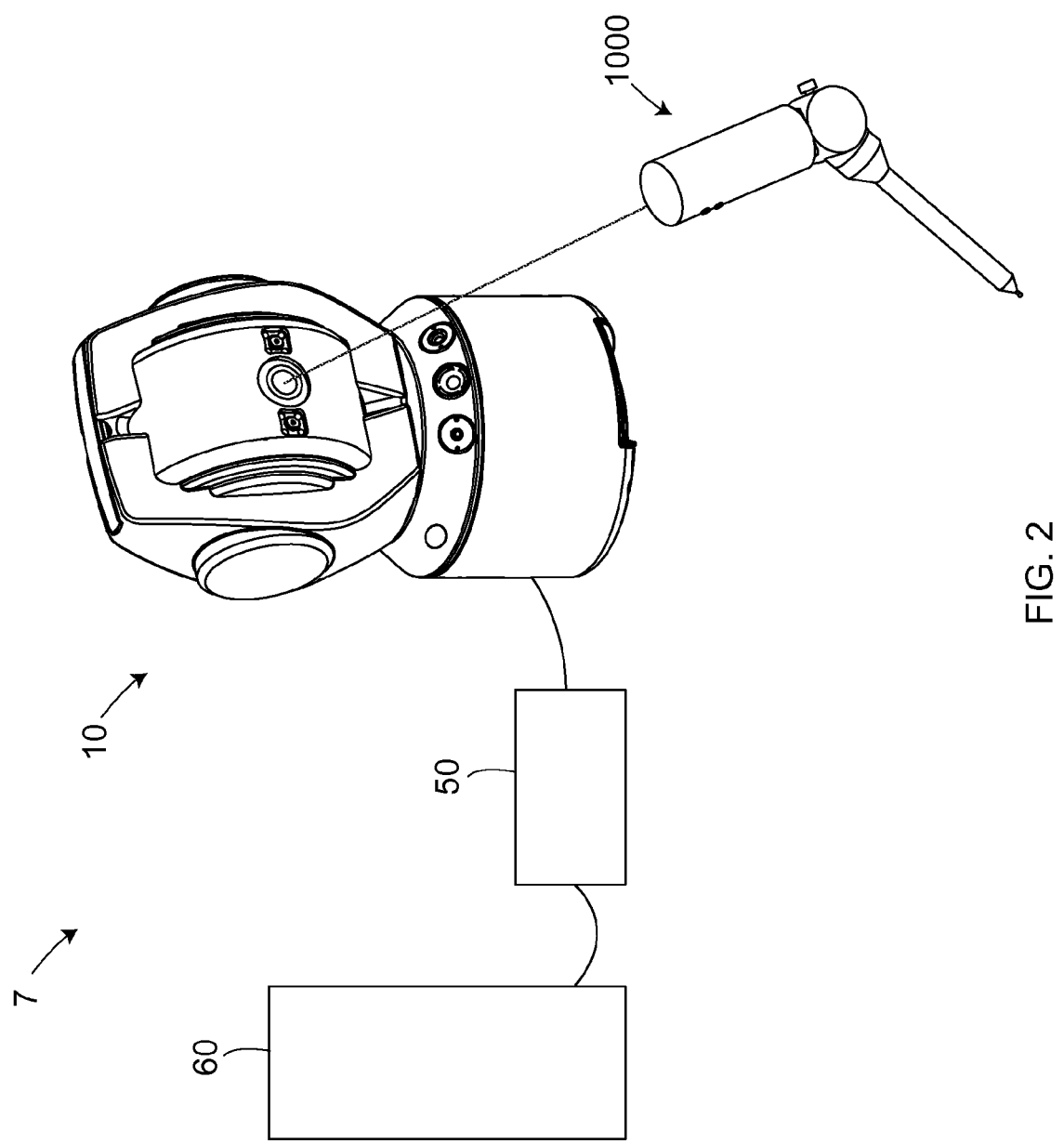
FIG. 2 is a perspective view of a laser tracker system with a six-DOF target in accordance with an embodiment of the present invention.

FIG. 2 shows an exemplary laser tracker system 7 that is like the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
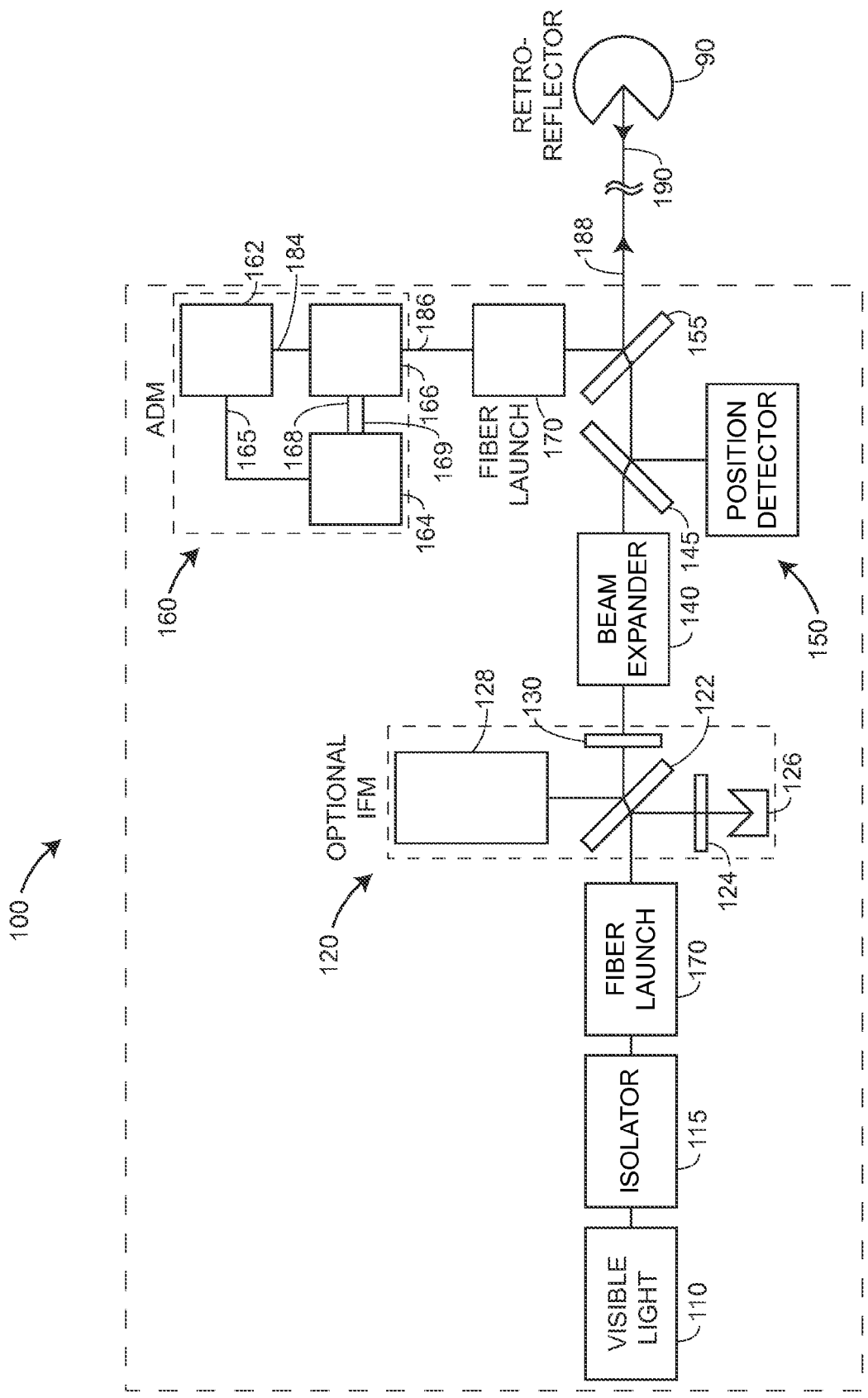
FIG. 3 is a block diagram describing elements of laser tracker optics and electronics in accordance with an embodiment of the present invention.

FIG. 3 is a block diagram showing optical and electrical elements in a laser tracker embodiment. It shows elements of a laser tracker that emit two wavelengths of light—a first wavelength for an ADM and a second wavelength for a visible pointer and for tracking. The visible pointer enables the user to see the position of the laser beam spot emitted by the tracker. The two different wavelengths are combined using a free-space beam splitter. Electrooptic (EO) system 100 includes visible light source 110, isolator 115, optional first fiber launch 170, optional IFM 120, beam expander 140, first beam splitter 145, position detector assembly 150, second beam splitter 155, ADM 160, and second fiber launch 170.

Visible light source 110 may be a laser, superluminescent diode, or other light emitting device. The isolator 115 may be a Faraday isolator, attenuator, or other device capable of reducing the light that passes back into the light source to prevent instability in the visible light source 110.

Optional IFM may be configured in a variety of ways. As a specific example of a possible implementation, the IFM may include a beam splitter 122, a retroreflector 126, quarter waveplates 124, 130, and a phase analyzer 128. The visible light source 110 may launch the light into free space, the light then traveling in free space through the isolator 115, and optional IFM 120. Alternatively, the isolator 115 may be coupled to the visible light source 110 by a fiber optic cable. In this case, the light from the isolator may be launched into free space through the first fiber-optic launch 170, as discussed hereinbelow with reference to FIG. 5.

Figure 4:
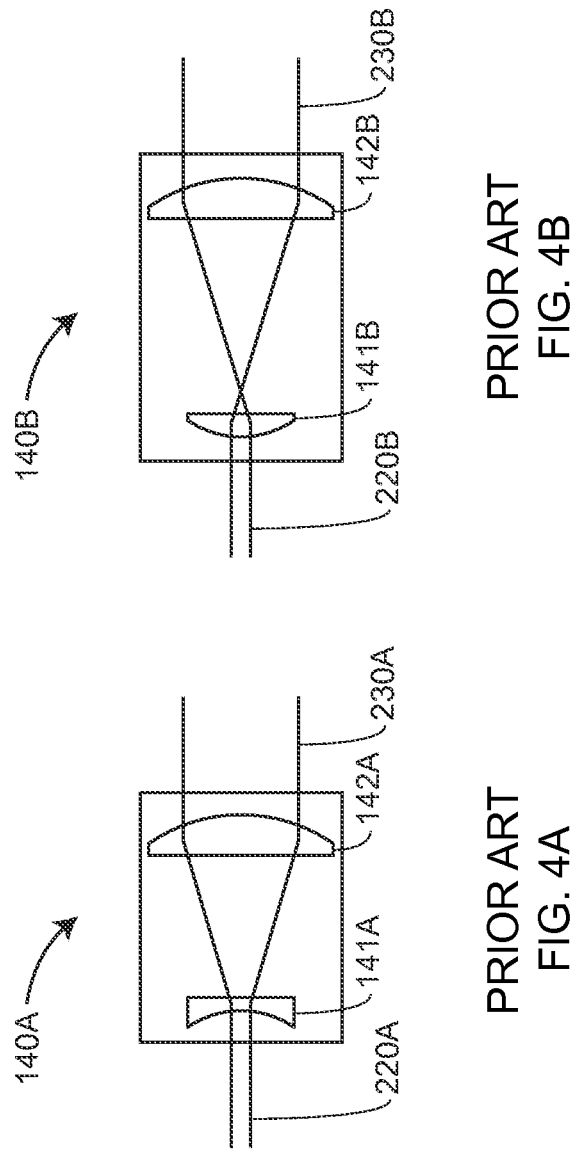
FIG. 4, which includes

Beam expander 140 may be set up using a variety of lens configurations, but two commonly used prior-art configurations are shown in FIGS. 4A, 4B. FIG. 4A shows a configuration 140A based on the use of a negative lens 141A and a positive lens 142A. A beam of collimated light 220A incident on the negative lens 141A emerges from the positive lens 142A as a larger beam of collimated light 230A. FIG. 4B shows a configuration 140B based on the use of two positive lenses 141B, 142B. A beam of collimated light 220B incident on a first positive lens 141B emerges from a second positive lens 142B as a larger beam of collimated light 230B. Of the light leaving the beam expander 140, a small amount reflects off the beam splitters 145, 155 on the way out of the tracker and is lost. That part of the light that passes through the beam splitter 155 is combined with light from the ADM 160 to form a composite beam of light 188 that leaves that laser tracker and travels to the retroreflector 90.

In an embodiment, the ADM 160 includes a light source 162, ADM electronics 164, a fiber network 166, an interconnecting electrical cable 165, and interconnecting optical fibers 168, 169, 184, 186. ADM electronics send electrical modulation and bias voltages to light source 162, which may, for example, be a distributed feedback laser that operates at a wavelength of approximately 1550 nm. In an embodiment, the fiber network 166 may be the prior art fiber-optic network 420A shown in FIG. 8A. In this embodiment, light from the light source 162 in FIG. 3 travels over the optical fiber 184, which is equivalent to the optical fiber 432 in FIG. 8A.

The fiber network of FIG. 8A includes a first fiber coupler 430, a second fiber coupler 436, and low-reflectance terminators 435, 440. The light travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 168 in FIG. 3, which travels to the reference channel of the ADM electronics 164. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are taken. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

The light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

Figure 5:
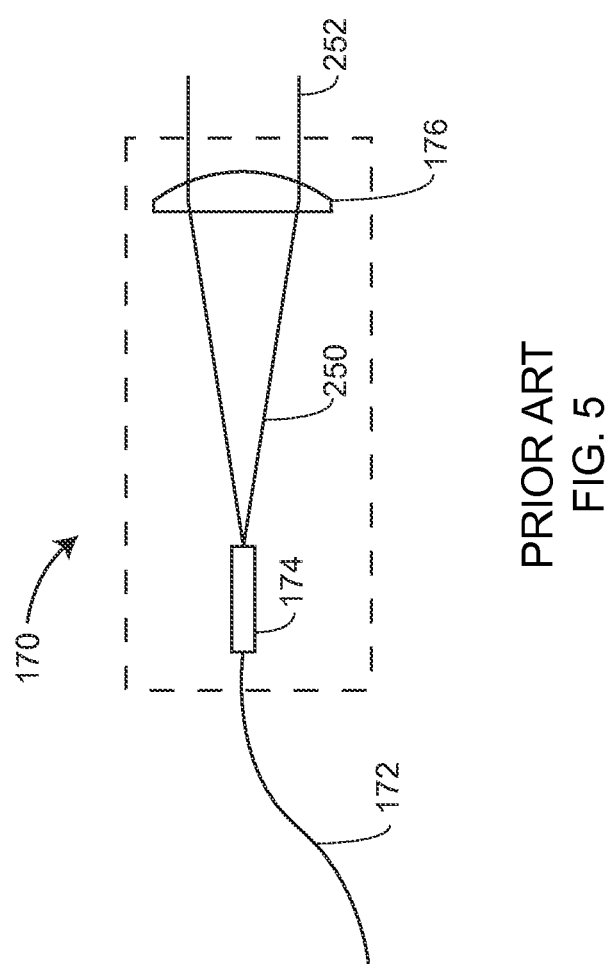
FIG. 5 shows a prior art fiber-optic beam launch.

In an embodiment, fiber launch 170 is shown in prior art FIG. 5. The light from optical fiber 186 of FIG. 3 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it. The method of launching and receiving an optical signal through a single optical fiber in an ADM system was described in reference to FIG. 3 in patent '758.

Referring to FIG. 3, the beam splitter 155 may be a dichroic beam splitter, which transmits different wavelengths than it reflects. In an embodiment, the light from the ADM 160 reflects off dichroic beam splitter 155 and combines with the light from the visible light source 110, which is transmitted through the dichroic beam splitter 155. The composite beam of light 188 travels out of the laser tracker to retroreflector 90 as a first beam, which returns a portion of the light as a second beam. That portion of the second beam that is at the ADM wavelength reflects off the dichroic beam splitter 155 and returns to the second fiber launch 170, which couples the light back into the optical fiber 186.

In an embodiment, the optical fiber 186 corresponds to the optical fiber 438 in FIG. 8A. The returning light travels from optical fiber 438 through the second fiber coupler 436 and splits between two paths. A first path leads to optical fiber 424 that, in an embodiment, corresponds to optical fiber 169 that leads to the measure channel of the ADM electronics 164 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 corresponds to the optical fiber 184, which leads to the light source 162 in FIG. 3. In most cases, the light source 162 contains a built-in Faraday isolator that minimizes the amount of light that enters the light source from optical fiber 432. Excessive light fed into a laser in the reverse direction can destabilize the laser.

Figure 7:
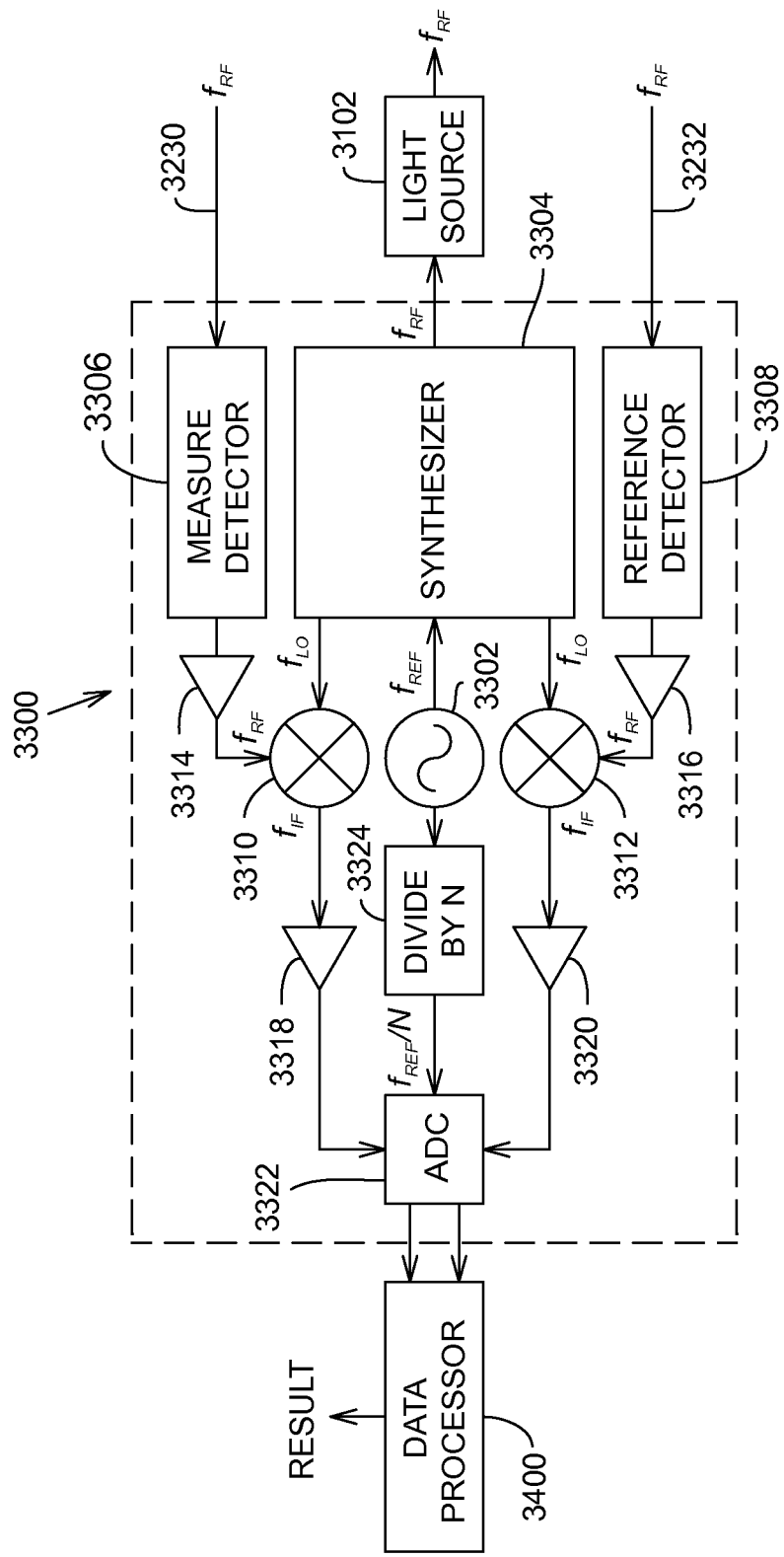
FIG. 7 is a block diagram of electrical and electro-optical elements within a prior art ADM.

The light from the fiber network 166 enters ADM electronics 164 through optical fibers 168, 169. An embodiment of prior art ADM electronics is shown in FIG. 7. Optical fiber 168 in FIG. 3 corresponds to optical fiber 3232 in FIG. 7, and optical fiber 169 in FIG. 3 corresponds to optical fiber 3230 in FIG. 7. Referring now to FIG. 7, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_{LO}$. The signal $f_{RF}$ goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 7, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{IF}$ equal to the absolute value of $f_{LO}-f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 164 of FIG. 3.

The method for extracting a distance is based on the calculation of phase of the ADC signals for the reference and measure channels. This method is described in detail in U.S. Pat. No. 7,701,559 ('559) to Bridges et al., the contents of which are herein incorporated by reference. Calculation includes use of equations (1)-(8) of patent '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of patent '559 combined with synchronization methods described with respect to FIG. 5 of patent '559 and the Kalman filter methods described in patent '559 enable the ADM to measure a moving target. In other embodiments, other methods of obtaining absolute distance measurements, for example, by using pulsed time-of-flight rather than phase differences, may be used.

The part of the return light beam 190 that passes through the beam splitter 155 arrives at the beam splitter 145, which sends part of the light to the beam expander 140 and another part of the light to the position detector assembly 150. The light emerging from the laser tracker 10 or EO system 100 may be thought of as a first beam and the portion of that light reflecting off the retroreflector 90 or 26 as a second beam. Portions of the reflected beam are sent to different functional elements of the EO system 100. For example, a first portion may be sent to a distance meter such as an ADM 160 in FIG. 3. A second portion may be sent to a position detector assembly 150. In some cases, a third portion may be sent to other functional units such as an optional interferometer 120. It is important to understand that, although, in the example of FIG. 3, the first portion and the second portion of the second beam are sent to the distance meter and the position detector after reflecting off beam splitters 155 and 145, respectively, it would have been possible to transmit, rather than reflect, the light onto a distance meter or position detector.

Figure 6F:
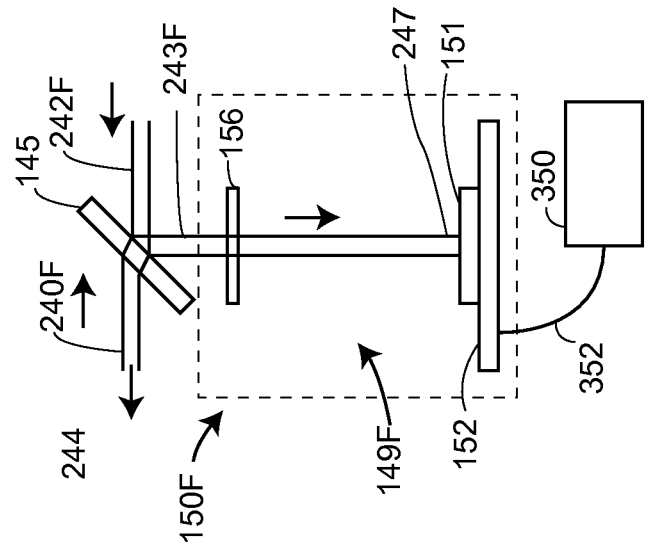
FIGS. 6E and 6F are schematic figures showing position detector assemblies according to embodiments of the present invention.

Four examples of prior art position detector assemblies 150A-150D are shown in FIGS. 6A-D. FIG. 6A depicts the simplest implementation, with the position detector assembly including a position sensor 151 mounted on a circuit board 152 that obtains power from and returns signals to electronics box 350, which may represent electronic processing capability at any location within the laser tracker 10, auxiliary unit 50, or external computer 60. FIG. 6B includes an optical filter 154 that blocks unwanted optical wavelengths from reaching the position sensor 151. The unwanted optical wavelengths may also be blocked, for example, by coating the beam splitter 145 or the surface of the position sensor 151 with an appropriate film. FIG. 6C includes a lens 153 that reduces the size of the beam of light. FIG. 6D includes both an optical filter 154 and a lens 153.

Figure 6E:
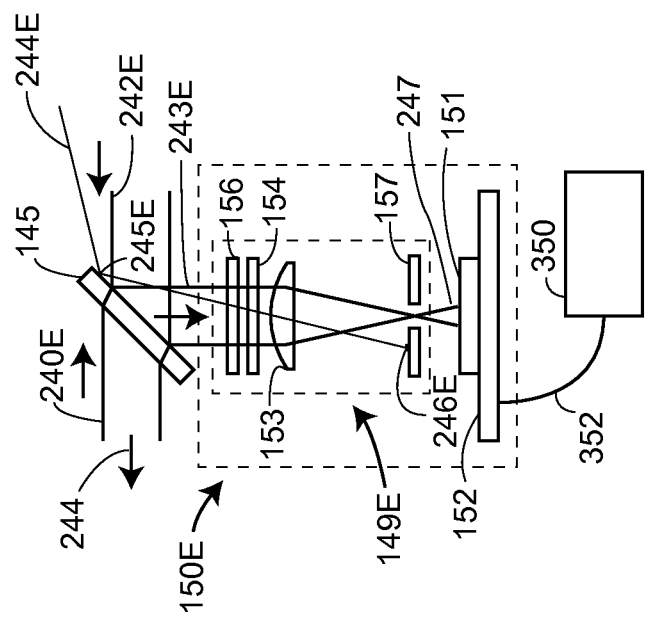

FIG. 6E shows a position detector assembly according to an embodiment of the present invention that includes an optical conditioner 149E. Optical conditioner contains a lens 153 and may also contain optional wavelength filter 154. In addition, it includes at least one of a diffuser 156 and a spatial filter 157. As explained hereinabove, a popular type of retroreflector is the cube-corner retroreflector. One type of cube corner retroreflector is made of three mirrors, each joined at right angles to the other two mirrors. Lines of intersection at which these three mirrors are joined may have a finite thickness in which light is not perfectly reflected back to the tracker. The lines of finite thickness are diffracted as they propagate so that upon reaching the position detector they may not appear exactly the same as at the position detector. However, the diffracted light pattern will generally depart from perfect symmetry. As a result, the light that strikes the position detector 151 may have, for example, dips or rises in optical power (hot spots) in the vicinity of the diffracted lines. Because the uniformity of the light from the retroreflector may vary from retroreflector to retroreflector and also because the distribution of light on the position detector may vary as the retroreflector is rotated or tilted, it may be advantageous to include a diffuser 156 to improve the smoothness of the light that strikes the position detector 151. It might be argued that, because an ideal position detector should respond to a centroid and an ideal diffuser should spread a spot symmetrically, there should be no effect on the resulting position given by the position detector. However, in practice the diffuser is observed to improve performance of the position detector assembly, probably because the effects of nonlinearities (imperfections) in the position detector 151 and the lens 153. Cube corner retroreflectors made of glass may also produce non-uniform spots of light at the position detector 151. Variations in a spot of light at a position detector may be particularly prominent from light reflected from cube corners in six-DOF targets, as may be understood more clearly from commonly assigned U.S. Pat. No. 8,740,396 to Brown et al. and U.S. Pat. No. 8,467,072 to Cramer et al., the contents of each of which are incorporated by reference. In an embodiment, the diffuser 156 is a holographic diffuser. A holographic diffuser provides controlled, homogeneous light over a specified diffusing angle. In other embodiments, other types of diffusers such as ground glass or "opal" diffusers are used.

The purpose of the spatial filter 157 of the position detector assembly 150E is to block ghost beams that may be the result, for example, of unwanted reflections off optical surfaces, from striking the position detector 151. A spatial filter includes a plate 157 that has an aperture. By placing the spatial filter 157 a distance away from the lens equal approximately to the focal length of the lens, the returning light 243E passes through the spatial filter when it is near its narrowest—at the waist of the beam. Beams that are traveling at a different angle, for example, as a result of reflection of an optical element strike the spatial filter away from the aperture and are blocked from reaching the position detector 151. An example is shown in FIG. 6E, where an unwanted ghost beam 244E reflects off a surface of the beam splitter 145 and travels to spatial filter 157, where it is blocked. Without the spatial filter, the ghost beam 244E would have intercepted the position detector 151, thereby causing the position of the beam 243E on the position detector 151 to be incorrectly determined. Even a weak ghost beam may significantly change the position of the centroid on the position detector 151 if the ghost beam is located a relatively large distance from the main spot of light.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one must consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. The main point is that, for the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector is moved transverse to the tracker at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements and based on the distance from the light beam on the position sensor to the ideal retrace point.

As explained hereinabove, the position detector performs two important functions—enabling tracking and correcting measurements to account for the movement of the retroreflector. The position sensor within the position detector may be any type of device capable of measuring a position. For example, the position sensor might be a position sensitive detector or a photosensitive array. The position sensitive detector might be lateral effect detector or a quadrant detector, for example. The photosensitive array might be a CMOS or CCD array, for example.

In an embodiment, the return light that does not reflect off beam splitter 145 passes through beam expander 140, thereby becoming smaller. In another embodiment, the positions of the position detector and the distance meter are reversed so that the light reflected by the beam splitter 145 travels to the distance meter and the light transmitted by the beam splitter travels to the position detector.

The light continues through optional IFM, through the isolator and into the visible light source 110. At this stage, the optical power should be small enough so that it does not destabilize the visible light source 110.

In an embodiment, the light from visible light source 110 is launched through a beam launch 170 of FIG. 5. The fiber launch may be attached to the output of light source 110 or a fiber optic output of the isolator 115.

In an embodiment, the fiber network 166 of FIG. 3 is prior art fiber network 420B of FIG. 8B. Here the optical fibers 184, 186, 168, 169 of FIG. 3 correspond to optical fibers 443, 444, 424, 422 of FIG. 8B. The fiber network of FIG. 8B is like the fiber network of FIG. 8A except that the fiber network of FIG. 8B has a single fiber coupler instead of two fiber couplers. The advantage of FIG. 8B over FIG. 8A is simplicity; however, FIG. 8B is more likely to have unwanted optical back reflections entering the optical fibers 422 and 424.

Figure 8C:
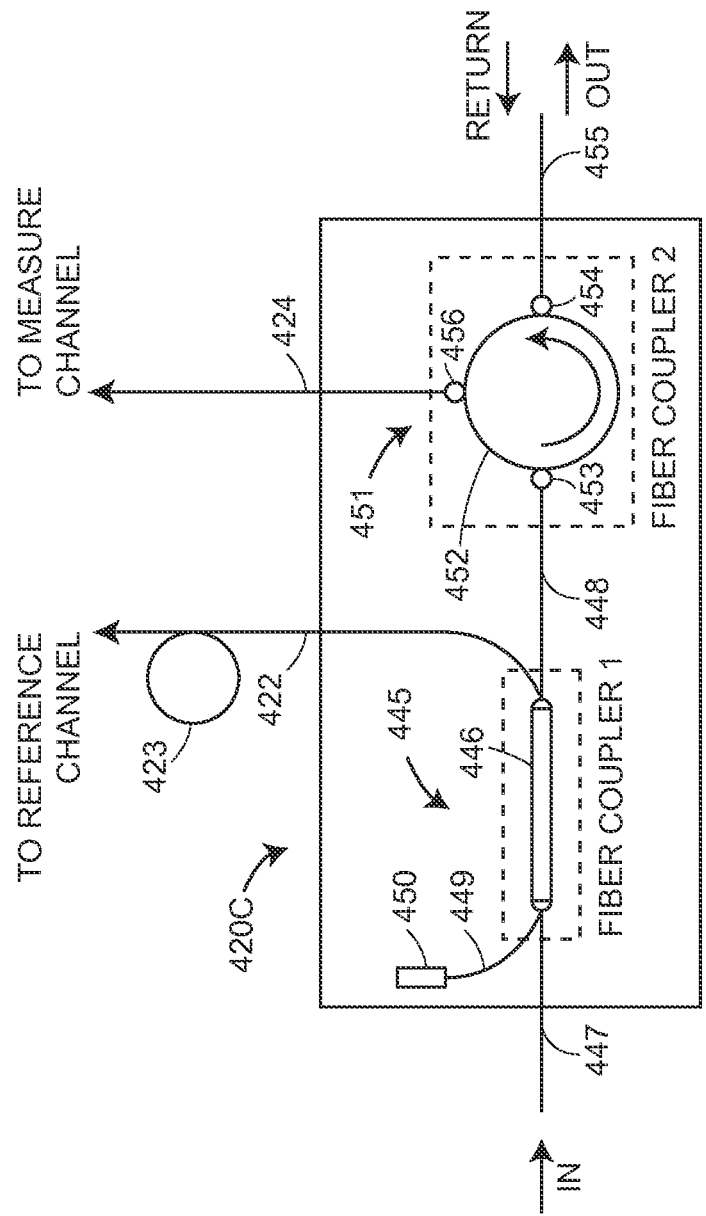
FIG. 8C is a schematic figure showing fiber-optic elements within a fiber-optic network in accordance with an embodiment of the present invention.

In an embodiment, the fiber network 166 of FIG. 3 is fiber network 420C of FIG. 8C. Here the optical fibers 184, 186, 168, 169 of FIG. 3 correspond to optical fibers 447, 455, 423, 424 of FIG. 8C. The fiber network 420C includes a first fiber coupler 445 and a second fiber coupler 451. The first fiber coupler 445 is a 2×2 coupler having two input ports and two output ports. Couplers of this type are usually made by placing two fiber cores in close proximity and then drawing the fibers while heated. In this way, evanescent coupling between the fibers can split off a desired fraction of the light to the adjacent fiber. The second fiber coupler 451 is of the type called a circulator. It has three ports, each having the capability of transmitting or receiving light, but only in the designated direction. For example, the light on optical fiber 448 enters port 453 and is transported toward port 454 as indicated by the arrow. At port 454, light may be transmitted to optical fiber 455. Similarly, light traveling on port 455 may enter port 454 and travel in the direction of the arrow to port 456, where some light may be transmitted to the optical fiber 424. If only three ports are needed, then the circulator 451 may suffer less losses of optical power than the 2×2 coupler. On the other hand, a circulator 451 may be more expensive than a 2×2 coupler, and it may experience polarization mode dispersion, which can be problematic in some situations.

Figure 9:
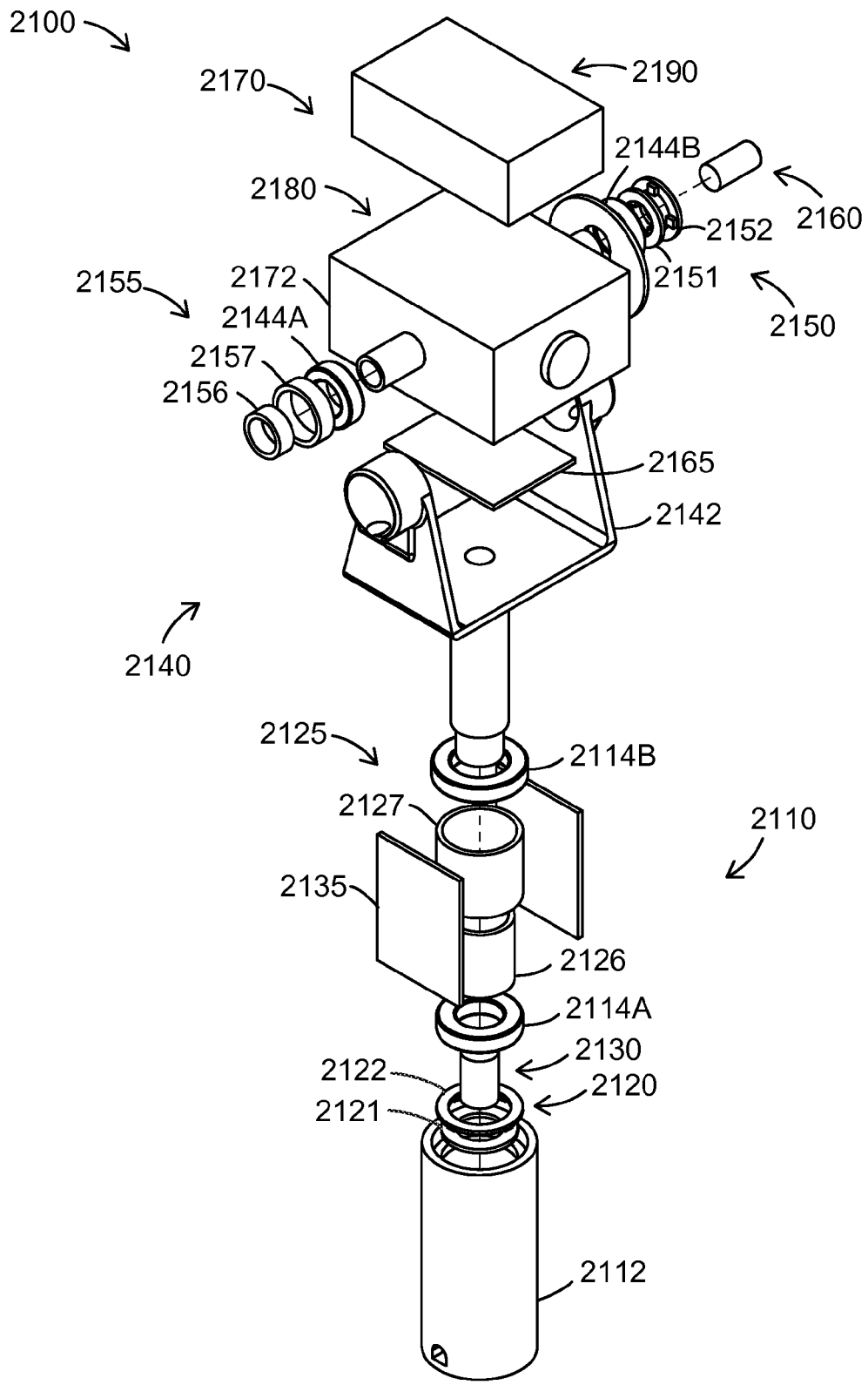
FIG. 9 is an exploded view of a prior art laser tracker.
Figure 10:
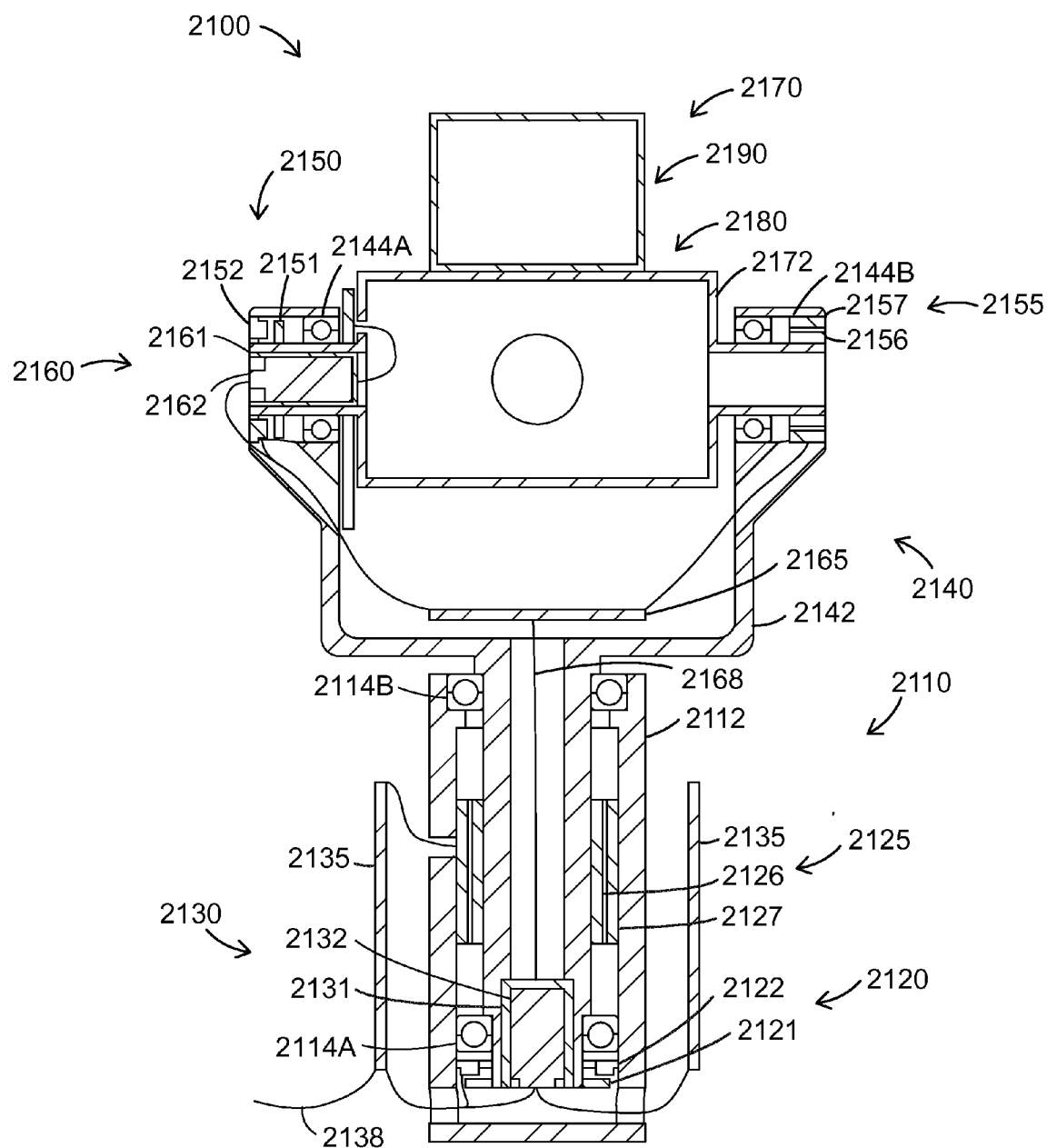
FIG. 10 is a cross-sectional view of a prior art laser tracker.

FIGS. 9 and 10 show exploded and cross sectional views, respectively, of a prior art laser tracker 2100, which is depicted in FIGS. 2 and 3 of U.S. Pat. No. 8,525,983 to Bridges et al., which is incorporated by reference herein. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 10, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The purpose of zenith encoder assembly 2150 is to accurately measure the angle of rotation of payload frame 2172 with respect to yoke housing 2142. Zenith encoder assembly 2150 comprises zenith encoder disk 2151 and zenith readhead assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 10, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle only, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 11:
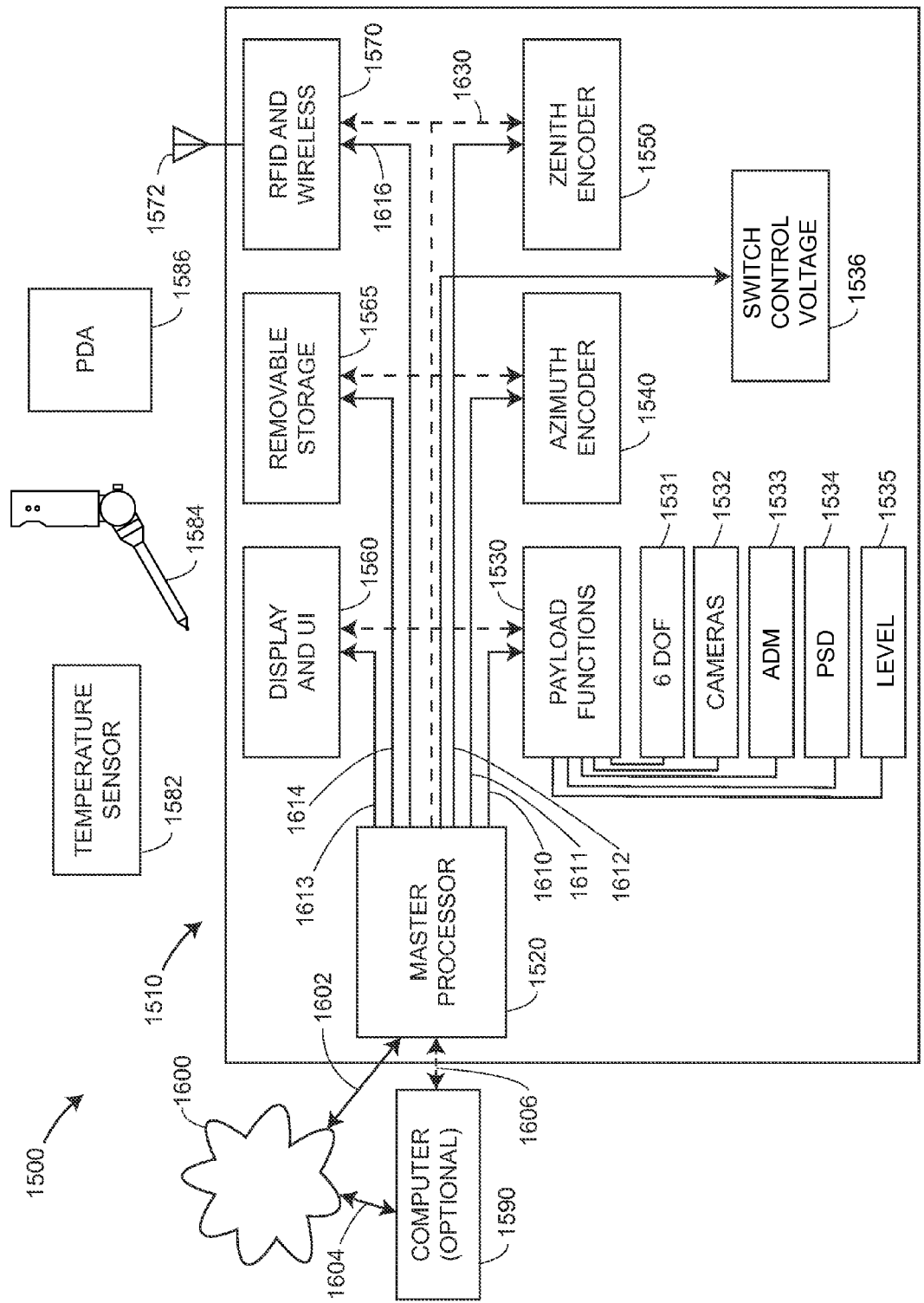
FIG. 11 is a block diagram of the computing and communication elements of a laser tracker in accordance with an embodiment of the present invention.

FIG. 11 is a block diagram depicting a dimensional measurement electronics processing system 1500 that includes a laser tracker electronics processing system 1510, processing systems of peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 9, 10, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584. Peripheral devices may contain processors. The six-DOF accessories may include six-DOF probing systems, six-DOF scanners, six-DOF projectors, six-DOF sensors, and six-DOF indicators. The processors in these six-DOF devices may be used in conjunction with processing devices in the laser tracker as well as an external computer and cloud processing resources. Generally, when the term laser tracker processor or measurement device processor is used, it is meant to include possible external computer and cloud support.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are separated from one another and from the payload electronics 1530 by the slip rings 2130, 2160 shown in FIGS. 9, 10. This is why the bus lines 1610, 1611, and 1612 are depicted as separate bus line in FIG. 11.

The laser tracker electronics processing system 1510 may communicate with an external computer 1590, or it may provide computation, display, and UI functions within the laser tracker. The laser tracker communicates with computer 1590 over communications link 1606, which might be, for example, an Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Laser trackers today use one visible wavelength (usually red) and one infrared wavelength for the ADM. The red wavelength may be provided by a frequency stabilized helium-neon (HeNe) laser suitable for use in an IFM and also for use as a red pointer beam. Alternatively, the red wavelength may be provided by a diode laser that serves just as a pointer beam. A disadvantage in using two light sources is the extra space and added cost required for the extra light sources, beam splitters, isolators, and other components. Another disadvantage in using two light sources is that it is difficult to perfectly align the two light beams along the entire paths the beams travel. This may result in a variety of problems including inability to simultaneously obtain good performance from different subsystems that operate at different wavelengths. A system that uses a single light source, thereby eliminating these disadvantages, is shown in optoelectronic system 500 of FIG. 12A.

Figure 12A:
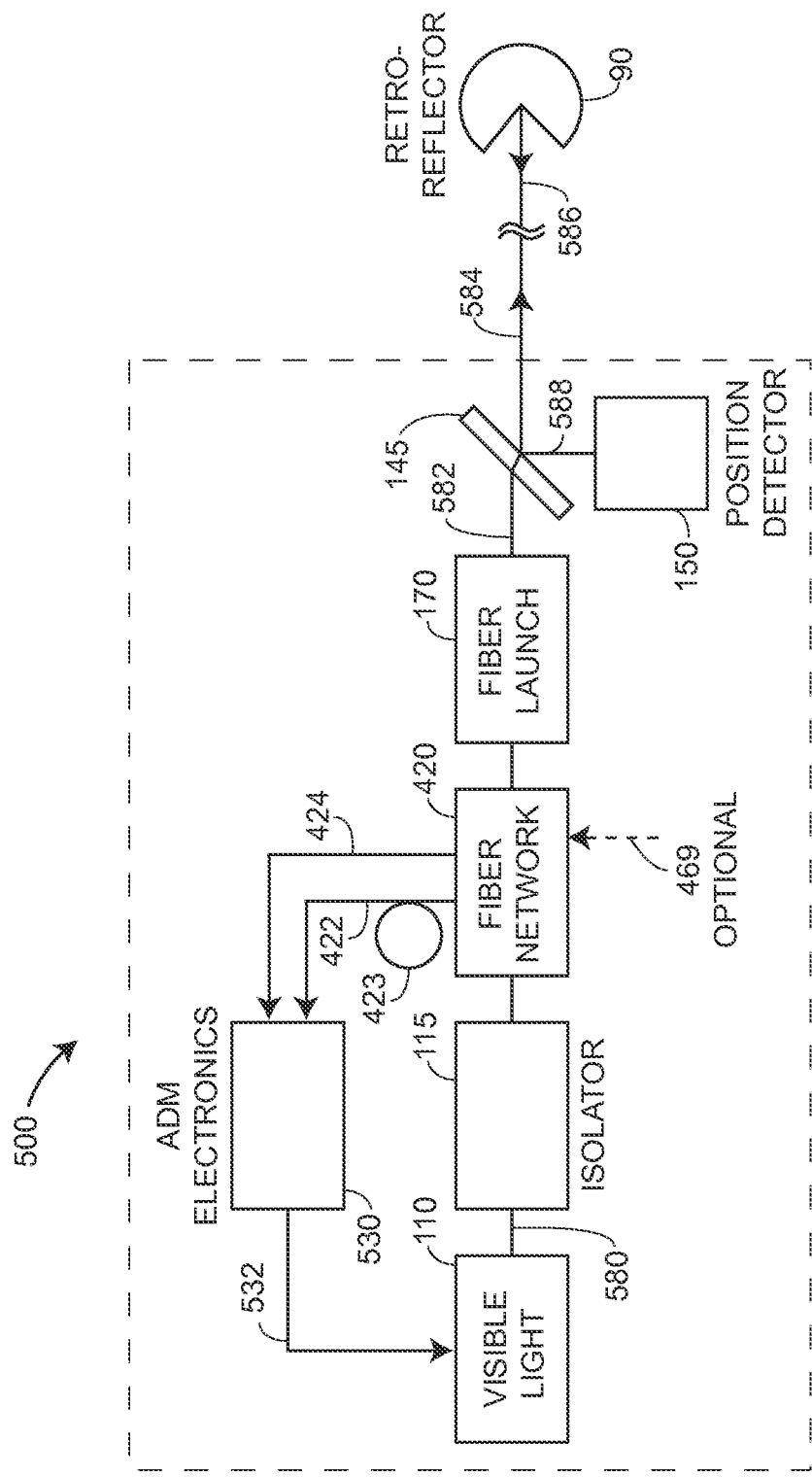
FIG. 12A is a block diagram of elements in a laser tracker that uses a single wavelength according to an embodiment of the present invention.

FIG. 12A includes a visible light source 110, an isolator 115, a fiber network 420, ADM electronics 530, a fiber launch 170, a beam splitter 145, and a position detector 150. The visible light source 110 might be, for example, a red or green diode laser or a vertical cavity surface emitting laser (VCSEL). The isolator might be a Faraday isolator, an attenuator, or any other device capable of sufficiently reducing the amount of light fed back into the light source. The light from the isolator 115 travels into the fiber network 420, which in an embodiment is the fiber network 420A of FIG. 8A.

Figure 12B:
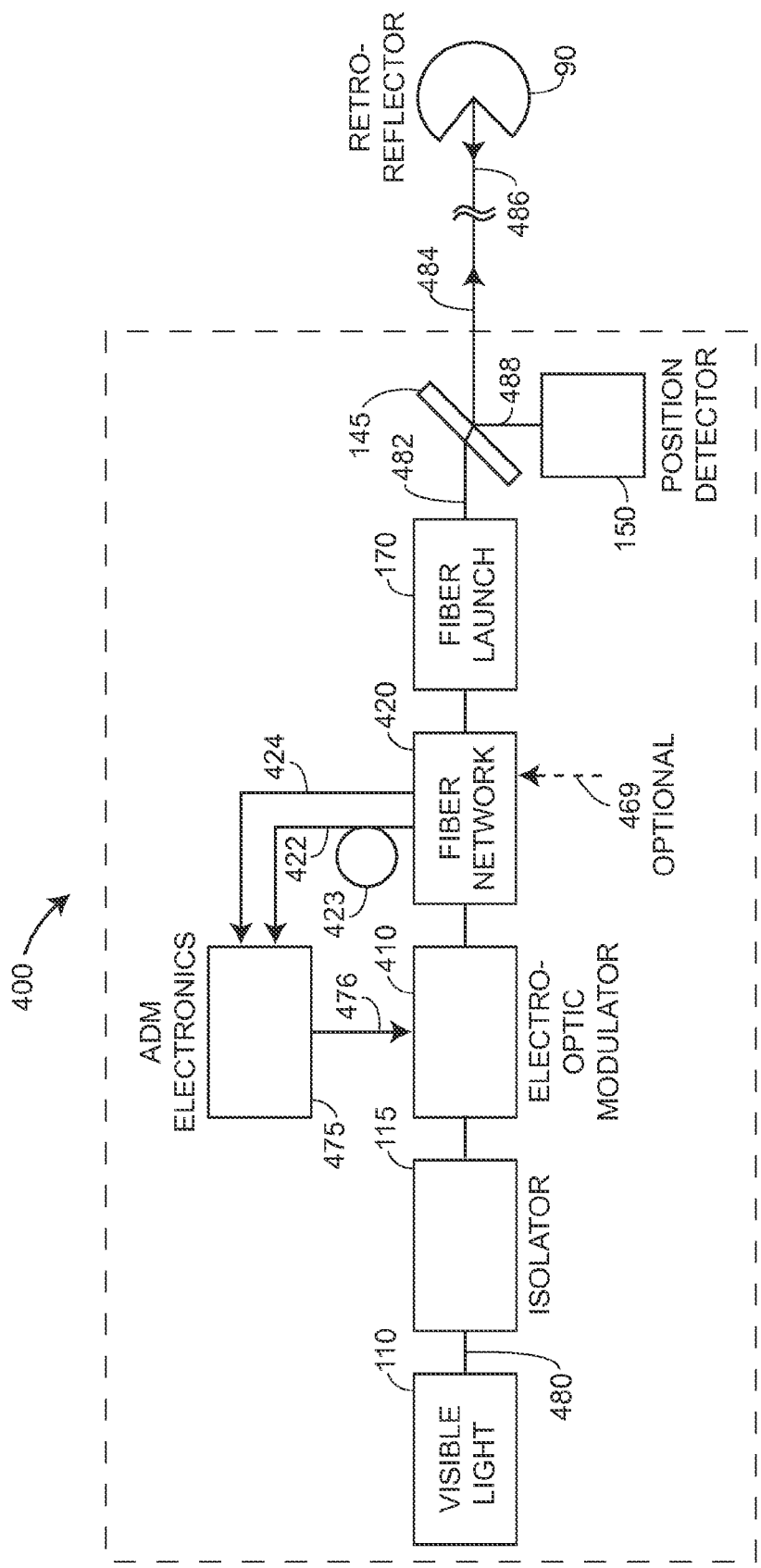
FIG. 12B is a block diagram of elements in a laser tracker that uses a single wavelength according to an embodiment of the present invention.

FIG. 12B shows an embodiment of an optoelectronic system 400 in which a single wavelength of light is used but wherein modulation is achieved by means of electro-optic modulation of the light rather than by direct modulation of a light source. The optoelectronic system 400 includes a visible light source 110, an isolator 115, an electrooptic modulator 410, ADM electronics 475, a fiber network 420, a fiber launch 170, a beam splitter 145, and a position detector 150. The visible light source 110 may be, for example, a red or green laser diode. Laser light is sent through an isolator 115, which may be a Faraday isolator or an attenuator, for example. The isolator 115 may be fiber coupled at its input and output ports. The isolator 115 sends the light to the electrooptic modulator 410, which modulates the light to a selected frequency, which may be up to 10 GHz or higher if desired. An electrical signal 476 from ADM electronics 475 drives the modulation in the electrooptic modulator 410. The modulated light from the electrooptic modulator 410 travels to the fiber network 420, which might be the fiber network 420A, 420B, 420C, or 420D discussed hereinabove. Some of the light travels over optical fiber 422 to the reference channel of the ADM electronics 475. Another portion of the light travels out of the tracker, reflects off retroreflector 90, returns to the tracker, and arrives at the beam splitter 145. A small amount of the light reflects off the beam splitter and travels to position detector 150, which has been discussed hereinabove with reference to FIGS. 6A-F. A portion of the light passes through the beam splitter 145 into the fiber launch 170, through the fiber network 420 into the optical fiber 424, and into the measure channel of the ADM electronics 475. In general, the system 500 of FIG. 12A can be manufactured for less money than system 400 of FIG. 12B; however, the electro-optic modulator 410 may be able to achieve a higher modulation frequency, which can be advantageous in some situations.

Figure 13:
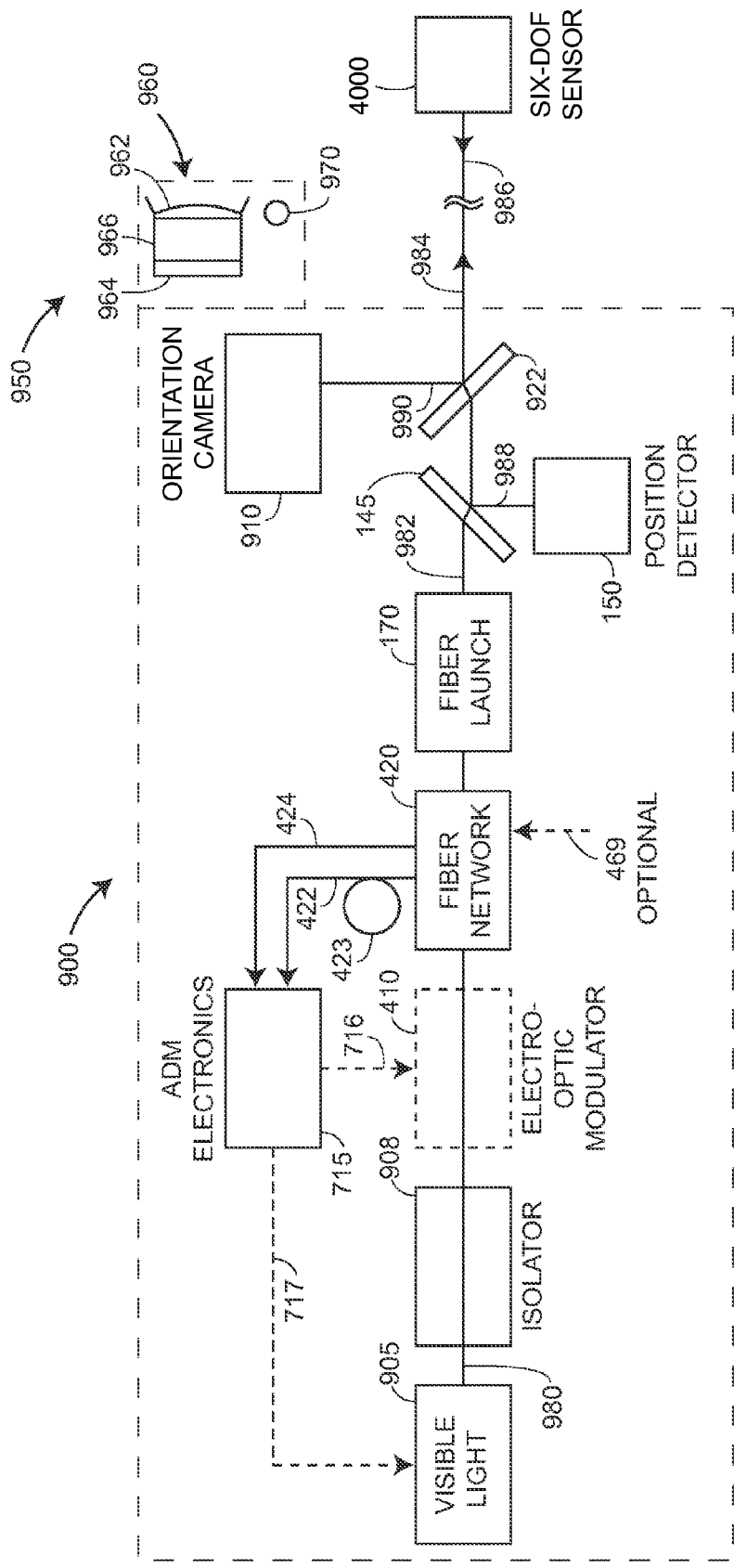
FIG. 13 is a block diagram of elements in a laser tracker with six-DOF capability according to an embodiment of the present invention.

FIG. 13 shows an embodiment of a locator camera system 950 and an optoelectronic system 900 in which an orientation camera 910 is combined with the optoelectronic functionality of a 3D laser tracker to measure six degrees of freedom. The optoelectronic system 900 includes a visible light source 905, an isolator 908, an optional electrooptic modulator 410, ADM electronics 715, a fiber network 420, a fiber launch 170, a beam splitter 145, a position detector 150, a beam splitter 922, and an orientation camera 910. The light from the visible light source is emitted in optical fiber 980 and travels through isolator 908, which may have optical fibers coupled on the input and output ports. The light may travel through the electrooptic modulator 410 modulated by an electrical signal 716 from the ADM electronics 715. Alternatively, the ADM electronics 715 may send an electrical signal over cable 717 to modulate the visible light source 905. Some of the light entering the fiber network travels through the fiber length equalizer 423 and the optical fiber 422 to enter the reference channel of the ADM electronics 715. An electrical signal 469 may optionally be applied to the fiber network 420 to provide a switching signal to a fiber optic switch within the fiber network 420. A part of the light travels from the fiber network to the fiber launch 170, which sends the light on the optical fiber into free space as light beam 982. A small amount of the light reflects off the beam splitter 145 and is lost. A portion of the light passes through the beam splitter 145, through the beam splitter 922, and travels out of the tracker to six degree-of-freedom (DOF) device 4000. The six-DOF device 4000 may be a probe, a scanner, a projector, a sensor, or other device.

On its return path, the light from the six-DOF device 4000 enters the optoelectronic system 900 and arrives at beam splitter 922. Part of the light is reflected off the beam splitter 922 and enters the orientation camera 910. The orientation camera 910 records the positions of some marks placed on the retroreflector target. From these marks, the orientation angle (i.e., three degrees of freedom) of the six-DOF probe is found.

The principles of the orientation camera are described hereinafter in the present application and also in patent '758. A portion of the light at beam splitter 145 travels through the beam splitter and is put onto an optical fiber by the fiber launch 170. The light travels to fiber network 420. Part of this light travels to optical fiber 424, from which it enters the measure channel of the ADM electronics 715.

The locator camera system 950 includes a camera 960 and one or more light sources 970. The locator camera system is also shown in FIG. 1, where the cameras are elements 52 and the light sources are elements 54. The camera includes a lens system 962, a photosensitive array 964, and a body 966. One use of the locator camera system 950 is to locate retroreflector targets in the work volume. It does this by flashing the light source 970, which the camera picks up as a bright spot on the photosensitive array 964. A second use of the locator camera system 950 is establish a coarse orientation of the six-DOF device 4000 based on the observed location of a reflector spot or LED on the six-DOF device 4000. If two or more locator camera systems are available on the laser tracker, the direction to each retroreflector target in the work volume may be calculated using the principles of triangulation. If a single locator camera is located to pick up light reflected along the optical axis of the laser tracker, the direction to each retroreflector target may be found. If a single camera is located off the optical axis of the laser tracker, then approximate directions to the retroreflector targets may be immediately obtained from the image on the photosensitive array. In this case, a more accurate direction to a target may be found by rotating the mechanical axes of the laser to more than one direction and observing the change in the spot position on the photosensitive array.

Figure 14:
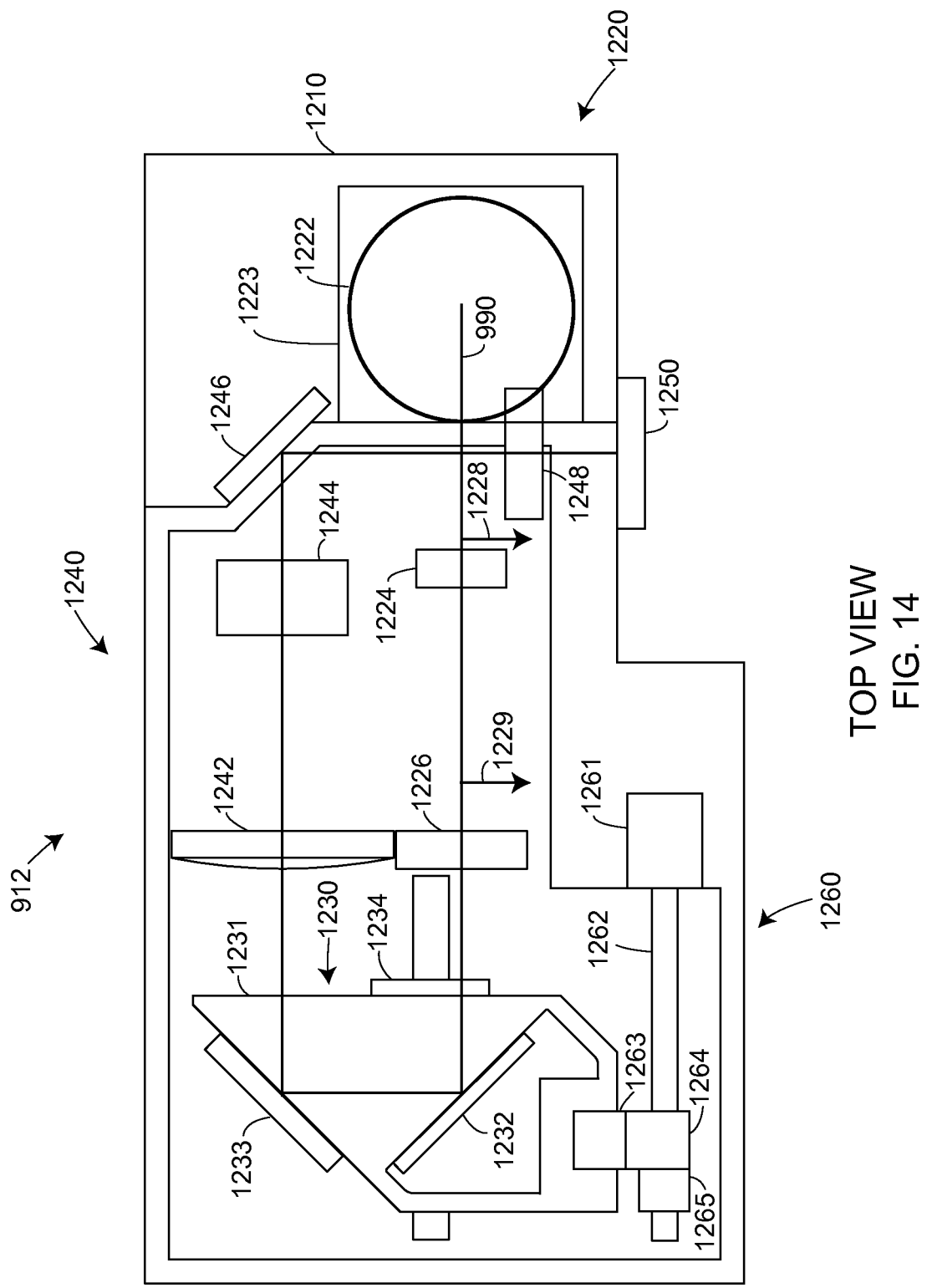
FIG. 14 is a top view of an orientation camera.

FIG. 14 shows an embodiment of an orientation camera 910, which may be used in the optoelectronic systems of FIG. 13. The general principles of the orientation camera are described in patent '758 and are generally adhered to in orientation camera 910. In an embodiment, the orientation camera 910 includes a body 1210, an afocal beam reducer 1220, a magnifier 1240, a path length adjuster 1230, an actuator assembly 1260, and a photosensitive array 1250. The afocal beam reducer includes a positive lens 1222, a mirror 1223, and negative lenses 1224, 1226. The afocal beam reducer has the property that a ray of light that enters lens 1222 parallel to an optical axis—an axis that passes through the center of the lenses—emerges from lens 1226 also parallel to the optical axis. The afocal beam reducer also has the property that an image has a constant size regardless of the distance from the lens to an object. Another way of describing an afocal lens assembly is to say that is has an infinite effective focal length, which is to say that an object placed an infinite distance from the afocal lens will form an image of the object on the other side of the lens with the image sensor an infinite distance from the lens.

The magnifier 1240 includes a positive lens 1242, negative lenses 1244, 1248, and a mirror 1246. The magnifier has the same function as a microscope objective but is scaled to provide a larger image. The photosensitive array 1250 may, for example, be a CMOS or CCD array that converts the light that strikes it into an array of digital values representing the irradiance of the light at each pixel of the photosensitive array. The pattern of irradiance may reveal, for example, the marks on a six-DOF target. The path length adjuster 1230 includes a platform 1231, two mirrors 1232, 1233, and a ball slide 1234. The mirrors 1232, 1233 are mounted on the platform 1231 so that when the platform 1231 is moved, the distance between the afocal beam reducer 1220 and the magnifier 1240 is changed. This change in distance is needed to keep a clear image on the photosensitive array 1250 for a changing distance from the laser tracker to the target. The platform 1231 is mounted on the ball slide 1234, which provides the platform with low friction linear motion. In an embodiment, the actuator assembly 1260 includes a motor 1261, a motor shaft 1262, a flexible coupling 1263, an adapter 1264, and a motor nut 1265. The motor nut 1265 is fixedly attached to the adapter. As the threaded motor shaft 1262 is rotated by the motor 1261, the motor nut 1265 is moved either farther from or nearer to the motor, depending on the direction of rotation of the motor shaft. The flexible coupler 1263, which is attached to the adapter 1264, allows the platform to move freely even if the motor shaft 1262 and the ball slide 1234 are not parallel to one another.

In an embodiment, the orientation camera 910 provides constant transverse magnification for different distances to the target. Here transverse magnification is defined as the image size divided by the object size. The lenses shown in FIG. 27 were selected to produce a constant image size on the photosensitive array 1250 of 3 mm for an object size of 13 mm. In this instance, the transverse magnification is 3 mm/13 min=0.23. This transverse magnification is held constant for a target placed a distance from the tracker of between 0.5 meter and 30 meters. This image size of 3 mm might be appropriate for a ¼ inch CCD or CMOS array. In an embodiment, the transverse magnification is four times this amount, making it appropriate for a one inch CCD or CMOS array. An orientation camera with this increased transverse magnification can be obtained in the same size body 1210, by changing the focal lengths and spacings of the three lenses in the magnifier 1240.

In an embodiment shown in FIG. 14, the effective focal lengths of the three lens elements 1222, 1224, and 1226 of the beam reducer 1220 are 85.9 mm, −29.6 mm, and −7.2 mm, respectively. A virtual image is formed after the light from the object passes through these three lens elements. For an object placed 0.5 meter from the laser tracker, the virtual image 1229 has a size of 0.44 mm and is located 7 mm from the lens 1226. For an object placed 30 meters from the laser tracker, the virtual image 1228 has a size of 0.44 mm and is located 1.8 mm from the lens 1224. The distance between the virtual image 1228 and the virtual image 1129 is 39.8 mm, which means that the platform needs a maximum travel range of half this amount, or 19.9 mm. The transverse magnification of the beam reducer 1220 is 0.44 mm/13 mm=0.034.

The three lens elements 1242, 1244, and 1228 comprise a magnifier lens assembly. In the embodiment of FIG. 14A, the effective focal lengths of the three lens elements 1242, 1244, and 1228 are 28.3 mm, −8.8 mm, and −8.8 mm, respectively. The size of the image at the photosensitive array 1250 is 3 mm for a target located 0.5 meter from the laser tracker, 30 meters from the laser tracker, or any distance in between. The transverse magnification of the magnifier lens assembly is 3 mm/0.44 mm=6.8. The overall transverse magnification of the orientation camera is 3 mm/13 mm=0.23. In another embodiment, the transverse magnification of the magnifier lens assembly is increased by a factor of 4 to 4×6.8=27, thereby producing an overall transverse magnification of 12 mm/13 mm=0.92 for any distance from 0.5 to 30 meters.

Other combinations of lenses can be combined to make an orientation camera having a constant transverse magnification. Furthermore, although having constant transverse magnification is helpful, other lens systems are also useable. To make a zoom camera not having constant magnification, the lens elements 1222, 1224, and 1226 may be replaced by a lens assembly that is not afocal. The path length adjuster 1230 and the actuator assembly 1260 are provided to retain the zoom capability.

Figure 15:
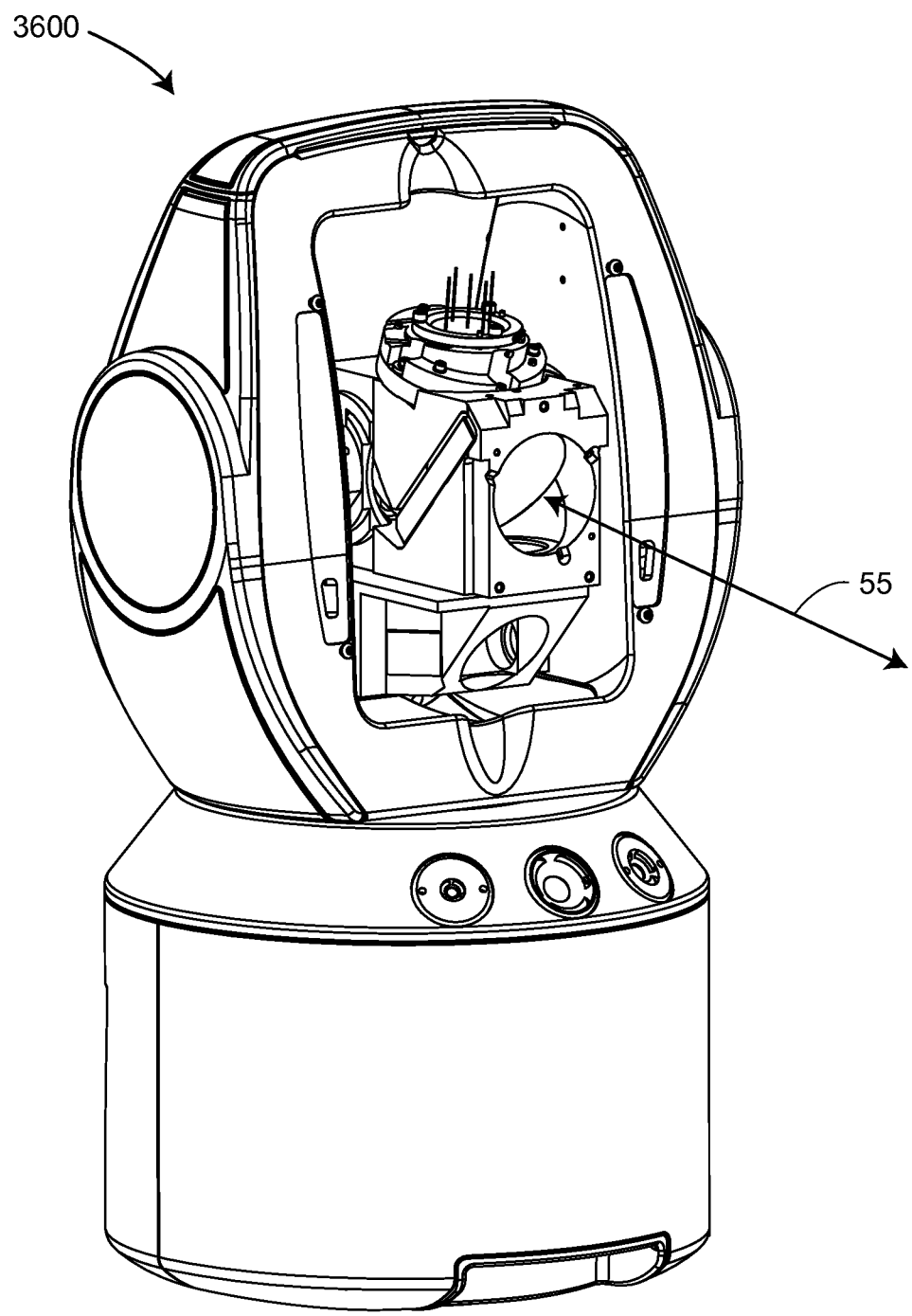
FIG. 15 is a perspective view of a laser tracker with covers off and optics block removed according to an embodiment of the present invention.
Figure 16:
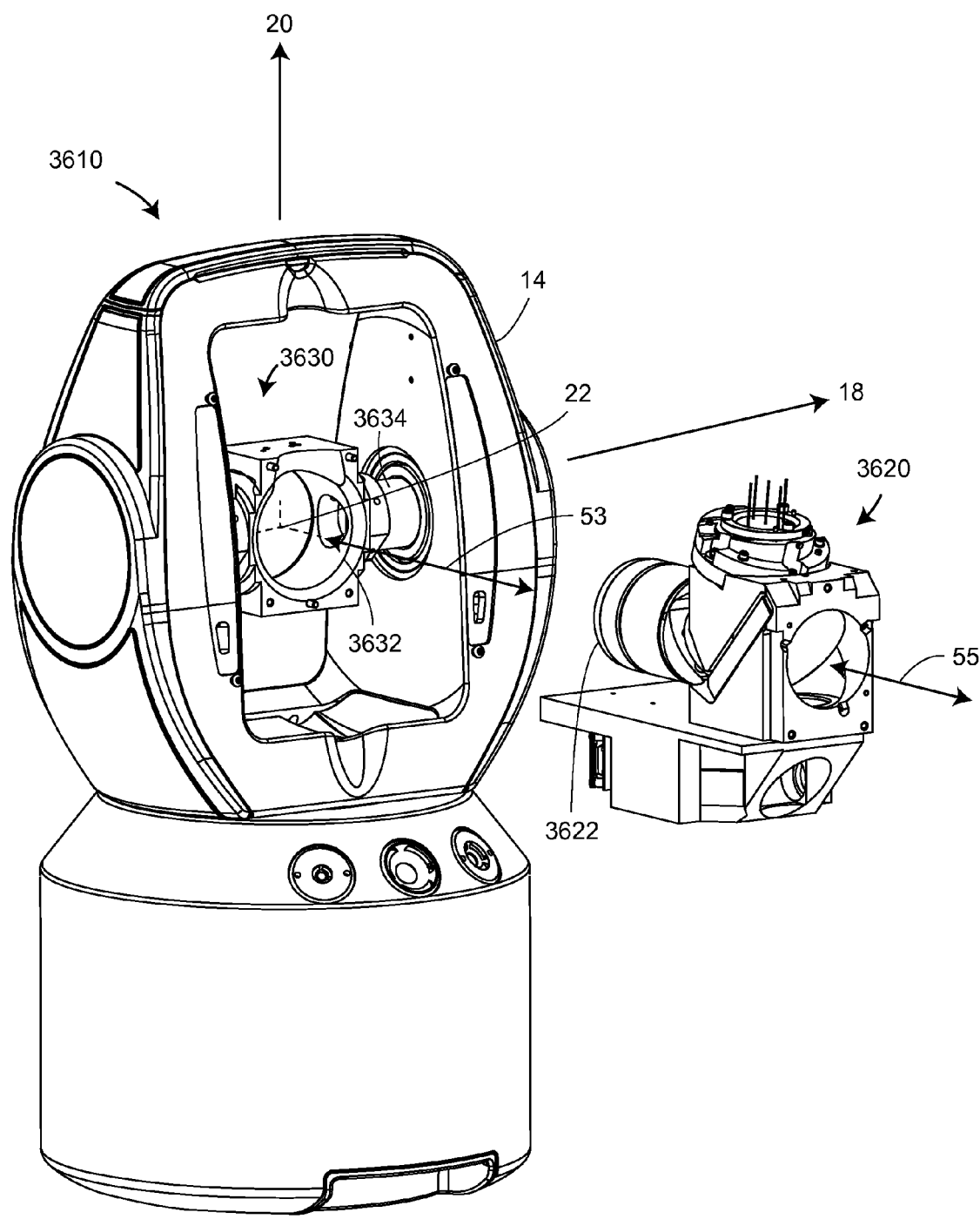
FIG. 16 is an exploded view showing an optics bench in relation to other elements of a laser tracker according to an embodiment of the present invention.

FIG. 15 shows an embodiment of a laser tracker 3600 with front covers removed and some optical and electrical components omitted for clarity. As shown in FIG. 16, in an embodiment, the optics bench assembly 3620 includes a mating tube 3622. FIG. 16 shows a gimbal assembly 3610, which includes a zenith shaft 3630, and the optics bench assembly 3620. The zenith shaft includes a shaft 3634 and a mating sleeve 3632. The zenith shaft 3630 may be fabricated of a single piece of metal in order to improve rigidity and temperature stability.

Figure 17:
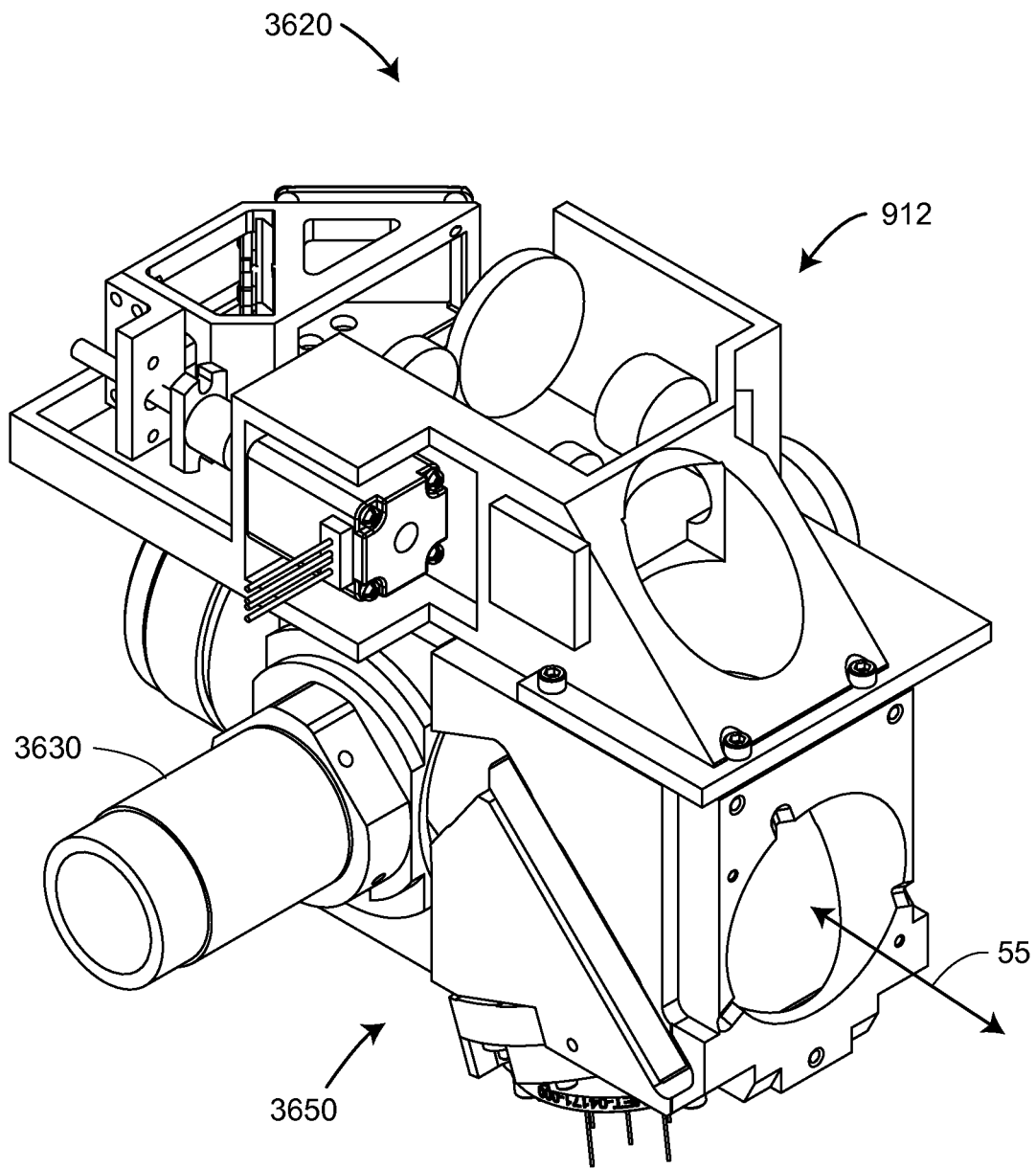
FIG. 17 is a perspective view of a zenith shaft, an optics bench, and a second optics assembly assembled together in accordance with an embodiment of the present invention.
Figure 18:
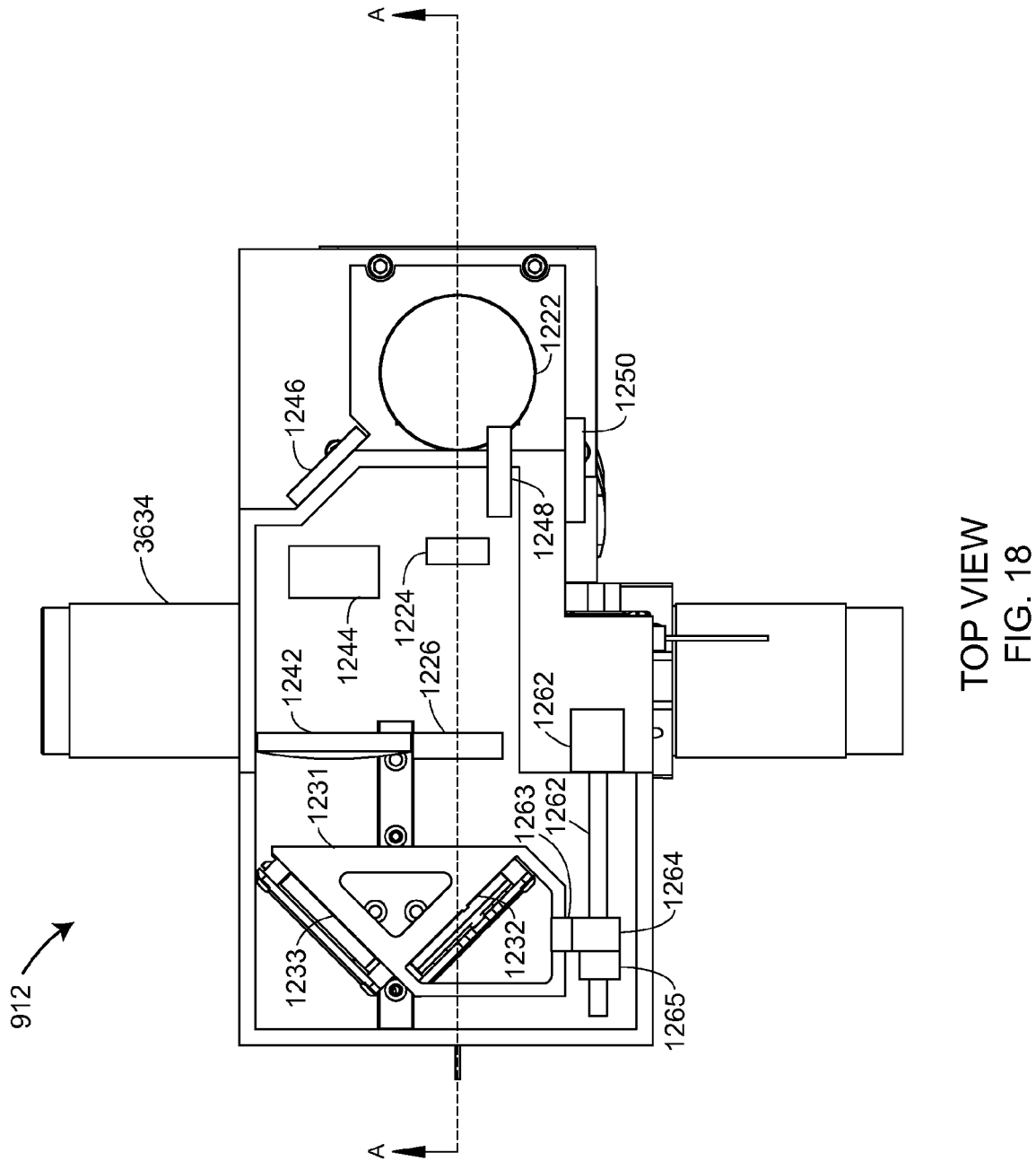
FIG. 18 is a top view of an orientation-camera optics assembly.
Figure 19:
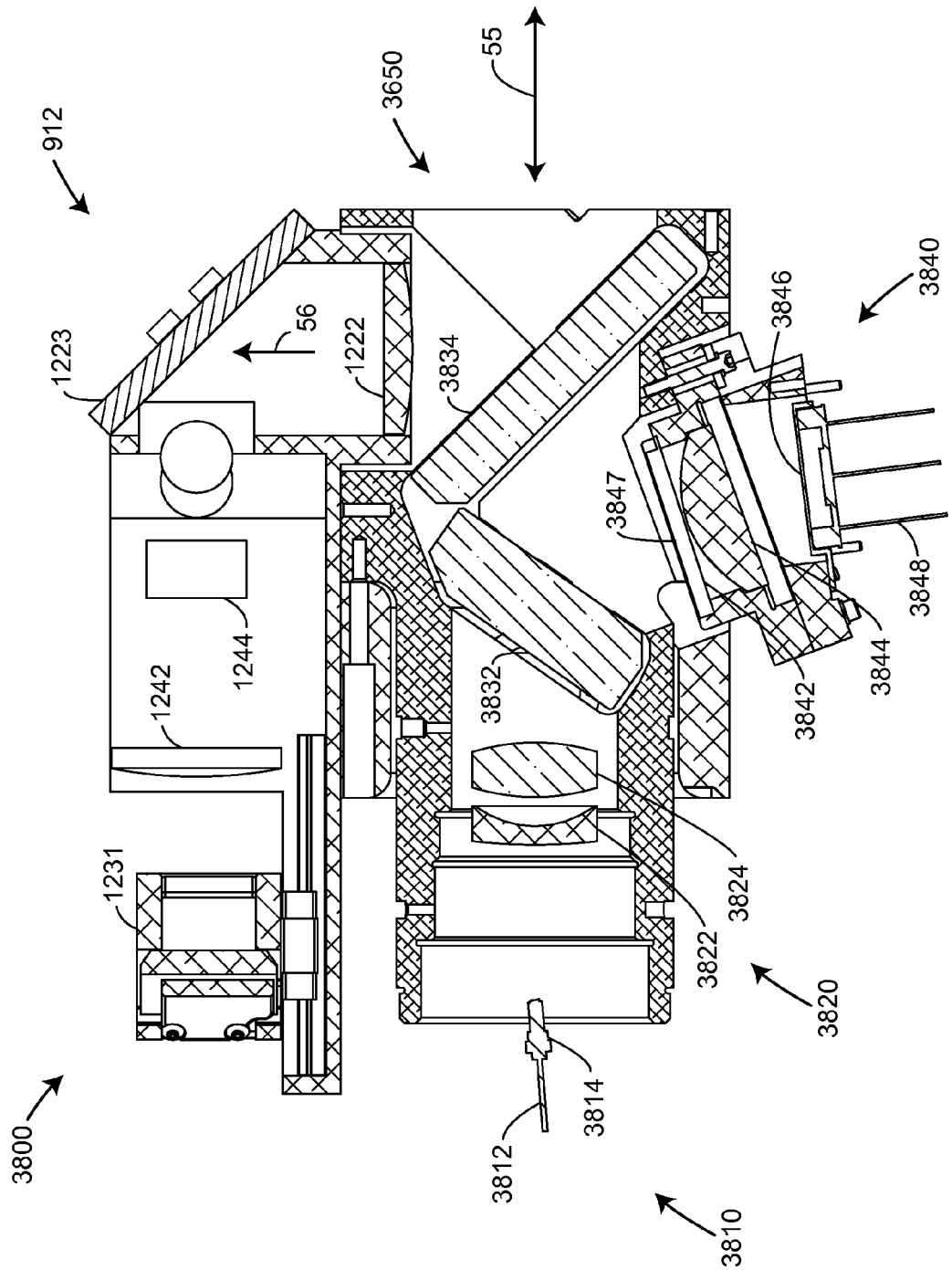
FIG. 19 is a cross-sectional view of an optics bench, an optics assembly, and a position detector assembly.

FIG. 17 shows an isometric view of an embodiment of the optics bench assembly 3620 and the zenith shaft 3630. The optics bench assembly 3620 includes the main optics assembly 3650 and secondary optics assembly 912. FIG. 18 shows a top view of the orientation camera of the secondary optics assembly 912. These elements were previously described with reference to FIG. 14. FIG. 19 shows a cross sectional view 3800 along line A-A of FIG. 18. In an embodiment, visible laser light is sent through an optical fiber 3812. The light source that puts light into the optical fiber, the fiber network (if any) over which the light is routed, and the optical fiber 3812 all rotate along with the optics bench assembly 3620. In an embodiment, the optical fiber 3812 includes a connector, which enables quick disconnect from the optical fiber originating at the light source. If the light source provides visible light, then the light can serve as both a pointer beam visible to an operator and as a measurement beam that can be used for measurements of distances, angles, and the like. The laser light is launched from a ferrule 3814, which may be mechanically adjusted to point the laser beam in the desired direction. In an embodiment, the ferrule 3814 and the face of the fiber held by the ferrule and polished at an angle of approximately 8 degrees to reduce backreflection of light in the optical fiber. The ferrule is adjusted to cause the beam emitted by the optical fiber to travel parallel to the central axis 55 of the mating tube 3622. The cross sectional view 3800 shows that light from the ferrule 3814 passes through lenses 3822 and 3824 in this case, although many different lens arrangements could be used. The light passes through beam splitter 3832 and beam splitter 3834 out of the tracker to a retroreflector target (not shown). On the return path from the retroreflector target, some of the light reflects off the beam splitter 3834, passes through lens 1222, reflects off mirror 1223 and continues through a variety of optical elements as explained hereinabove with reference to FIG. 14. The rest of the light passes though beam splitter 3834 and travels to beam splitter 3832, where some of it reflects, travels through optical diffuser/filter 3847, through lens 3844, and strikes position detector 3846. The light may also pass through an aperture placed between the lens 3844 and the position detector 3846. The purpose of such an aperture is to block ghost beams. In this case, the position detector is moved farther from the lens 3844 so that the aperture can be placed at a focal position of the beam of light (as shown in FIG. 6E). In an embodiment, the position detector 3846 is tilted so as to cause the backreflected light to be reflected at an angle, thereby reducing the chance that light reflected off the surface of the position detector 3846 will bounce off another surface (for example, the surface of an aperture/spatial filter 157) and return to the position detector. Position detector leads 3848 are attached by means of pass-through sockets (not shown) to a circuit board (not shown) that rotates with the optics bench assembly. Pass through sockets are spring loaded sockets that allow electrical connection to be made without soldering components. These sockets are advantageous because they enable the optics bench to be easily removed and replaced in a quick repair operation. The light that does not travel to the position detector 3846 continues through beam splitter 3832, optical elements 3824, 3822, which focuses it into the optical fiber 3812 within the ferrule 3814.

Figure 20:
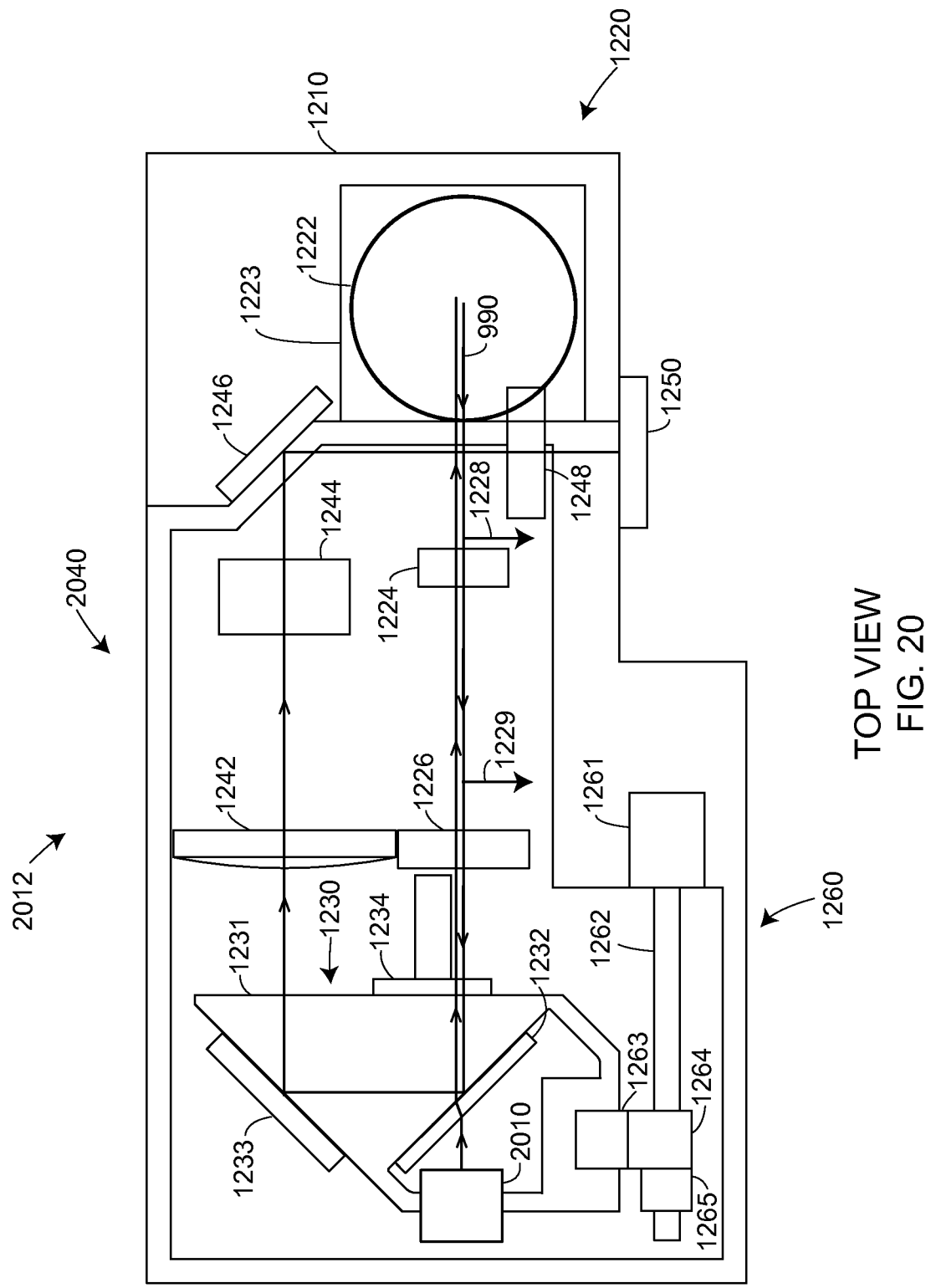
FIG. 20 is a top view of an orientation camera that includes an integrated illuminator according to an embodiment of the present invention.

FIG. 20 shows an orientation camera 2012 that is like the orientation camera 912 of FIG. 14 except that the orientation camera 2012 includes an illuminator 2010. The illuminator 2012 projects a beam of light through the beam splitter 1232 along the optical axis and passing through the afocal lens assembly toward the retroreflector. In an embodiment, the illuminator 2012 is stationary and is not moved by the actuator assembly 1260.

Figure 21:
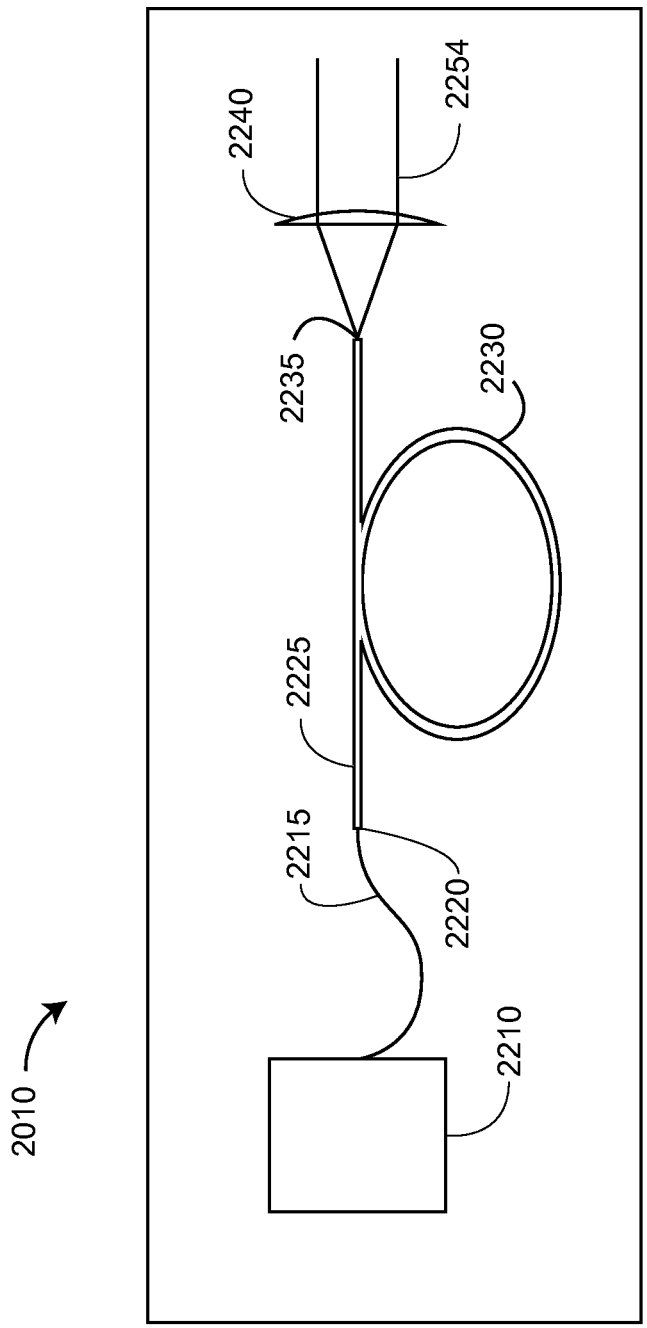
FIG. 21 is a block diagram showing elements included in the integrated illuminator according to an embodiment of the present invention.

FIG. 21 shows an embodiment of the illuminator 2010. A light source 2210 may be a superluminescent diode (SLD), which has reduced coherence compared to a laser. In another embodiment, the light source is a light emitted diode (LED). The reduced coherence length of an SLD or LED relative to a laser is the result of the relatively larger linewidth of the SLD or LED. A benefit of the reduced coherence length is a reduction in speckle and a reduction in unwanted diffraction effects, which results in clearer and less noisy images of marks on the illuminated retroreflector.

In an embodiment, the SLD light source 2210 is transmitted through a single mode fiber 2215. The SLD light emerges from the single mode fiber with a cross sectional irradiance profile that is approximately Gaussian in shape. In an embodiment, the single mode fiber is attached to a multimode fiber 2225, which is a fiber having a larger core diameter enabling it to support multiple transverse modes of the SLD light. In an embodiment, the single mode fiber and multiple mode fiber are butt coupled (adjoined with each fiber having perpendicular cuts) at a coupling location 2220. The length of the multimode fiber includes a length 2230 sufficient to allow the profile of the beam to evolve from Gaussian to approximately flat-topped. A flat topped beam is a beam having approximately equal optical power per unit area over a specified region, which in this case is an area that is approximately circular.

To increase the uniformity of the beam, the light projected from the light source 2210 through the beam splitter 2210 may be sized to overfill the lens 1226, thereby selecting the centermost and flattest part of the beam. After reflecting off the beam splitter 3834 (as shown in FIG. 19), the beam of SLD light passing out of the laser tracker may be collimated or it may be diverging. If the SLD light 2254 passes through an afocal lens assembly before passing out of the tracker, the light will be collimated in leaving the tracker if it is collimated when it passes through the beam splitter 3834. To obtain such collimated light, the lens 2240 of FIG. 21 is placed a distance equal to the lens focal length away from the end 2235 of the multi-mode fiber 2225. If the SLD light 2254 passes through an afocal lens assembly before passing out of the tracker, the light will be diverging if the fiber end 2235 is placed slightly nearer the lens 2240 than the focal length of the lens.

Other types of light besides SLD light may be used. Laser light and LED light, for example, are other possible choices. In the case of an LED light source, the LED may be directly butt coupled to a multimode fiber. In most cases, it is a good idea to project a different wavelength of light from the illuminator than from the 3D measuring device. This ensures that the light returned to the photosensitive array is reflected from a region of relatively uniform illumination over the entire retroreflector. It also ensures that noise effects, for example, resulting from speckle and diffraction, are minimized.

Methods are known, for example in patents '758, '014, and '072 referenced hereinabove, in which marks placed on an illuminated cube-corner retroreflector are imaged by a camera. The characteristics of the imaged marks are evaluated by a processor to determine the three orientational degrees of freedom of the retroreflector. The cube-corner retroreflector may be of the "open-air" type that has the three mutually perpendicular reflectors in contact with air, or it may be of the "glass prism" type that has three mutually perpendicular surfaces of the glass prism coated to be reflective. In either case, one type of mark that may be placed on a cube corner retroreflector is at the lines of intersection between adjacent reflective planes. For the case of a glass prism, additional marks may be placed on the front face of the glass prism. For the case of an open-air cube-corner retroreflector, a wire of similar element may be stretched near the retroreflector front face to produce a line.

Measurement error may increase because, at relatively large angles of tilt, the intersection lines are less sensitive in determining tilt. They may also increase because, at relatively large angles of tilt, some of the lines on the front face of a cube corner retroreflector may disappear from the camera image. In some cases, front-surface lines and intersection lines may overlap in an image, making proper interpretation difficult.

As explained hereinbelow, these sources of error may be reduced by combining front-face and intersection marks. FIG. 22A shows a cube-corner retroreflector in a 3D Cartesian frame of reference. A first octant 1905 of a 3D Cartesian frame of reference extends from the origin 1910 in the positive x, y, z directions. The three planes x-y, y-z, and z-x are mutually perpendicular and serve as sides of the cube-corner retroreflector. The sides extending from the vertex (origin) 1910 are of equal length, forming glass cube-corner prism. The fourth face of the cube corner, which is not in contact with the vertex 1910, is the front face 1920. A vector r 1925 extending in a perpendicular direction from the vertex to the front face of the prism is symmetric with respect to the axes x, y, z. In most cases, such prisms are formed into a cylindrical shape 1915 by grinding away a portion of the glass to produce cylindrical glass cube-corner prism 1930.

Figure 22B:
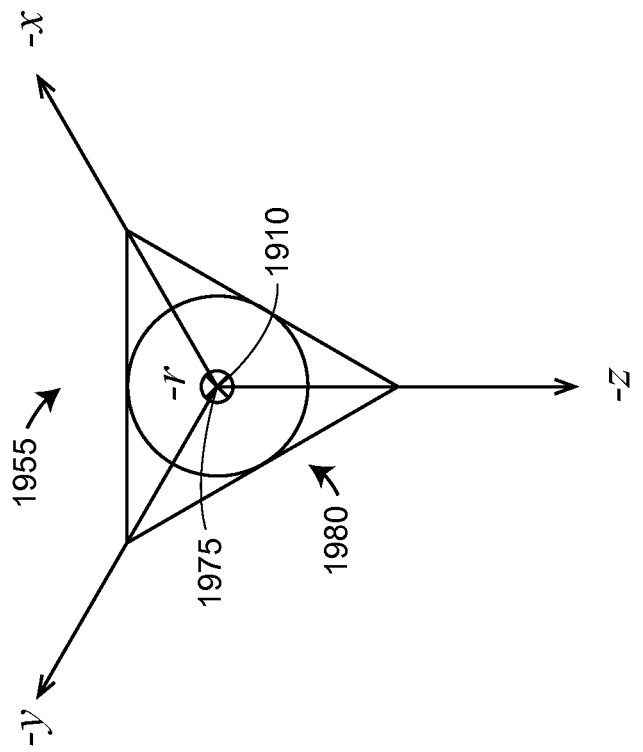
FIGS. 22A and 22B show an orthographic geometrical model of a glass cube corner in two opposing octants.
Figure 22A:
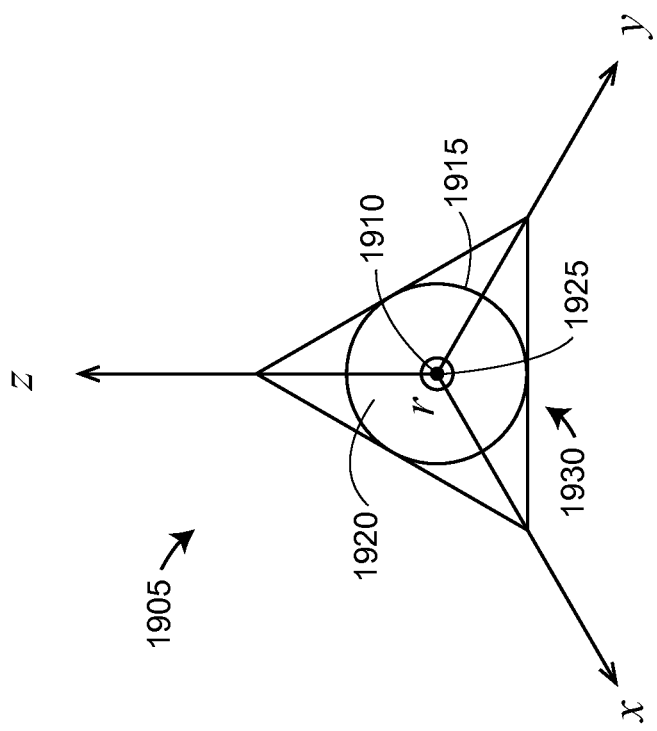

FIG. 22B shows the octant 1955 directly opposite the octant 1905 of FIG. 22A. The octant 1955 occupies a volume extending from the origin 1910 in the −x, −y, −z directions. A cylindrical cube-corner prism 1980 is formed in the same manner as the prism 1930 in FIG. 22A and sits directly opposite the cube-corner prism 1930. A vector −r 1975 extending in a perpendicular from the vertex to the front face of the prism 1980 is symmetric with respect to the axes −x, −y, −z.

Figures 23A, 23B:
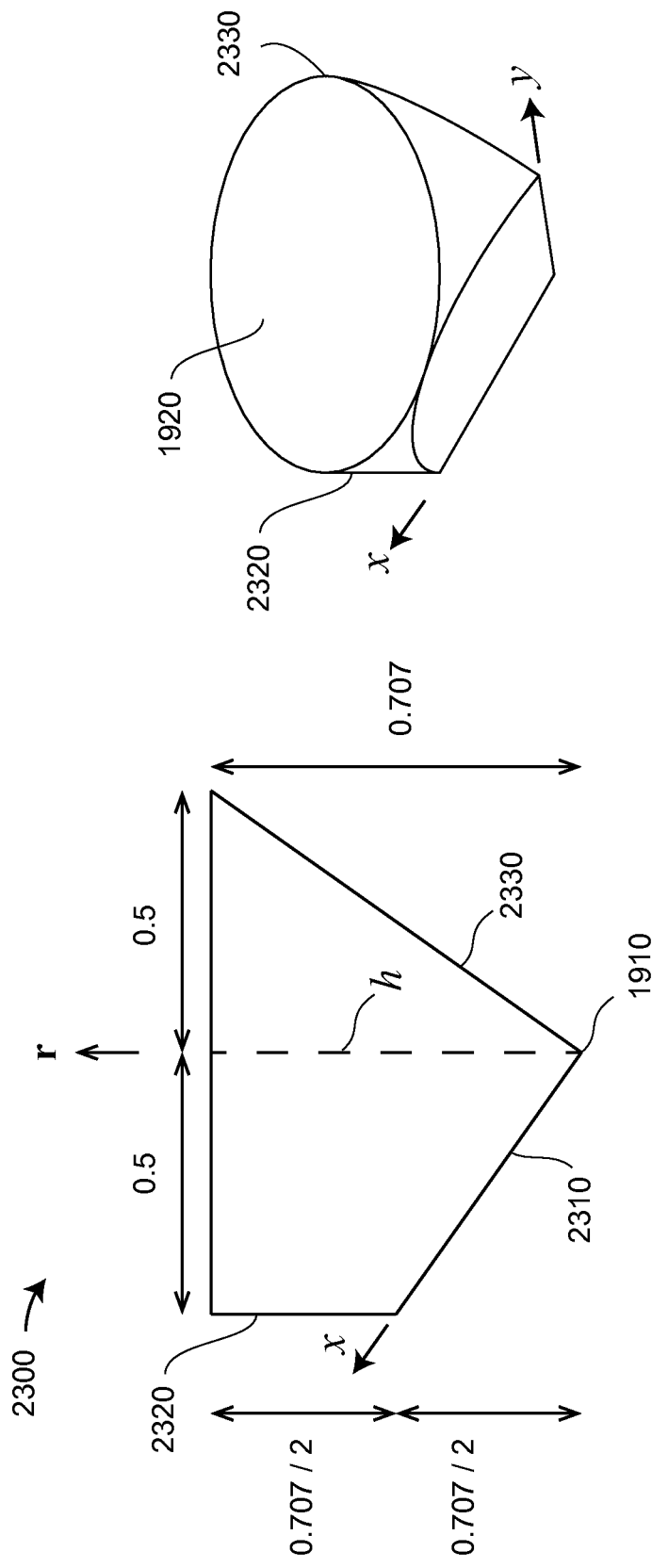
FIGS. 23A and 23B are a cross-sectional view of the glass cube corner and a perspective view of the glass cube corner, respectively.

FIG. 23A shows a slice taken through the x-r plane of FIG. 22A. The diameter of the cylinder 1915 is taken, for scaling purposes, to be 1. A perpendicular drawn from the vertex 1910 to the front face 1920 has an altitude h equal to 0.707. The altitude falls directly in the center of the cylinder. The grinding away of the glass in the prism goes half way down the cylinder at the x axis to a height of 0.707/2. The portion of the x axis on the prism is the intersection line segment 2310. As can be seen from FIG. 22A, the line 2330 goes through the x-r plane and is opposite the x axis. The line 2330 bisects the y and z axes on the y-z plane and, if the prism is not ground into the cylindrical shape, the line 2330 extends all the way to the front face 1920. The grinding of a cube corner into a cylindrical shape produces the scalloped effect of the prism in FIG. 23B.

Figure 24:
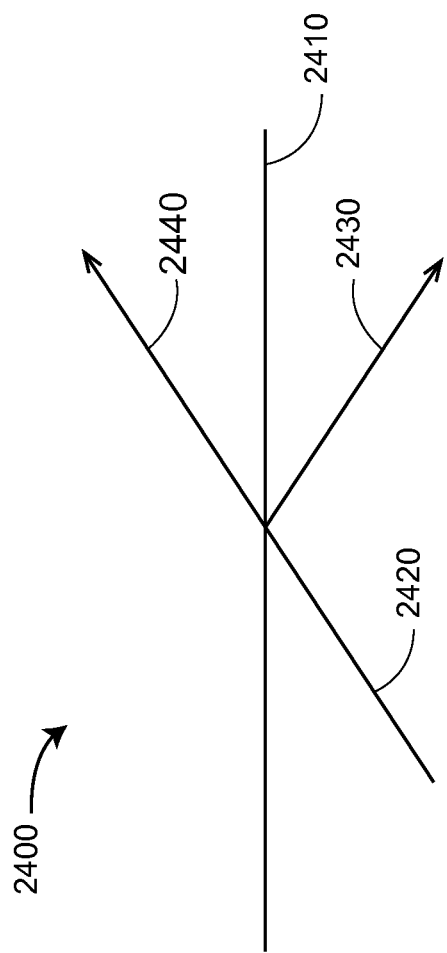
FIG. 24 is a drawing showing a method of evaluating optical reflections.

In a cube-corner retroreflector, light that enters the front face of the prism reflects off three different reflector surfaces before exiting the front face of the prism, thereafter traveling in a direction opposite that of the incoming light. A method from geometrical optics that may be used to analyze the reflection of light off a single surface is shown in FIG. 24. An incident ray of light 2420 strikes a reflecting surface 2410 and reflects at an angle 2430. It can be shown that this reflection is equivalent to the light continuing to travel straight through the reflective surface 2410 as long as a reflection of the light 2440 is performed afterwards to obtain the actual reflected light 2430.

Figure 25:
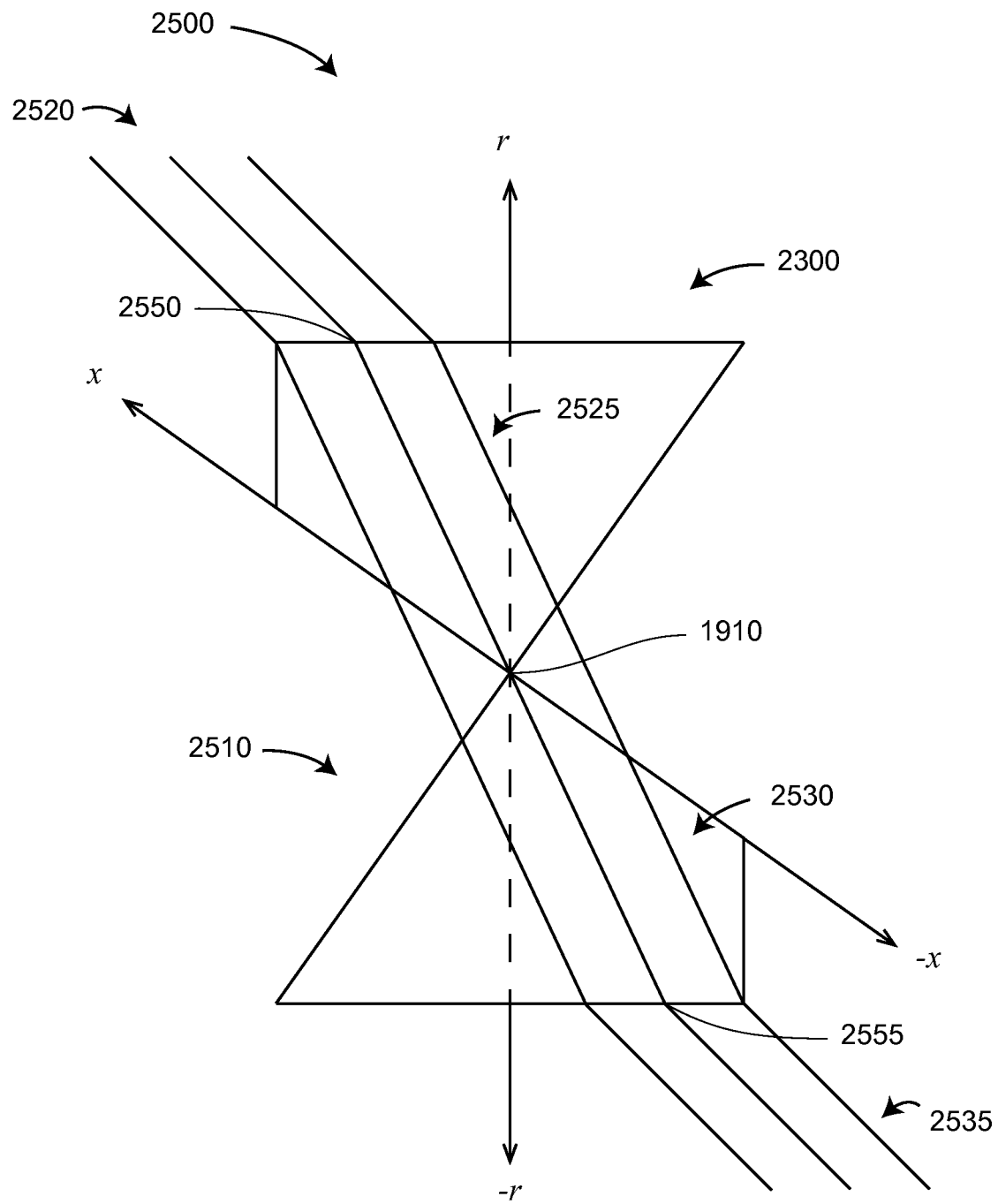
FIG. 25 is a cross-sectional view of light passing through glass cube-corner cross sections in two opposing octants.
Figure 26:
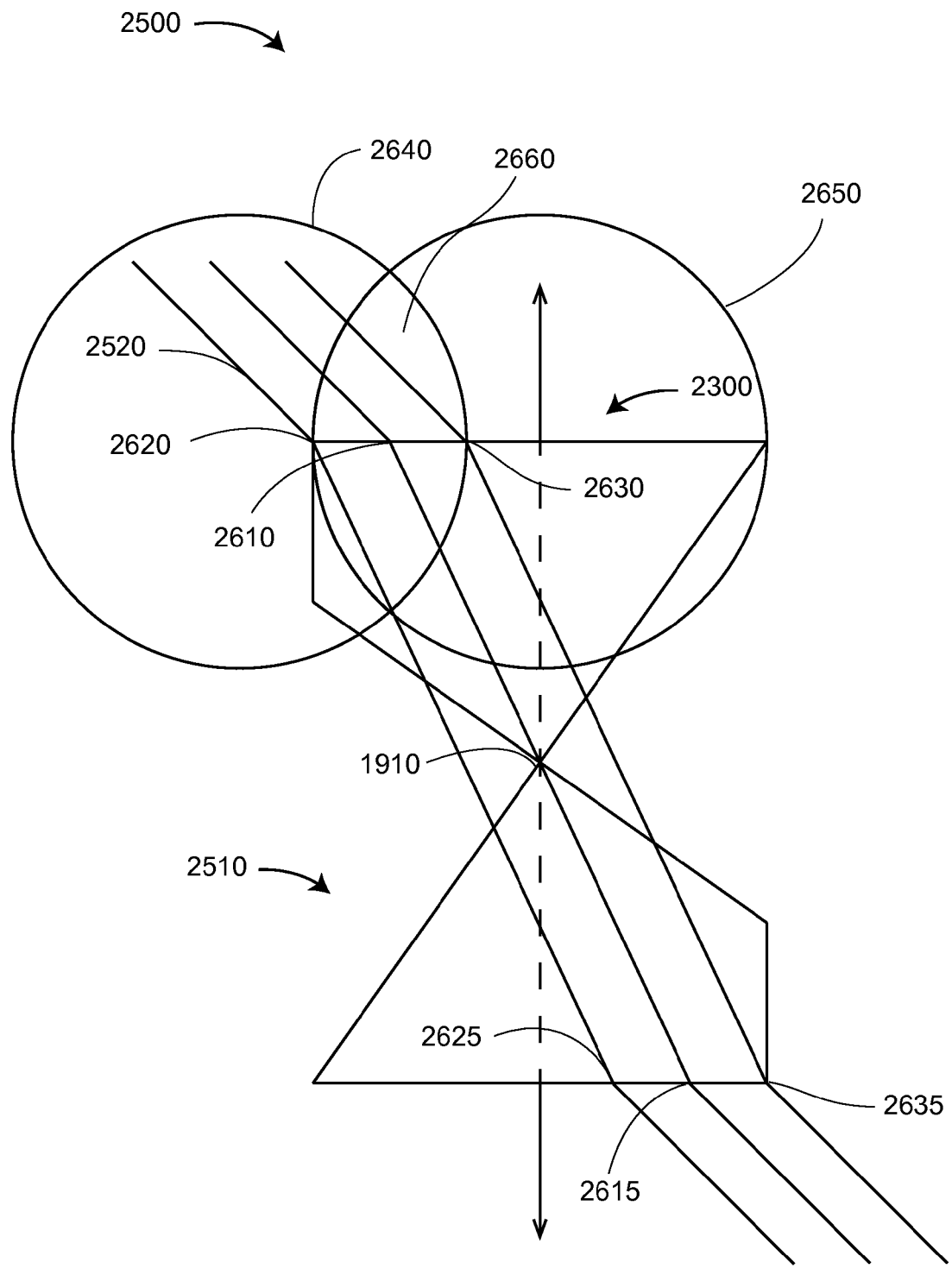
FIG. 26 is a diagram showing how a top view of front faces in two opposing octants indicates a reflected pattern.

A ray of light that enters a cube-corner retroreflector reflects off three surfaces before exiting the cube corner. The exiting ray of light travels parallel to and in the opposite direction of the incoming ray of light. It can be shown mathematically that the three reflections are equivalent to a direct propagation into the eighth octant, as shown in FIG. 25. As in FIG. 24, the rays that travel into octant 1955 of FIG. 22B are directly related to the actual reflected rays. In the case of the cube-corner retroreflector, an exiting ray is directly opposite a ray in the quadrant 1955. By using this mathematical construction, the mathematical analysis of the resulting retroreflected pattern of light seen by a camera at the laser tracker is greatly simplified.

FIG. 25 shows a cross-section 2500 of the glass prisms 1930, 1980 in the octants 1905, 1955 in FIGS. 22A, 22B. The cross section is taken through the axes x, −x, r, −r. Light 2520 enters the front face of the cube-corner prism 2300. Light 2530 continues through the second cube-corner prism 2510 and exits the front face as light 2535. The light 2520 that enters the front face of the prism 2300 at the surface point 2550 passes through the vertex 1910 and exits the front face of the prism 2510 at the point 2555. The points 2535 and 2555 are the same distance from the center of the front faces through which they pass. Only those rays of light that pass through the front face of the prisms 2300 and 2510 may be seen by the camera. The circle 2650 represents a top view of the cube corner prism 2300. The curved left edge of the front face of this prism is illuminated by the light 2520. The light that illuminates the rightmost part of the prism 2300 is lost because it does not pass through the front face of the prism 2510. For example, the ray of light 2620 on the edge of the front face of the prism 2300 passes through a central region of the front face of the prism 2510 and hence represents a ray that will be reflected. The reflected ray, represented the point 2630 on the front face of prism 2300, lies on opposite side of the point 2610. The distance from the point 2620 to the point 2610 is equal to the distance from the point 2610 to the point 2630. The situation is similar for the ray passing through the point 2630, which passes the edge of the front face of the prism 2510 at the point 2635.

The resulting region of cube-corner illumination, which will be viewed by an observed or a camera as a bright region, is the region 2660. The front face of the prism 2300 is an illuminated circle viewed at an angle by an observer. It can be shown that a tilted circle is an ellipse. Hence an observer or a camera aligned with the direction of the light 2520 will see the front face of the prism 2300 as an ellipse. The front face of the prism 2510 is represented by the circle 2640, which when viewed by an observer at an angle, appears as an ellipse. The point 2610 is in the center of the "eye" shaped region that encompasses the overlap of the circles 2640 and 2650.

Figure 27:
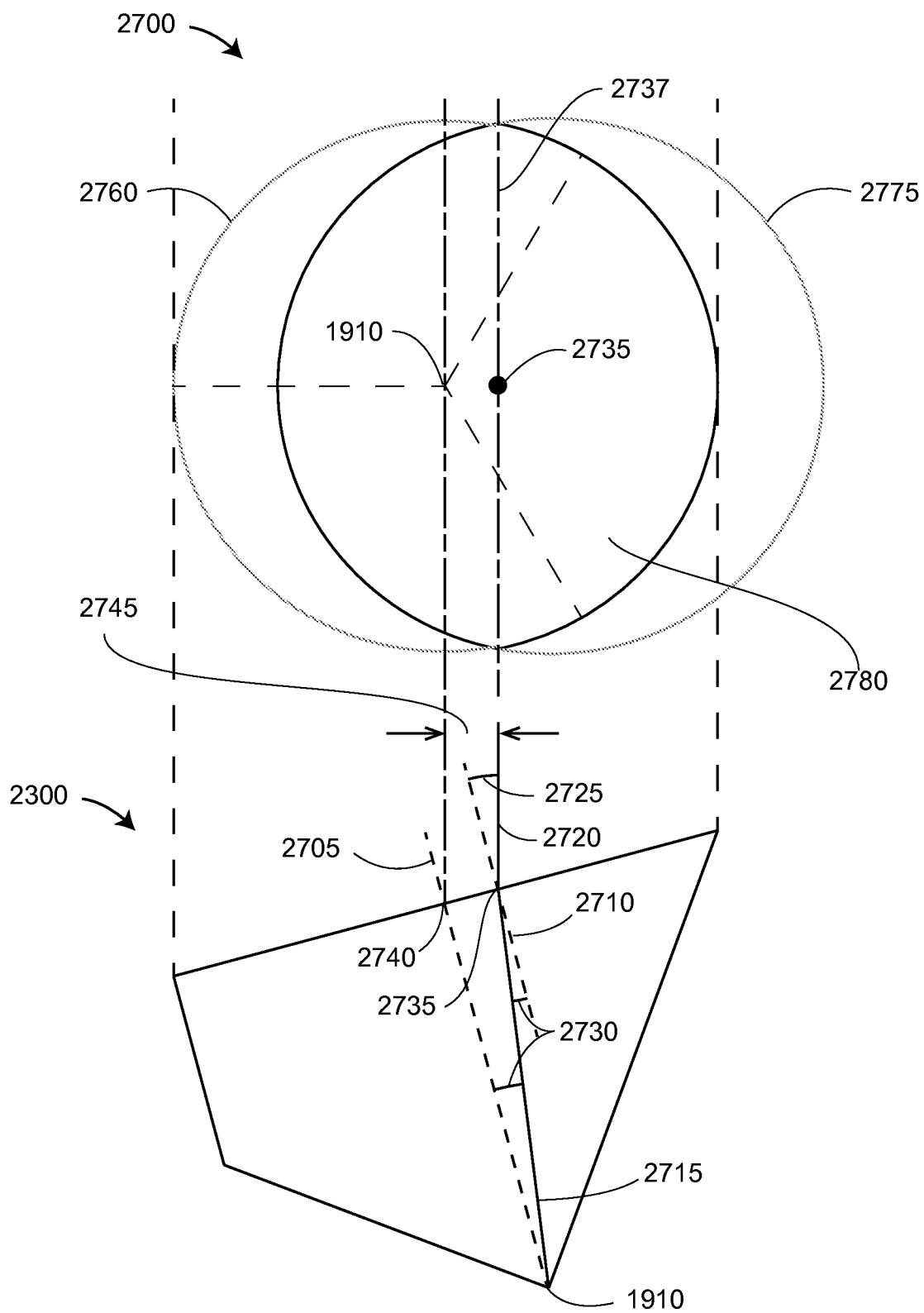
FIG. 27 shows that the separation distance between a central intersection point and a center of a front face is a sensitive indicator of tilt.

The upper portion of FIG. 27 shows an ellipse 2760 corresponding to the view of the front face of the prism 2300 that will be seen by an observer for the prism tilted at an angle of 2300. A cross-sectional side view of the tilted prism in the lower portion of FIG. 27. The ray of light 2720 enters the prism at a point 2735 on the front face. The ray of light 2720 has an angle of incidence 2725, which is taken with respect to a normal 2710 to the front face. Entering the glass, the refracted ray of light 2715 bends toward the normal to an angle 2730. The angle of bending of the light may be determined using Snell's Law, which in one form states that for a glass having an index of refraction n and an angle of incidence a, the angle of refraction b is equal to b=arcsin(sin(a)/n). In this instance, the angle of incidence is a=15 degrees. If the index of refraction of the glass is n=1.78, the angle of refraction is b=8.4 degrees. Because of refraction, the ray of light that intersects the vertex 1910 crosses the front face of prism 2300 at the point 2735, referred to as the central intersection point. The dashed lines in the ellipse 2760 represent the lines of intersection of the reflector planes as projected perpendicular to the front face. These lines converge at the center 2740 of the front face.

The change from a circle to an ellipse in the top view of FIG. 27 is small and perhaps difficult to detect by eye. However, the change in the position of the center of the front face 2740 relative to the central intersection point 2735 is much larger and may be easily seen by eye. This size of the ellipse along the direction of its minor axis changes from the diameter value by only 1−cos(15°)=0.034, or about 3% of the diameter. In contrast, for an altitude h and diameter D, the central intersection point moves by an amount equal to h sin(15°)=0.707D sin(15°)=0.18D, or about 18 percent of the diameter. Hence a good strategy for getting accurate results when adding marks to the front face of a cube corner retroreflector is to ensure that the marks are put on in such a way as to include, at least implicitly, information related to the separation parameter 2745, the separation parameter being the distance from the center 2740 of the front face to the central intersection point 2735.

Figure 28A:
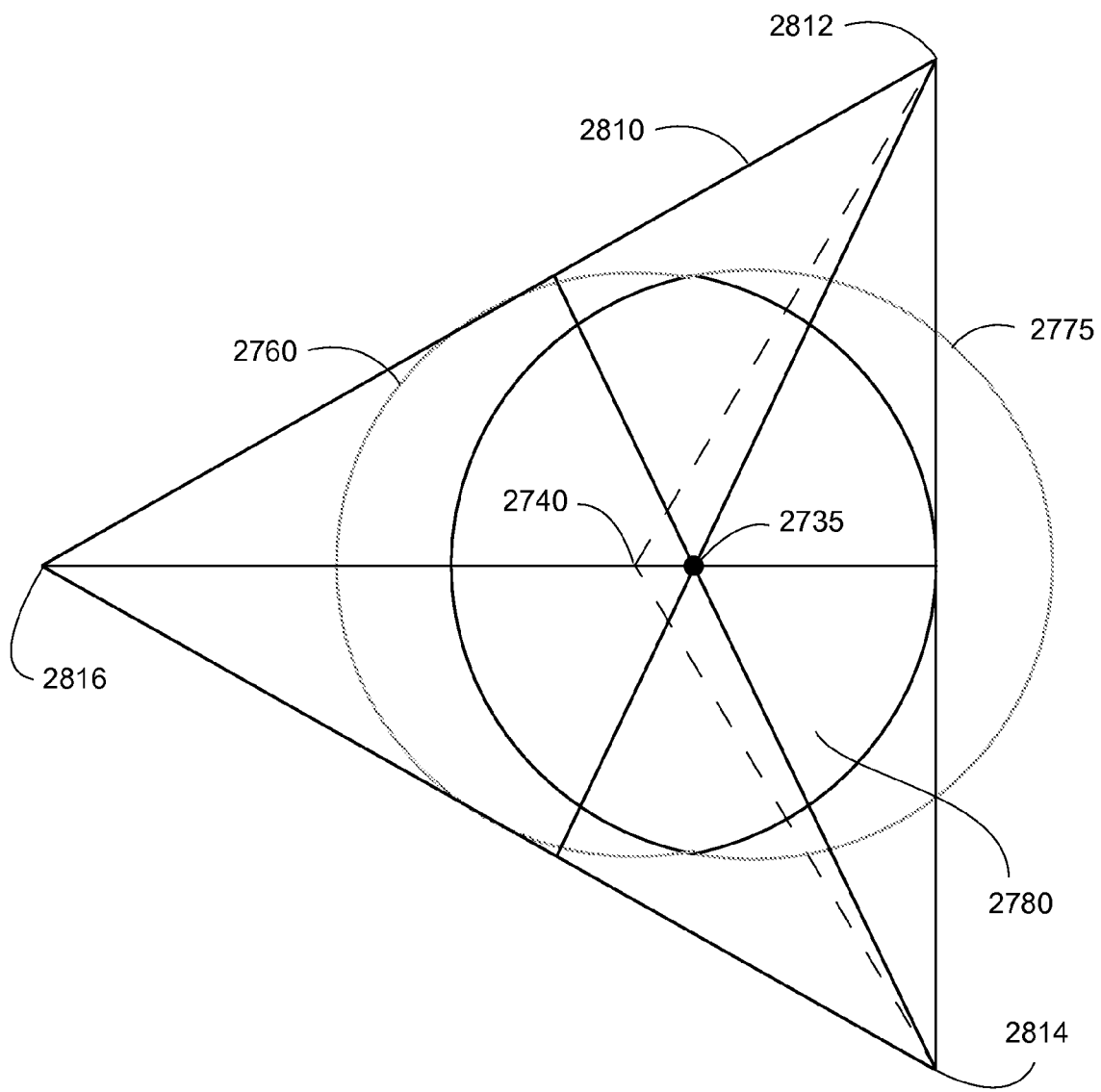
FIGS. 28A and 28B indicate a geometrical method for determining the appearance in a camera image of intersection lines of a glass cube-corner retroreflector.

A method for determining orientation angles disclosed in patents '758 and '014 is through the evaluation of marked intersection lines. One way to determine, from geometrical considerations, the appearance of the intersection lines in an image is to extend the cube-corner until the intersection lines meet at the end points 2812, 2814, 2816, as shown in FIG. 28A. This figure shows an ellipse 2760 representing the front face of a glass cube corner illuminated by light. The corresponding ellipse for the opposing octant 2775 is spaced so as to place the central intersection point 2770 in the center of the eye 2780 that encloses the two elliptical segments. The perpendicular projections of the intersection lines, which are dashed lines in FIG. 28A, converge at the center 2740 of the front face. The cube corner is extended until the intersection lines cross at the level of the front face at the end points 2812, 2814, 2816. The three planar reflectors of the cube corner with the extended intersection lines circumscribe the cylindrical prism 2760. As viewed through the glass prism, the intersection lines meet at the central intersection point 2770. The end points 2812, 2814, 2816 of the intersection lines, however, are in air, and therefore are not refracted. Hence, the expected pattern of glass cube-corner intersection lines in an image can be found by drawing a line that crosses both the central intersection point and an end point as shown in FIG. 28A.

Figure 28B:
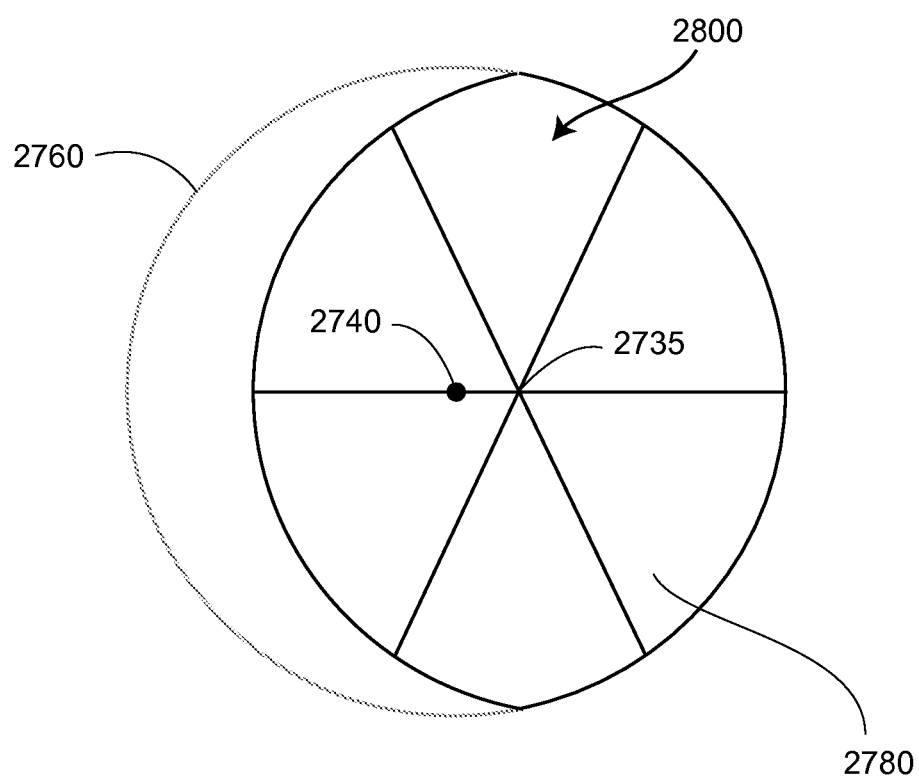

FIG. 28B shows the image of the intersection lines for a glass prism shaped into cylinder. It is obtained by removing the intersection lines of FIG. 28A outside the eye 2780. The ellipse 2760 is the elliptical outline of the front face of the cylindrical prism. The illuminated region 2780 encompasses only a portion of the front face. The central intersection point 2735 is easily found from the three intersection lines, but the location of the center 2740 of the front face 2760 is not easily found from the image of FIG. 28B.

Figure 29B:
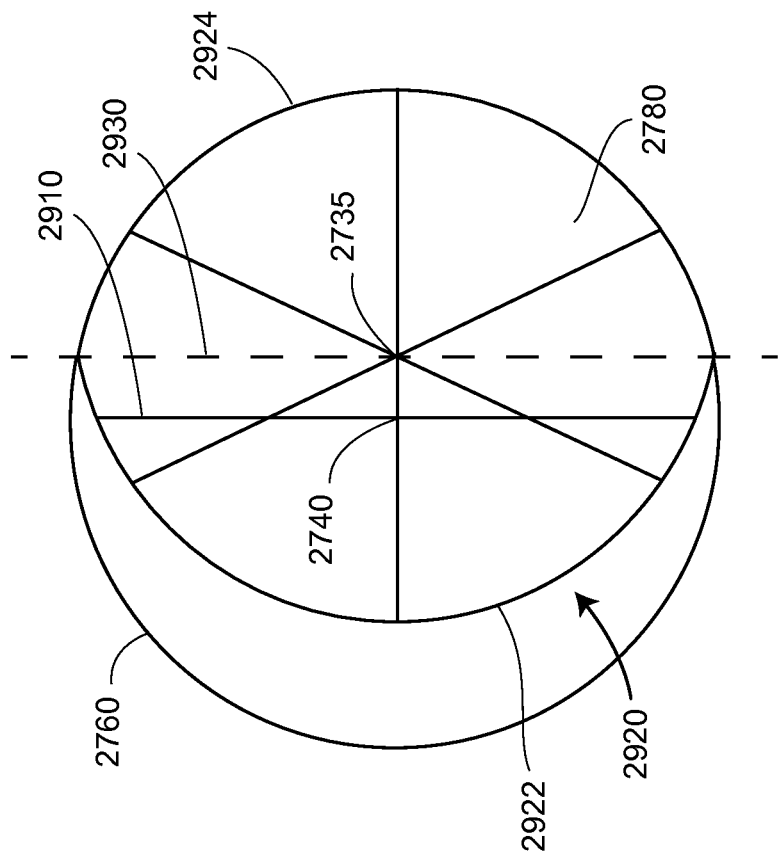
FIGS. 29A and 29B show a method for determining a separation distance by adding a line to the front face.
Figure 29A:
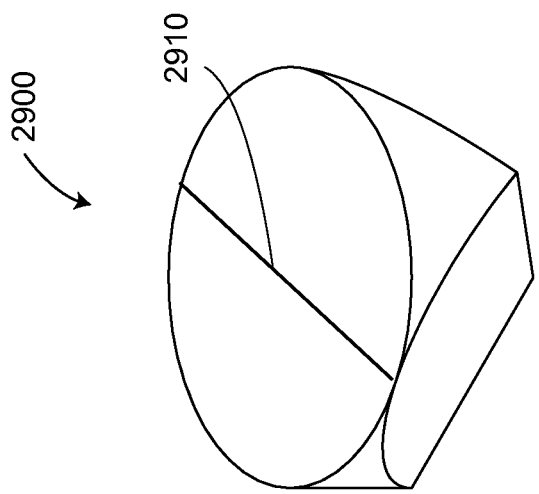

One way to mark the position of the center 2740 of the front face 2760 of a prism 2900 is to place a non-reflective mark 2910 on the front face as shown in FIGS. 29A, 29B. When an observer views the glass prism tilted at an angle, the line 2910 is shifted relative to the central intersection point 2735, enabling the center 2740 of the front face to be found. Note that the illuminated region of the retroreflector that is seen in the image in the tracker orientation camera is that region of the "eye" 2920, which is bounded on one side by a first elliptical line segment 2922 and on the other side by a second elliptical line segment 2924. Referring to FIG. 27, it can be seen that the second elliptical line segment 2924 corresponds to an outer surface of the retroreflector closer to the camera, and the first elliptical line segment 2922 corresponds an image of the first elliptical line segment 2922 about a fold axis 2930 that passes through the imaged intersection 2735 of the three intersection lines. The fold axis 2930 corresponds to the fold axis 2737 in FIG. 27.

Figure 30:
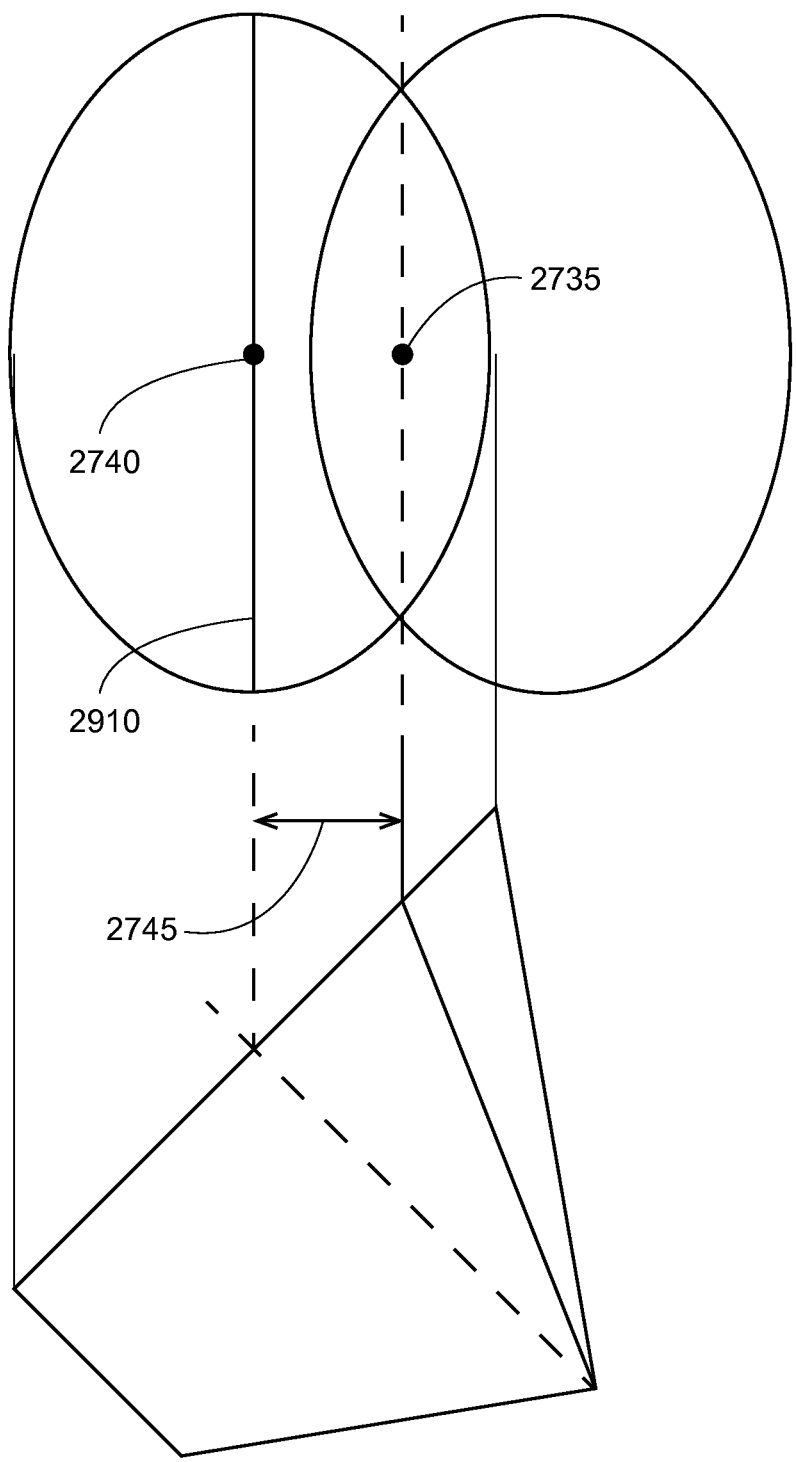
FIG. 30 shows a limitation of the method of FIG. 29.

A limitation of this approach is shown in FIG. 30. A glass prism is tilted by an angle of 45 degrees. In this case, the line 2910 that is aligned to the center 2740 of the front face is shifted off the illuminated eye region, thereby eliminating the usefulness of the mark 2710. Another way of saying this is that the separation parameter 2745 is too large in this case.

A first way to obtain the separation parameter from the image is to observe the outer edges of eye 2920. Because the outer edges of the eye are formed by two elliptical segments that shift by a relatively large amount with tilt of the retroreflector, changes in the positions of the elliptical eye segments and in the width of the eye provide a sensitive measure of the tilt angle and of the direction of the fold axis 2930.

Figure 31B:
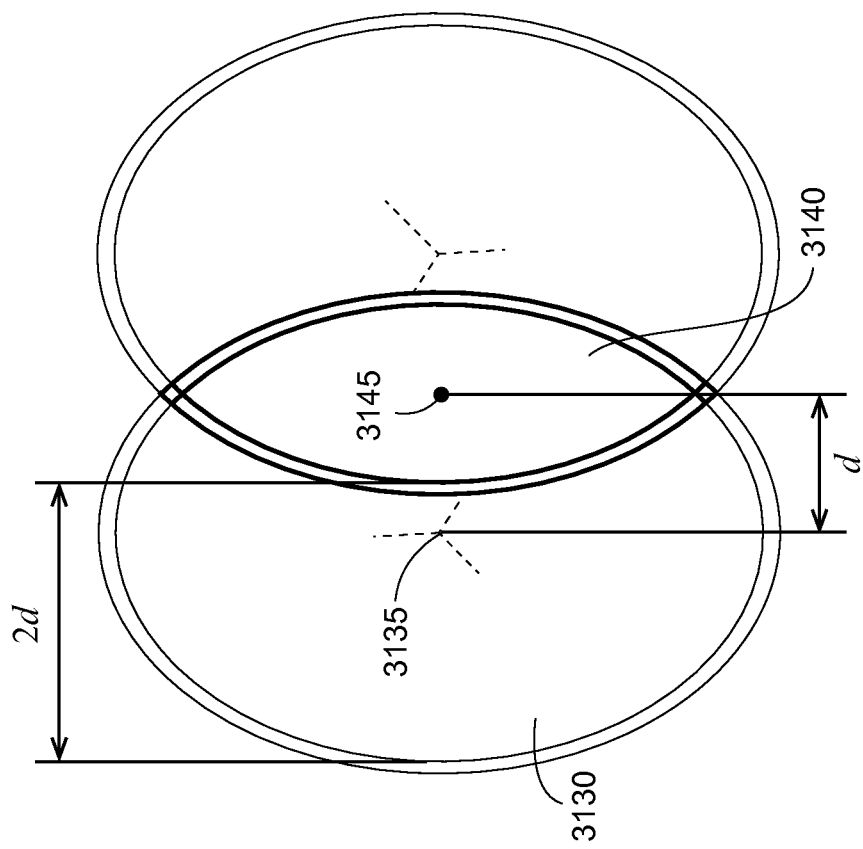
FIGS. 31A and 31B show a ring placed around the periphery of a cube-corner prism and a method of determining the separation parameter using this pattern, respectively.
Figure 31A:
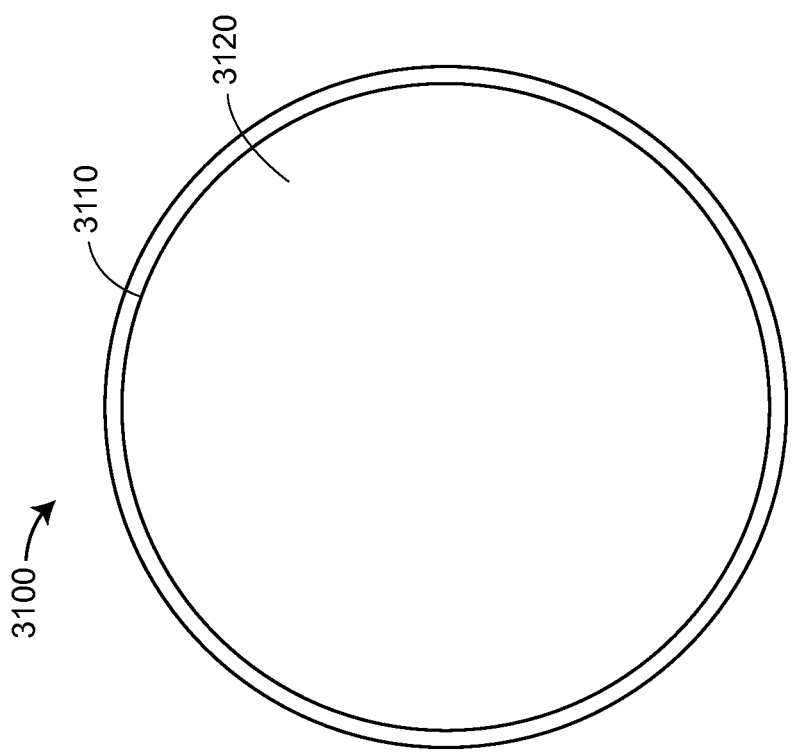

A way to implicitly embed the separation parameter into the image is to place a non-reflective circular ring 3110 around the periphery of the front face 3120 of a glass cube-corner prism 3100 as shown in FIG. 31A. FIG. 31B shows how an observer aligned with the light source would see the front face 3130 of a fully illuminated prism tilted by 45 degrees. The center of the front face is the point 3135, the central intersection point is 3145, and the separation distance is d. Using image processing, the portion of the non-reflecting ring on the left side may be shifted a distance 2d to fit onto the other side of the full ellipse. By noting the curvature of the ellipse, this fitting may be performed to obtain the separation parameter d. In many cases, the separation parameter d is not explicitly needed. Instead, a collection of lines (including curved lines) are all adjusted according to three selected orientation angle values until an optimization procedure has determined that a near optimum result has been achieved. An optimization procedure may involve calculating error in the fit of each imaged line obtained assuming particular orientation angle values. In an embodiment, these errors are squared for each of the lines (or the collection of points on the line) and summed together. In one type of optimization referred to as a least squared optimization these orientation angle values are adjusted to minimize the sum of squares.

The non-reflecting elliptical segments, either the outer edges of the eye 2920 or the circular ring 3110 or both, may also be used to quickly obtain a calculated value for the angle of tilt by taking the ratio of the width of the eye at the widest point to the width of the eye at the narrowest point. This ratio may be calculated for a variety of tilt angles. In an embodiment, these values may be stored in a lookup table or in a formula. In another embodiment, the elliptical segments are fit separately using a least-squares optimization procedure.

Although the circular ring 3110 is referred to herein as a ring, it should be noted that the term circular ring here is actually used to refer to an annulus having an outer diameter and an inner diameter. The annulus does not go all the way to the edge of the front face of the glass retroreflector prism but instead leaves a small gap to the first and second elliptical segments.

An advantage of using a non-reflecting ring pattern on the front face is that the rings are always present in any camera image as long as the front face is fully illuminated. Furthermore, there is symmetry to the pattern that enables not only the amount but also the direction of tilt to be determined. For example, if the image of FIG. 31B were captured by a camera sitting upright in a camera, then the pattern would indicate a side-to-side tilt often referred to as "yaw." If the pattern of FIG. 31B were rotated by 90 degrees, an up-down tilt often referred to as "pitch." A third type of orientational degrees of freedom is around the axis of symmetry r of the cube corner as shown in FIGS. 22, 23. This type of rotation is often referred to as "roll." The eye pattern of FIG. 31B does not on its own contain information about the roll of the cube-corner retroreflector. An alternative to pitch and yaw to describe orientation angles is the use of direction cosines. With this method, a frame of reference may be established with respect to the final steering head of the laser tracker. The laser beam from the laser tracker may represent a z axis, the zenith axis an x axis, and the axis perpendicular to the x and z axes a y axis. In an embodiment, the direction cosines are three values obtained by taking the cosine of the angle of the x, y, z axes of the laser tracker in relation to r vector of the cube corner prism. However, if the three direction cosines are a, b, c, it can be shown that $a^2+b^2+c^2=1$, so that only two of the three direction cosines are independent. There are many other alternative ways of describing rotation angles—for example, quaternions. These methods are well known in the art and are not discussed further.

Figure 32:
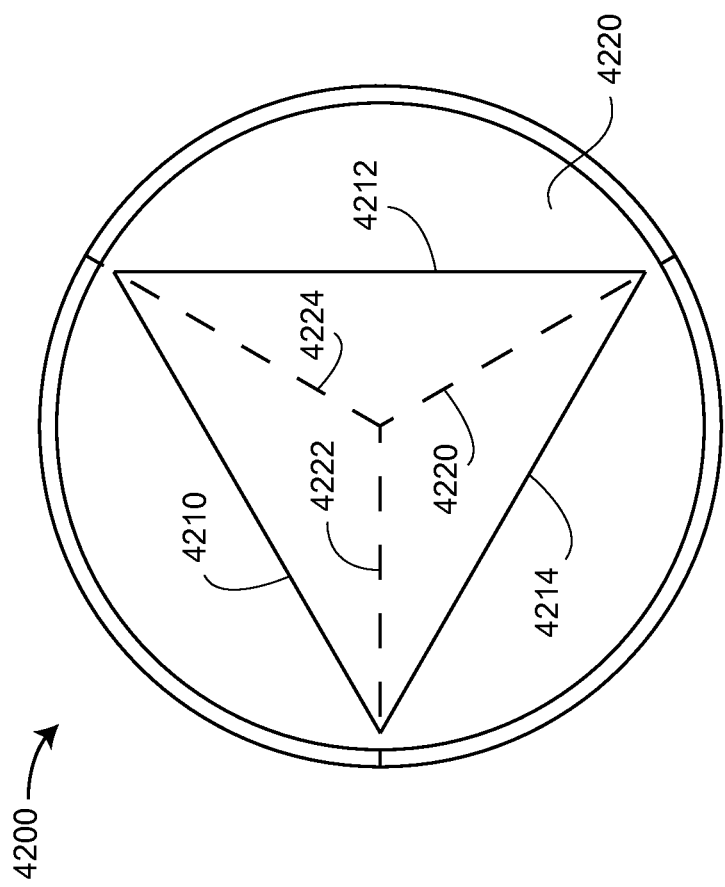
FIG. 32 shows a triangle placed on the front face.

As explained hereinabove with respect to FIG. 30, a line drawn near the center of a cube corner retroreflector may not be visible in a camera image for the case of the retroreflector tilted to a relatively large angle. A way to use straight lines to provide improved pitch and yaw angle determination as well as improved roll angle determination is shown in FIG. 32. Here the lines 4210, 4212, 4214 are configured to lie relatively close to the edges of the front face 4220 of the prism 4200. In an embodiment, the three vertices of the equilateral triangle formed by the lines 4210, 4212, 4214 lie directly over the intersection lines (dashed lines in FIG. 32) when seen from the top view. In the embodiment of FIG. 32, the lines on the front face 4210, 4212, 4214 are perpendicular to the intersection lines 4220, 4222, 4224, respectively. In other embodiments, other angles and positions are selected for the non-reflecting lines 4210, 4212, 4214.

Figure 33:
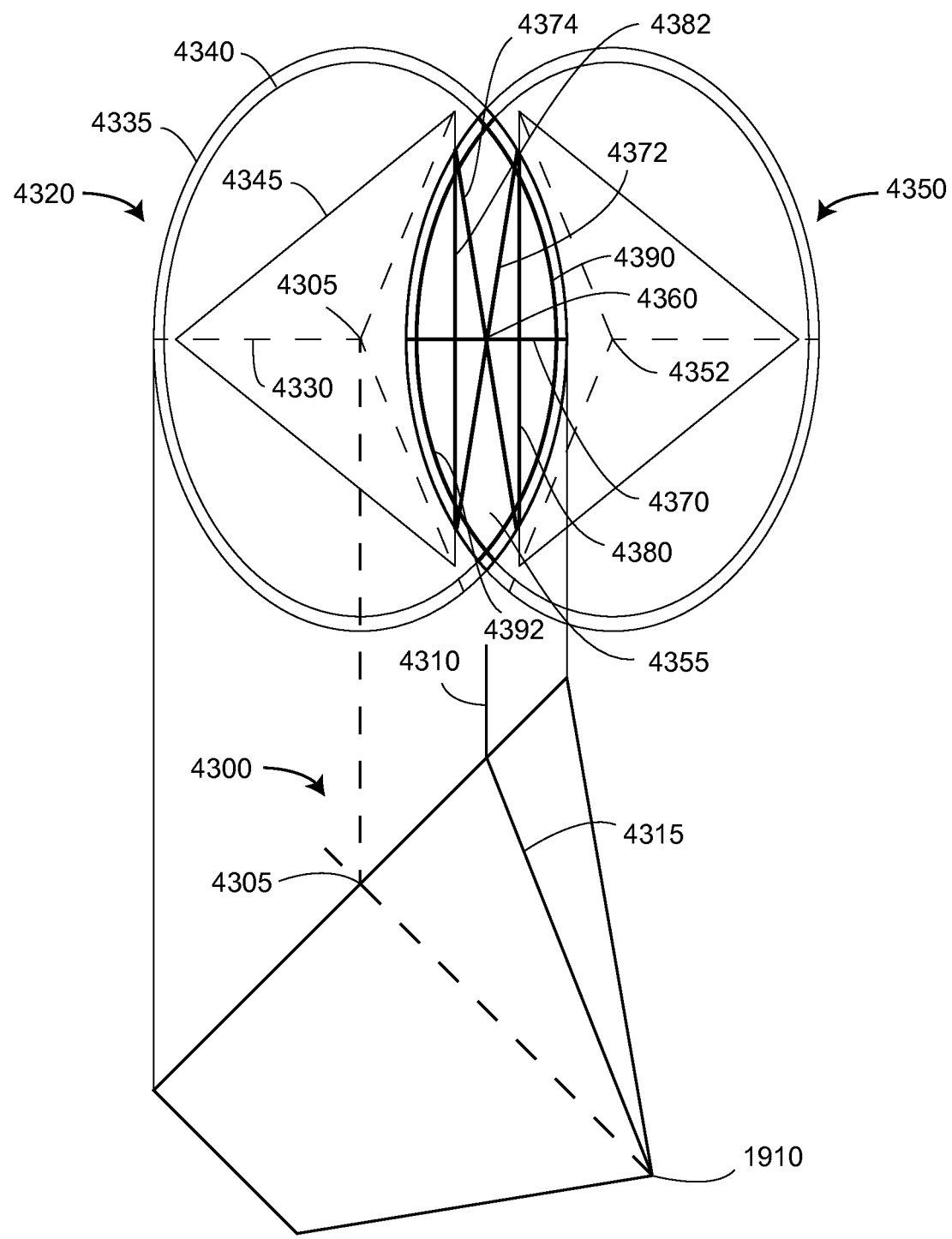
FIG. 33 shows a pattern observed in an illuminated eye for an angle of tilt of 45 degrees.

FIG. 33 shows a first example of a cube corner retroreflector tilted at an angle of 45 degrees with the direction of tilt being in the plane that includes the x (or y or z) axis. The face center 4305 is seen in the lower part of the figure as a sectional side view and in the upper part of the figure as a top view. In the top view, the perpendicular projections of the intersection lines onto the front face are the three dashed lines 4330. A triangle of non-reflecting lines 4345 lies so that its vertices intersect the dashed lines. A non-reflecting ring 4340 lies at the periphery of the front face of 4320. The outer edge of front face 4320 is 4335.

The illuminated eye region 4355 is found by superimposing the patterns 4320 and 4350. Only the illuminated eye region 4355 is seen by the camera. Visible within the illuminated eye region are the three intersection lines 4370, 4372, and 4374, which cross at the central intersection point 4360. Visible within the eye 4355 are two ellipse segments and two triangle edges. The discussion hereinabove for FIG. 31B explained that the separation parameter d can be found from the elliptical segments within the eye 4355. The separation parameter can also be found by taking half the distance required to align the right ellipse center 4352 with the left ellipse center 4325.

Figure 34:
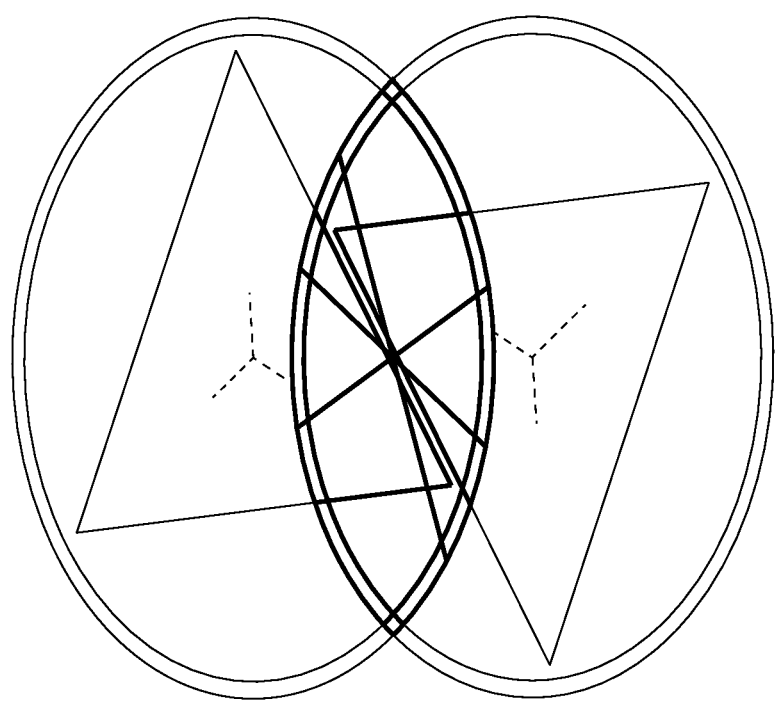
FIG. 34 shows a pattern observed for the same conditions as in FIG. 33 but with a different roll angle.

The triangle lines and the intersection lines also provide a sensitive measure of roll angle. The angle of tilt for the cube-corner prism in FIG. 34 is 45 degrees, which is the same as for FIG. 33. However, the roll angle is different in the two cases, which is to say that the cube-corner prism is rotated about its axis r before being tilted. The patterns of the intersection lines are substantially different in FIGS. 33, 34, thus providing the information needed to determine the roll angle.

Figure 35A:
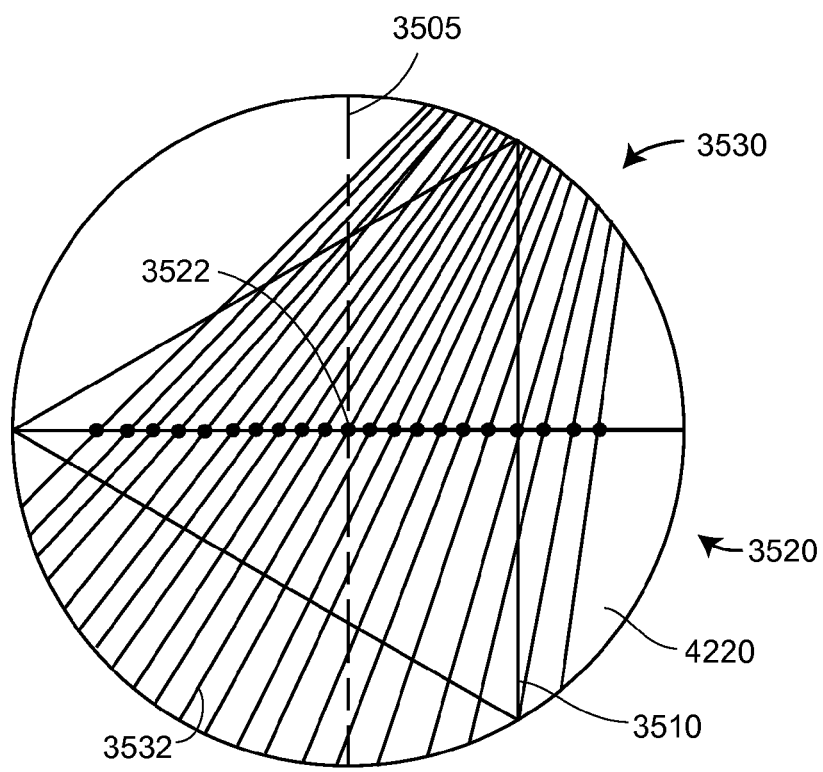
FIGS. 35A and 35B show that there are angles at which lines can be placed on the front face without risking overlap with intersection marks.

A potential problem in adding lines to the front face of a glass cube-corner prism is that the lines on the front face may be confused with the intersection lines. FIG. 35A shows a top view of the front face of a glass cube-corner prism on which an equilateral triangle 3510 has been placed so as to make the vertices of the triangle intersect with perpendicular projections of the intersection lines onto the front face, as can be seen in FIG. 32. This figure shows that the three edges of the triangle 4210, 4212, 4214 intersect with projections of the intersection lines 4220, 4222, 4224 on the front face 4220. FIG. 35A illustrates the effect of rotating the glass cube-corner prism about an axis 3505. With no rotation about the axis 3505, the refracted light returning from intersection line 4220 in FIG. 32 passes through the point 3522, which is the center of the front face. The direction of the intersection line is found using the method discussed in reference to FIGS. 28A, 28B. The collection of points 3520 along the horizontal axis in FIG. 35A represent the central intersection points for 5 degree increments in the rotation angle about 3505 for the case in which the glass prism has an index of refraction of 1.78. Central intersection points to the right of the point 3520 range from +5 to +50 degrees. Central intersection points to the left of the point 3520 range from −5 to −50 degrees. The imaged intersection lines pass through the central intersection points and are found as described hereinabove.

Figure 35B:
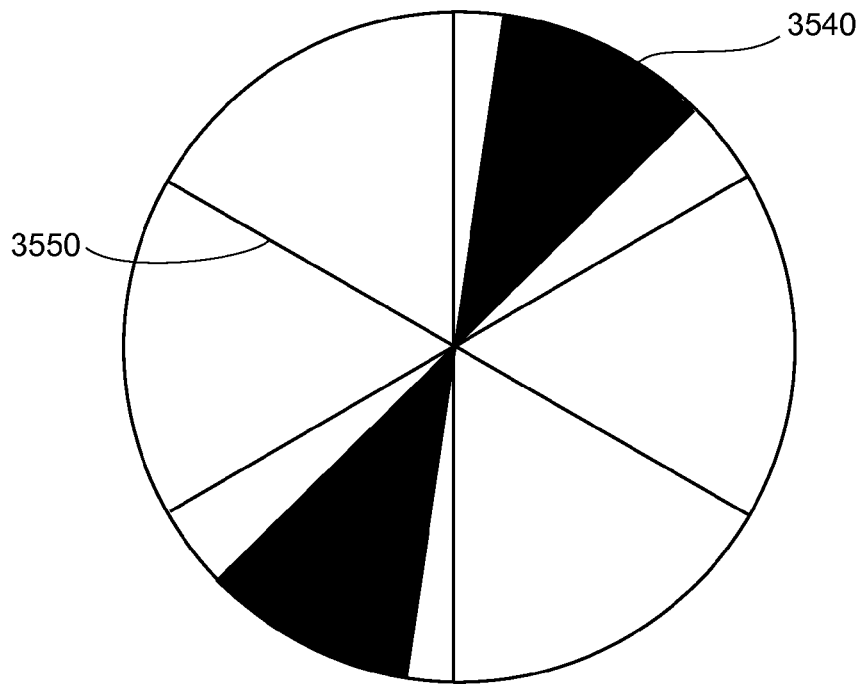

The complete collection of possible angles corresponding to the lines of rotations about the axis 3505 for angles of rotation between −50 and +50 degrees are shown as the dark region 3540 in FIG. 35B. The three lines 3550 are the sides of the triangle 3510 drawn to intersection the center 3522 of the front face. As can be seen, the three lines of the triangle are imaged at different angles than the intersection lines. For the other two intersection lines 4222, 4224, the same analysis can be carried out. From symmetry, it is clear that in these cases, the dark region will be rotated by 120 degrees. It can be seen that the images of the triangle and the intersection lines in this case have different angles and hence can easily be distinguished. In other embodiments, lines are not formed in the triangle 3510 but are placed in the regions of 35B in which there is no possibility of confusing an intersection line with a line on the front face.

In an embodiment, a retroreflector is a glass prism having a first surface, a second surface, a third surface, and a fourth surface, the first surface, second surface, and third surface being mutually perpendicular planar reflecting surfaces, the fourth surface being a planar front face of the prism, the front face being perpendicular to a normal vector. In an embodiment, the first surface and the second surface intersect in a first intersection line onto which is placed a straight first intersection mark. The second surface and the third surface intersect in a second intersection line onto which is placed a straight second intersection mark. The third surface and the first surface intersect in a third intersecting line onto which is placed a straight third intersection mark. In an embodiment, the front face has a straight first surface mark, a straight second surface mark, and a straight third surface mark. In an embodiment, the tracker orientation camera 910 forms an image of the first, second, and third intersection marks and the first, second, and third surface marks. As shown in FIGS. 35A, 35B, each of the first, second, and third surface marks may be configured so as to have angles different than the angles of the other surface marks as well as the first, second, and third intersection marks over a range of tilt angles, say 0 to 45 degrees, of the retroreflector relative to the tracker camera. A more precise and general statement of this idea may be given by having a camera (any camera) view the marks on the retroreflector. As the tilt between the optical axis of the camera relative to the normal of the vector from 0 to 45 degrees, the angles of the six straight lines in the 2D image obtained by the camera are all different. It is understood here that the tilt may be in any direction and hence may be a positive or negative angle. Keeping each of the lines distinct greatly aids in the determination of the orientation of the retroreflector based on the observed pattern of marks by the camera.

In a method described in U.S. Patent Application No. 62/017,973 ('973) filed 27 Jun. 2014, the contents of which are incorporated by reference, a method for determining the three orientation values is based on performing a 2D Fourier transform and putting the 2D transform data into angular bins. With this method, the angles can be displayed on a graph, as illustrated conceptually in FIG. 36. In this figure, the six peaks 3580 represent the six angles of the six different directions of the straight lines in FIG. 32. In this figure, the straight lines are the three lines of the triangle, 4010, 4212, 4214, and the three intersection lines 4220, 4222, and 4224. The Fourier/binning result of FIG. 36 may be used to determine the angles of these straight lines.

In an embodiment, the Fourier transform/binning method gives seed values for angles used in an optimization procedure. Such an optimization procedure is not limited to angles but may also take into account the spacing among imaged lines and curves.

Figure 37:
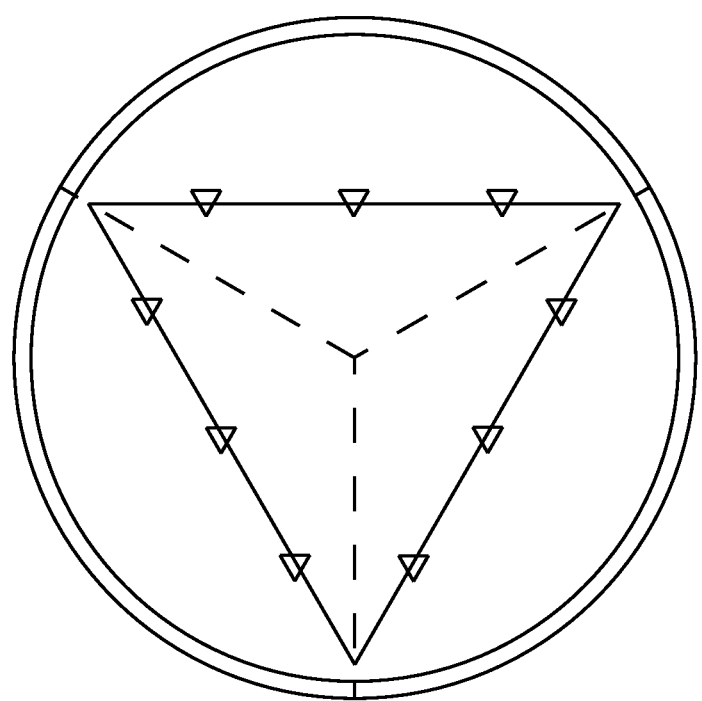
FIG. 37 shows how marks can be formed without increasing the number of angles in the image.

In some cases, markers such as marker 3702 may be added to non-reflecting lines on the front face. FIG. 37 shows an example in which three markers are added to each of the three lines of the triangle to break the line into quarters. In an embodiment, each of the markers has the same three angles as the three lines of the triangle, ensuring that there is no overlap in the angles of the lines being measured. In other cases, a marker may be used to identify a particular line to reduce confusion that may result from a six-fold symmetry of the cube-corner retroreflector with roll angle. For example, straight lines may be marked with small triangle in such a way that the appearance of the triangle indicates the line being marked.

Two ways of describing the three orientation degrees of freedom were discussed herein above: (1) roll, pitch, and yaw angles; and (2) roll angle plus direction cosines (instead of pitch and yaw angles). A third way is now given that more closely relates the three orientational degrees of freedom of the cube-corner retroreflector to the observed changes in the pattern seen by the orientation camera 910.

Figure 38:
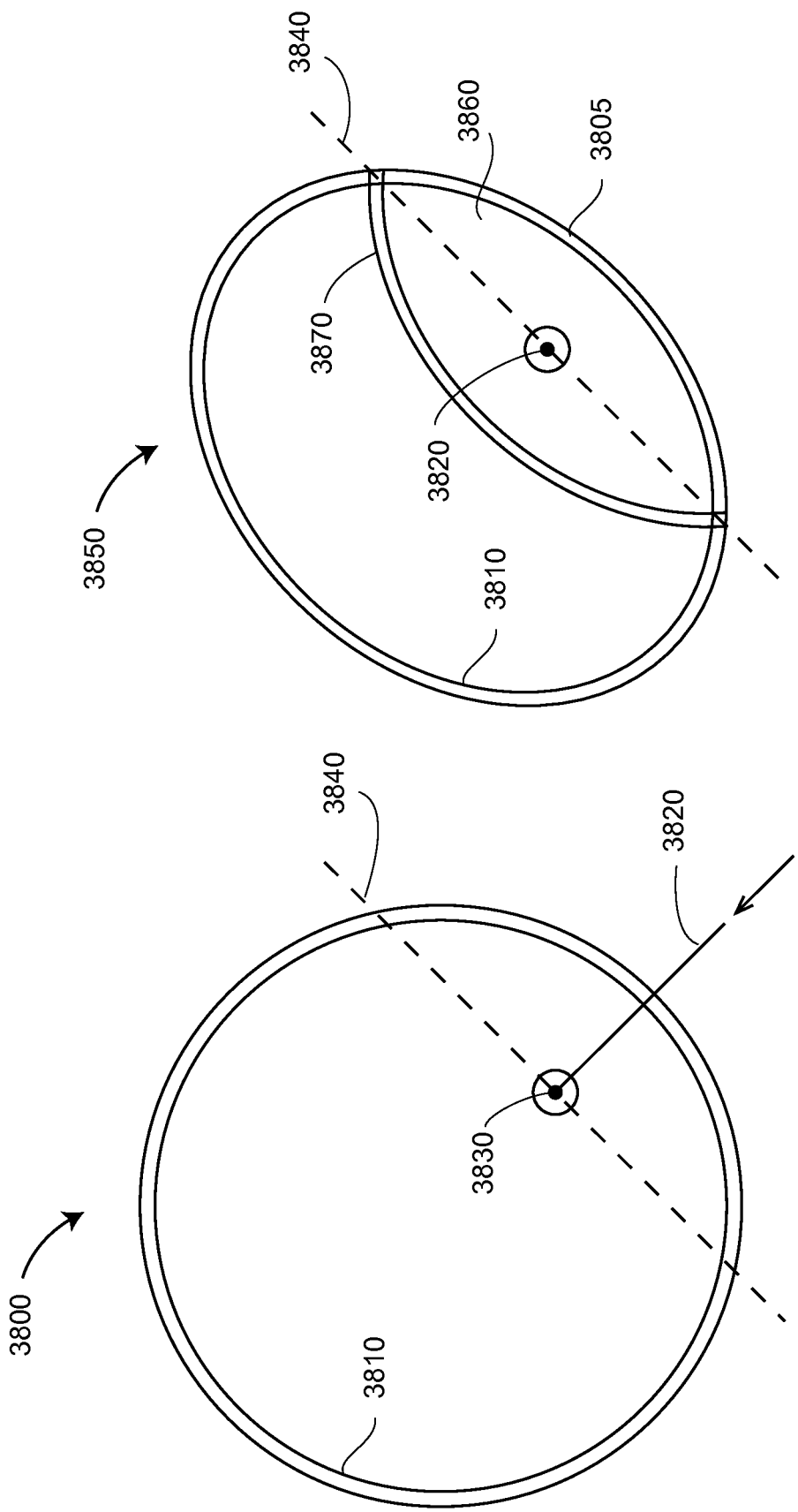
FIGS. 38A and 38B show a glass prism with markings from two different perspectives according to an embodiment.

FIG. 38A shows the front face 3800 of a glass cube-corner retroreflector with the normal vector 3830 of the front face aimed at the viewer. In this view, the front face is circular. In an embodiment, a marked circle 3810 (for example, using chrome-on-glass to make the pattern) is included inside the outer perimeter of the front face. A beam of light 3820 from a tracker is sent to the front face at an angle and enters the front face at a position that enables the refracted beam to intersect the cube-corner vertex. The beam of light 3820 and the normal vector 3830 lie in a plane referred to as the plane of incidence. A fold axis 3840 lying on the front face is perpendicular to the plane of incidence.

When the perspective is altered to view the retroreflector along the axis of the beam of light from the tracker as in FIG. 38B, the front face becomes an ellipse having its major axis parallel to the fold axis 3840. The length of the ellipse along the major axis is equal to the diameter of the circle, but the minor axis is smaller than the major axis, with its size determined by the angle of incidence of the beam of light 3820 from the tracker. The greater the angle of incidence, the smaller the minor axis. Only an eye-shaped region 3860 receives and reflects light from the retroreflector. As explained herein above, the eye-shaped region 3860 is formed of two elliptical segments, one of which is the elliptical segment 3870. By providing an inner circle 3810 on the front face of the glass cube corner, the fold axis is readily observed in an image captured by the orientation camera 910.

Figure 39:
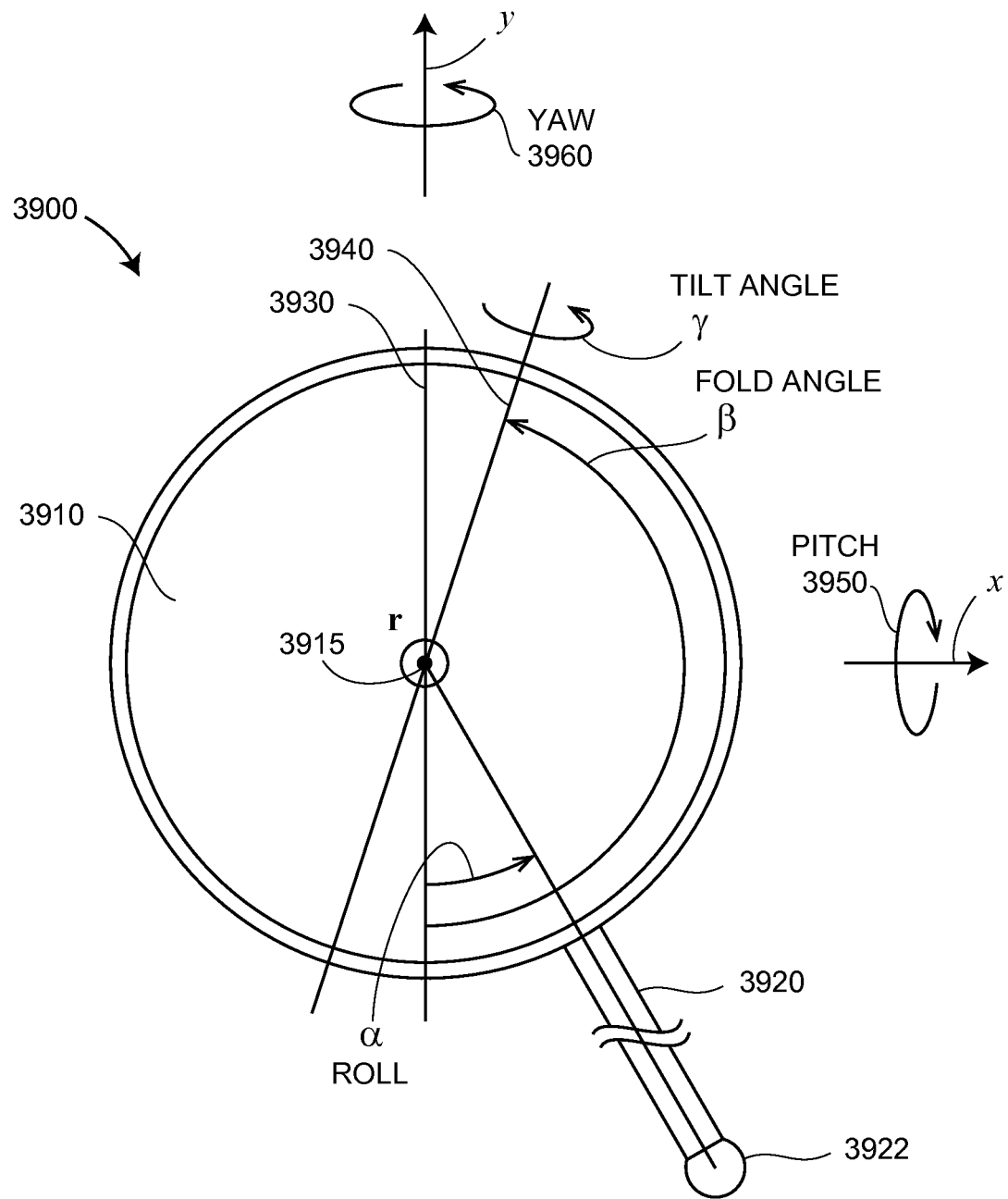
FIG. 39 illustrates the angle definitions including roll angle, pitch angle, yaw angle, fold angle, and tilt angle according to an embodiment.

FIG. 39 shows the front face 3910 of a cube-corner retroreflector, including an attached stylus 3920 and probe tip 3922. The front face is seen face-on so that the shape of the cube-corner is circular. A normal vector 3915 of the front face points toward the viewer. A reference axis 3930 lying on the front face 3910 has a direction determined by the tracker. For example, the direction of the reference axis might be along the vertical direction of the photosensitive array of the orientation camera 910. In an embodiment, the reference axis is centered at the midpoint of the front face.

In an embodiment, calculations first take account of the effect of roll before accounting for the effects of tilt on the glass cube corner. In FIG. 39, the angle $\alpha$ is the angle between the stylus 3920 and the reference axis. The tilt axis 3940 is tilted at the same angle as the fold axis of FIGS. 38A, 38B, but in FIG. 39 is shown passing through the center of the front face. The angle $\beta$ is the angle from the reference axis 3930 to the tilt axis 3940. The angle $\beta$ has the same value regardless of whether the tilt axis 3940 or the fold axis 3840 is used in the retroreflector coordinate system. The angle $\gamma$ is the angle of rotation of the front face about the fold axis 3840.

Figure 40:
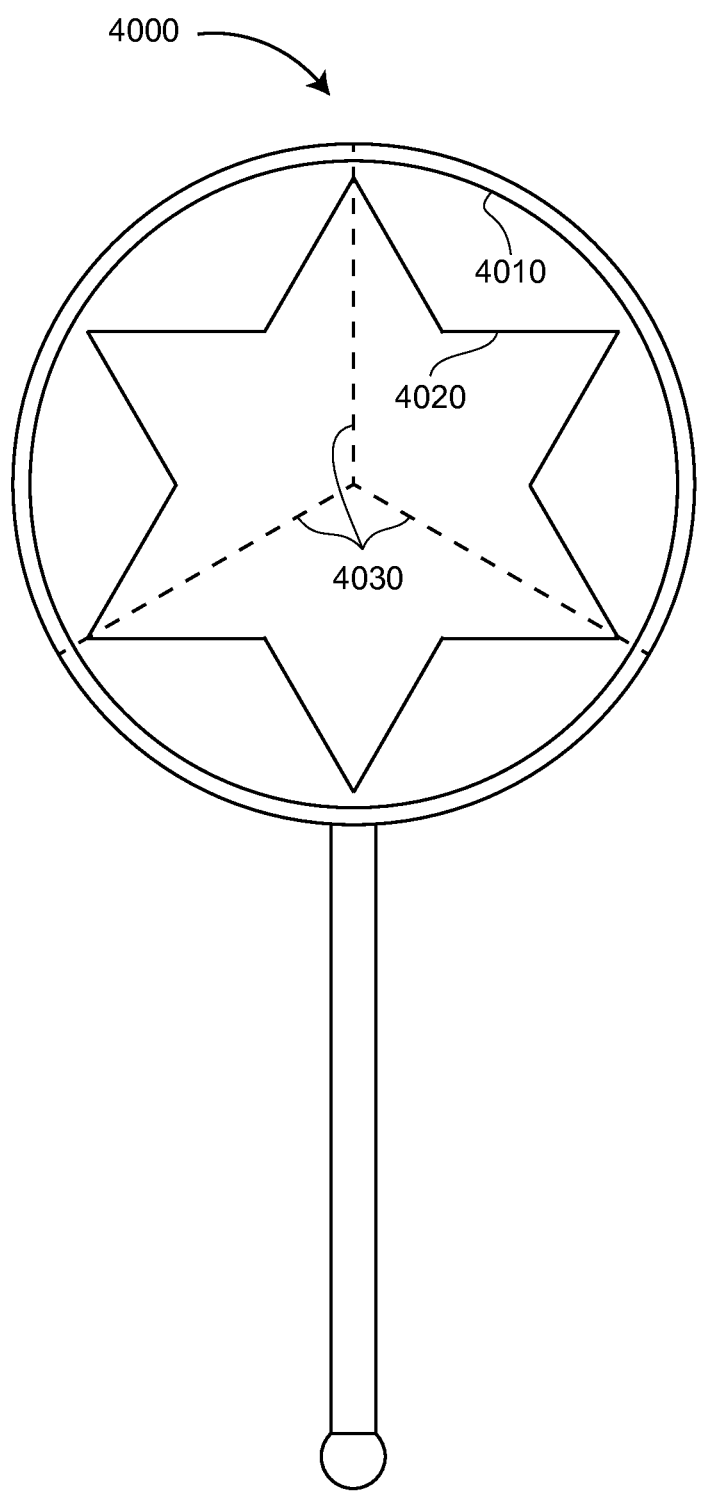
FIG. 40 illustrates a six-pointed star pattern of marks on a front face of a six-DOF tactile probe according to an embodiment.

In an embodiment shown in FIG. 40, the pattern on the front face of the glass cube-corner retroreflector includes a circle 4010 and a six-pointed star 4020. The six-pointed star 4020 is made of line segments having only three angles, each of these three angles differing from the three intersection angles by at least 60 degrees. As a result, a Fourier transform and binning method may be used to determine all six angles, as explained herein above in reference to FIG. 36. The six-pointed star 4020 can be considered to include parts of two superimposed triangles having a relative rotation angle of 180 degrees. In the examples considered herein below, the triangle having the uppermost vertex is placed on the front face to align its three sides parallel to the three intersection lines of the cube-corner retroreflector. This triangle is also placed on the front face so that when viewed face-on, the vertices of the triangle are directly over the intersection lines.

Figure 41A:
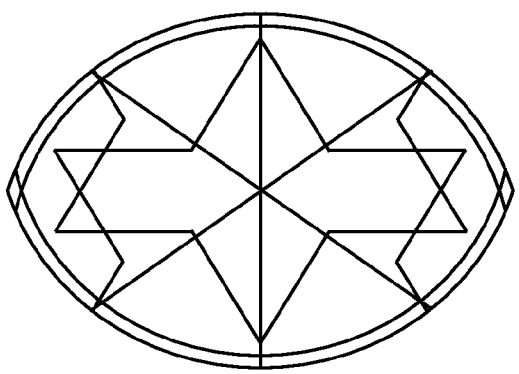
FIGS. 41A-F show the imaged pattern of marks obtained for a retroreflector having a six-pointed star pattern for different retroreflector orientation angles.
Figure 41B:
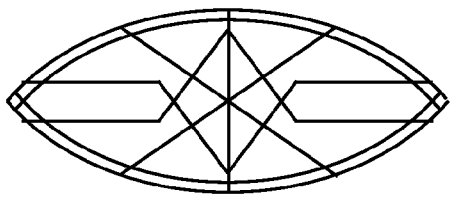
Figure 41C:
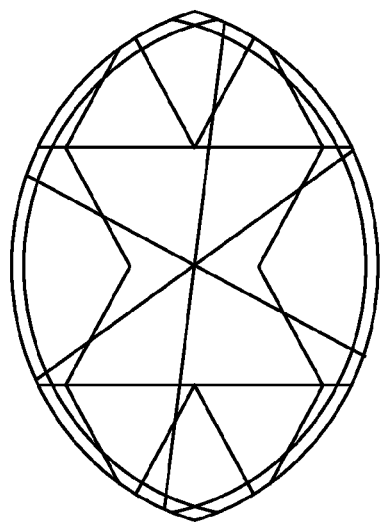
Figure 41D:
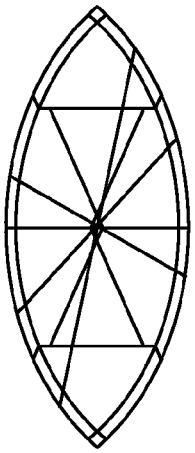
Figure 41E:
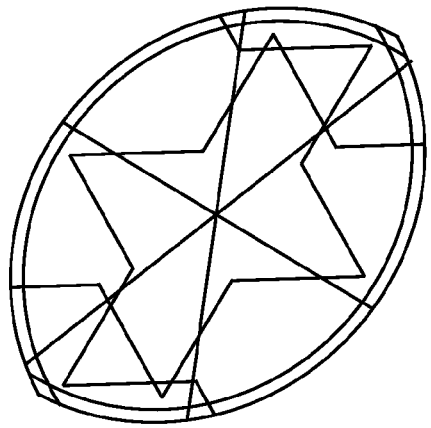
Figure 41F:
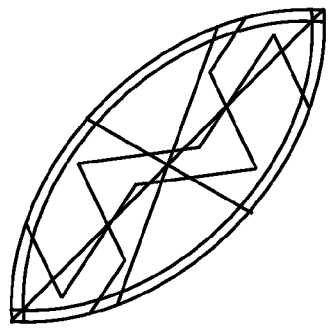
Figure 42A:
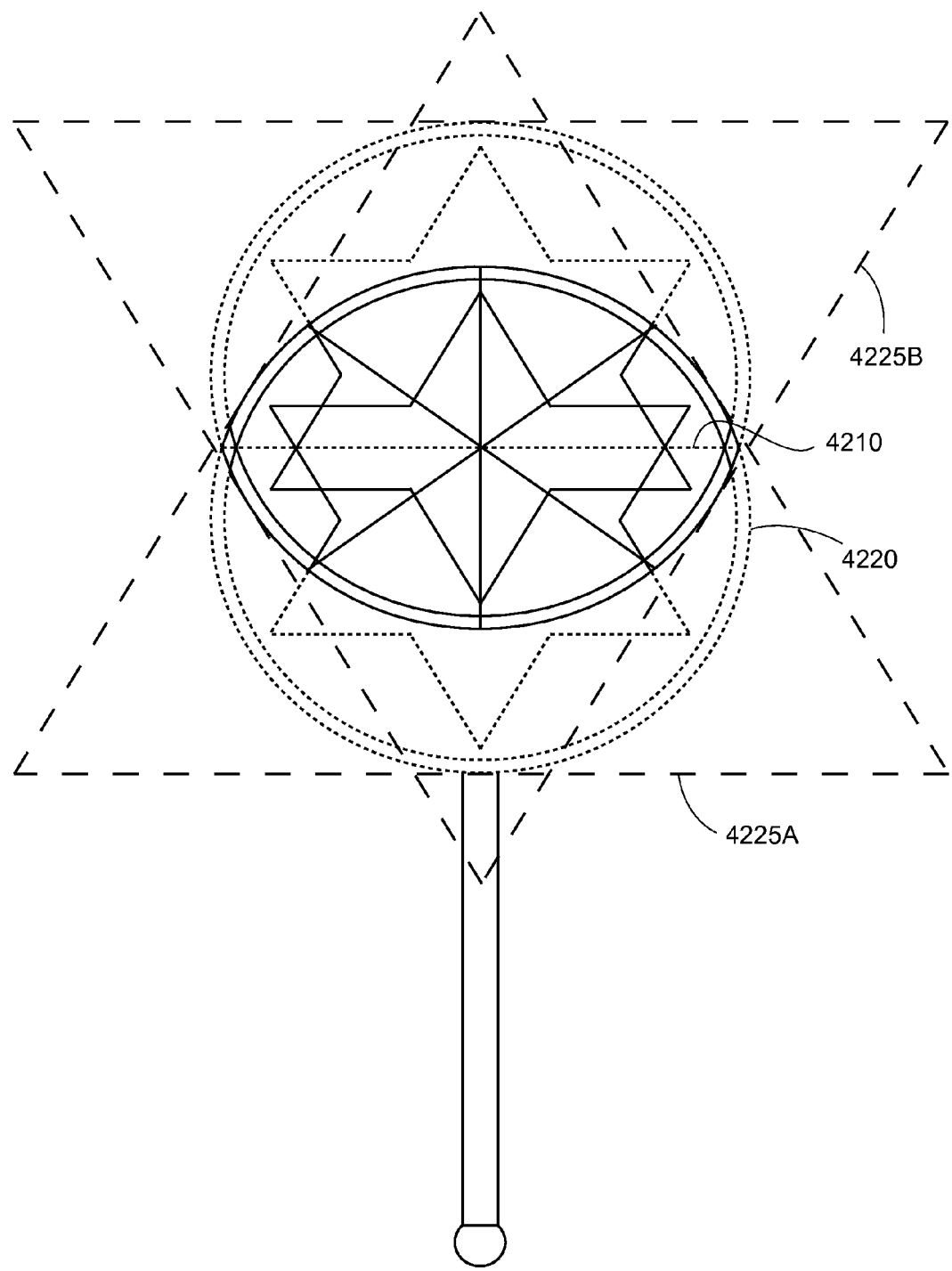
FIG. 42A illustrates a mathematical procedure for obtaining a mathematical representation for the retroreflector marks given three orientation angles of the retroreflector according to an embodiment.
Figure 42B:
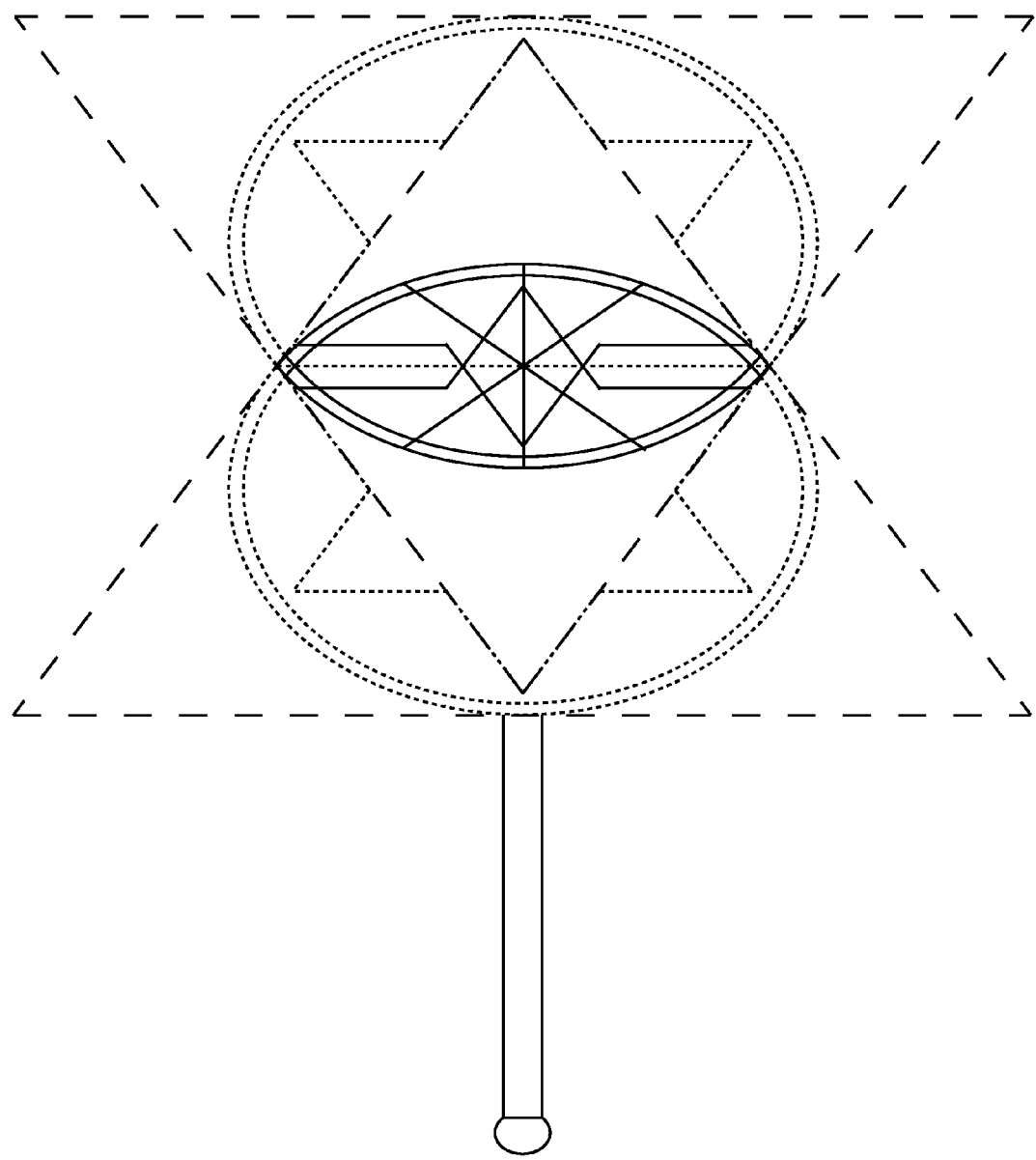
FIGS. 42B-E illustrate the image pattern obtained for a glass retroreflector having marks of a six-pointed star for different orientation angles according to an embodiment.
Figure 42C:
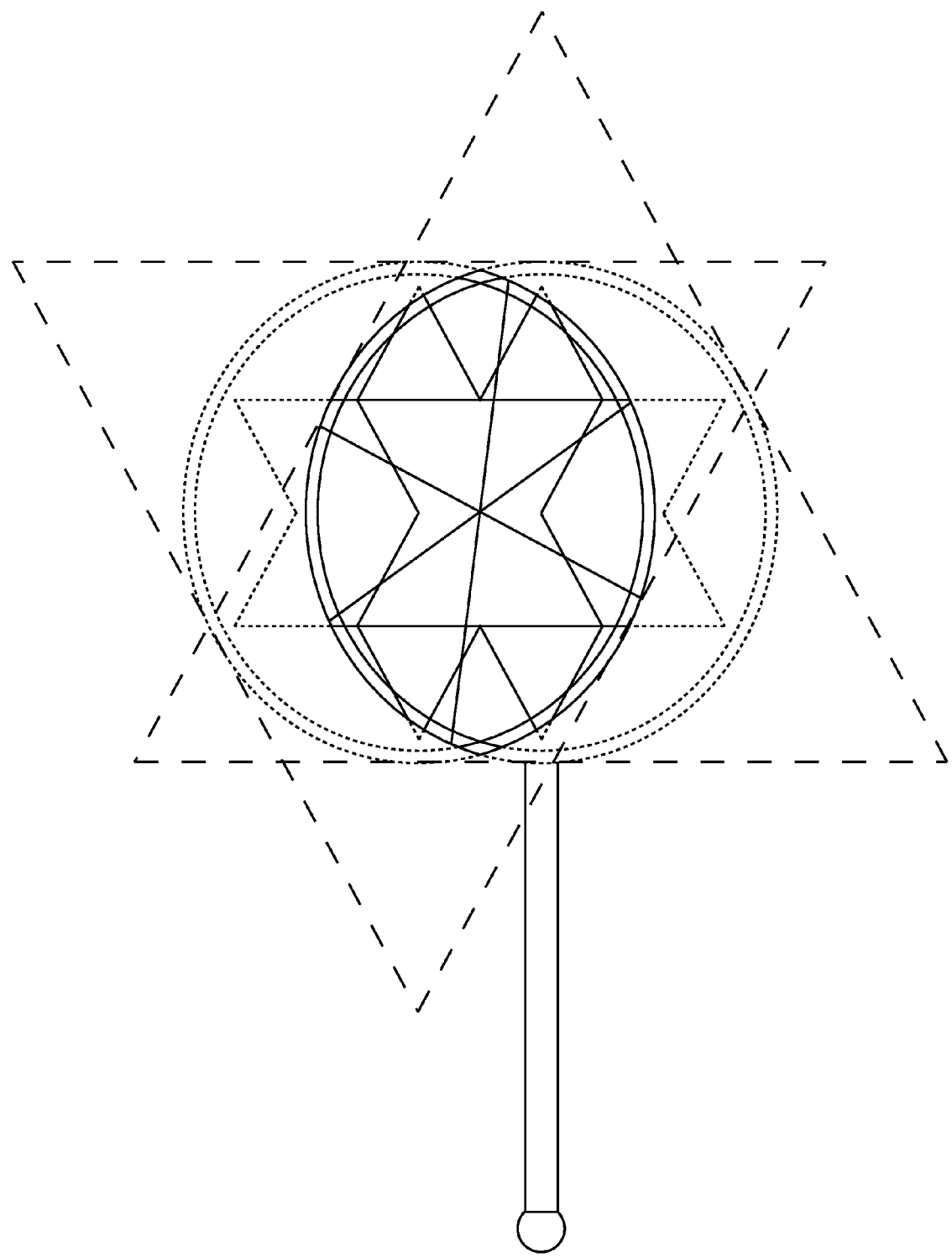
Figure 42D:
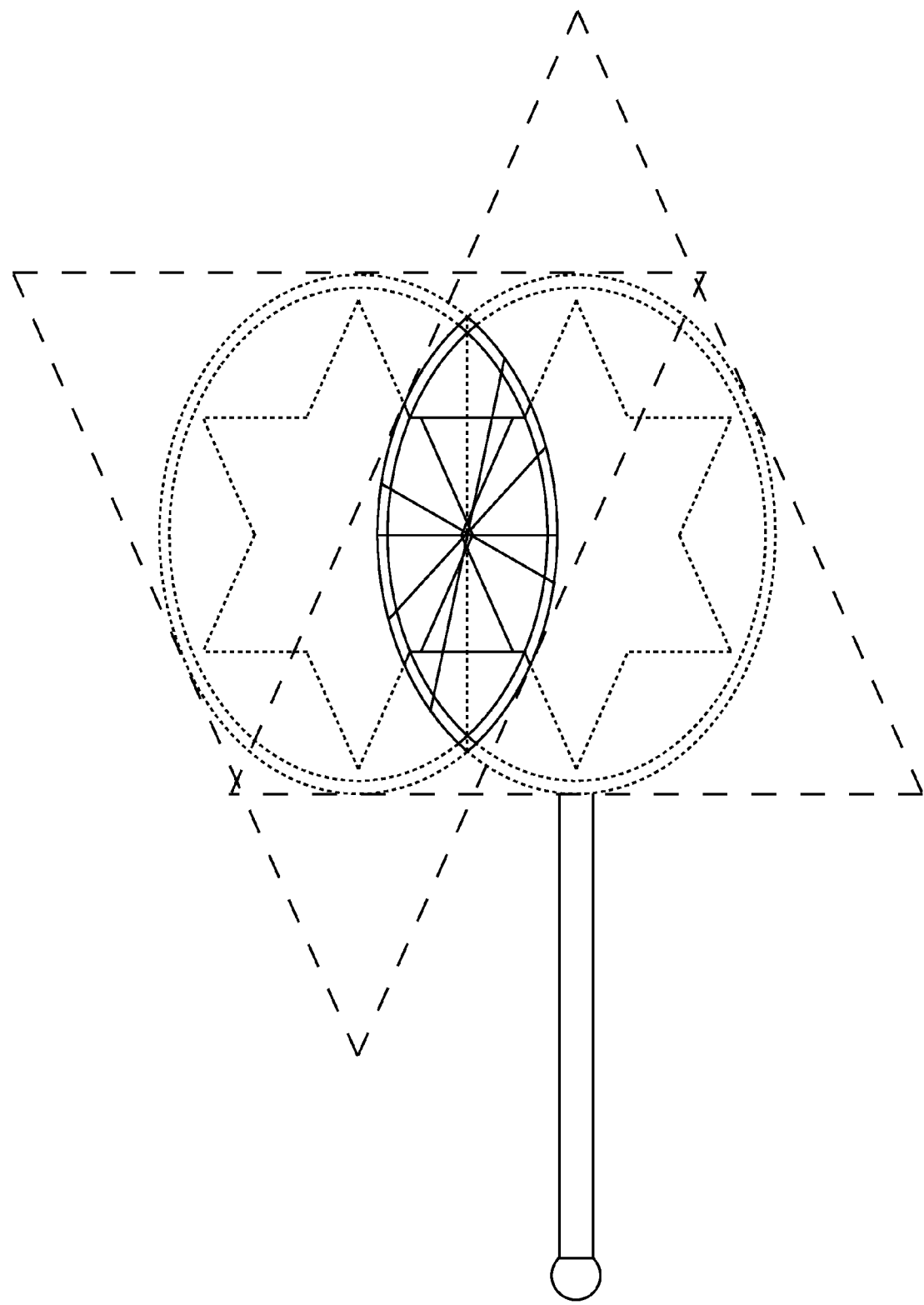
Figure 42E:
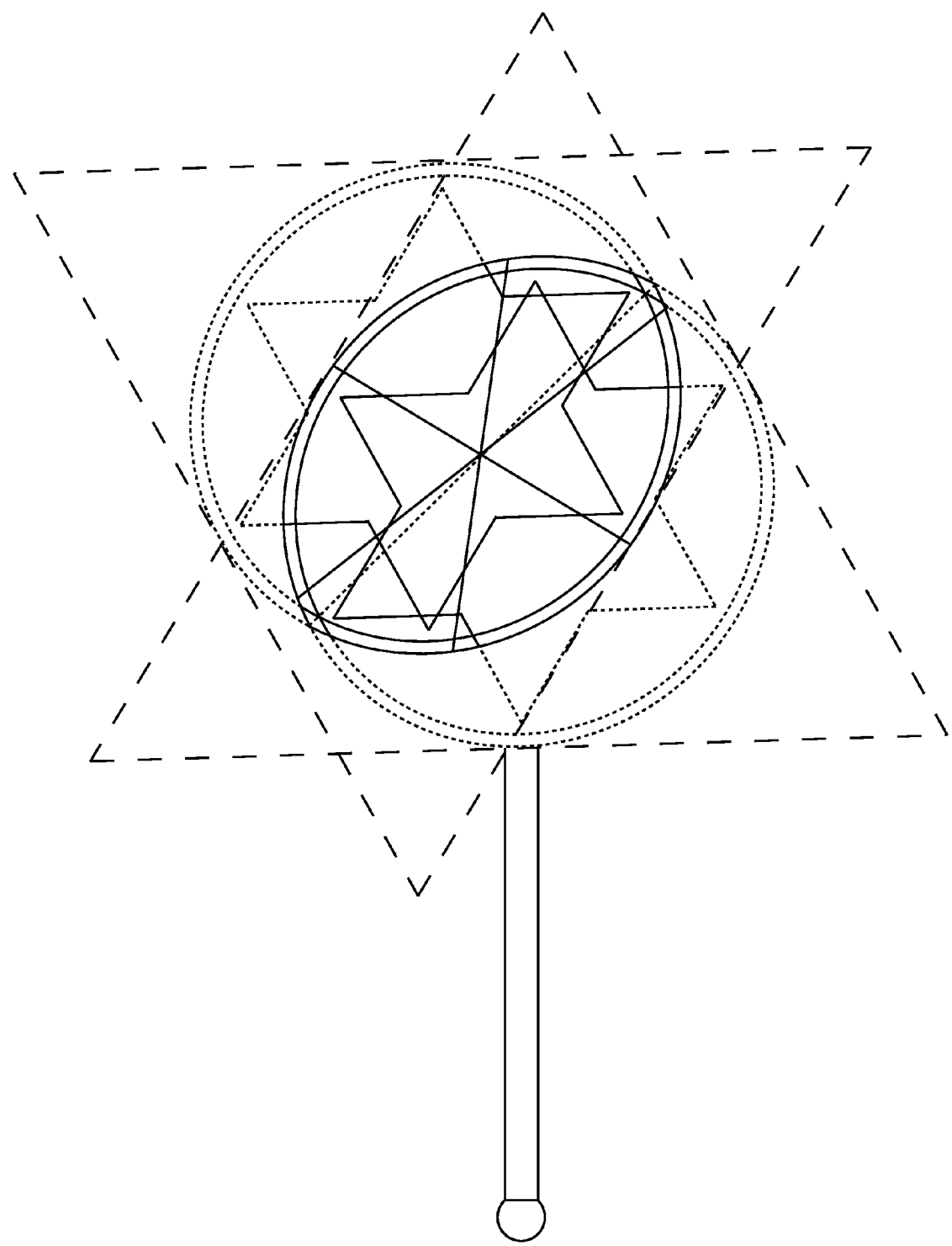

FIGS. 41A-F show patterns captured by the camera of the orientation camera 910 for six different angles $\beta$ and $\gamma$. FIG. 41A shows the image on the orientation camera 910 for a retroreflector pitch angle of 20 degrees, yaw angle of 0 degrees, and roll angle of 0 degrees, which is equivalent to angles $\alpha=0$ degrees, $\beta=90$ degrees and $\gamma=20$ degrees. FIG. 41B shows the orientation angle for a retroreflector pitch angle of 40 degrees, yaw angle of 0 degrees, and roll angle of 0 degrees. FIG. 41C shows the image on the orientation camera 910 for a retroreflector yaw angle of 20 degrees, pitch angle of 0 degrees, and roll angle of 0 degrees. FIG. 41D shows the image on the orientation camera 910 for a retroreflector yaw angle of 40 degrees, pitch angle of 0 degrees, and roll angle of 0 degrees. FIG. 41E shows the image on the orientation camera 910 for angles α=0 degrees, β=45 degrees, and γ=20 degrees. FIG. 41F shows the image on the orientation camera 910 for angles α=0 degrees, β=45 degrees, and γ=40 degrees.

An advantage of using the six-pointed star 4020 in combination with a circle 4010 on the front face is that the patterns are distinctive and well-spaced, which improves performance of optimization program used to determine the α, β, and γ values of the glass retroreflector.

FIG. 42 shows the geometrical construction performed to determine the pattern the seen by the orientation camera 910 when the glass cube-corner retroreflector is pitched forward by 20 degrees. The solid lines indicate what the camera sees. The dashed lines are added to better understand the displayed pattern. In FIG. 42, the fold axis 4210 is a horizontal axis (represented by a dashed line) that passes down the middle of the region visible to the orientation camera (represented by solid lines). FIG. 42 shows two superimposed ellipses with the intersection of the two superimposed ellipses being the eye. The lower ellipse 4220 represents the actual outline of the retroreflector, as viewed in the direction of the beam of light from the tracker. The minor axis of the ellipse 4220 shrinks to cos(20°)=0.9397 its original value. In addition, for the case in which the retroreflector has the geometry shown in FIG. 23A and for the index of refraction of the glass retroreflector being n=1.78, the width of the eye along the minor axis divided by the diameter of the front face of the retroreflector can be shown to equal $\cos(20°)(1-\sqrt{2}\tan(a\sin(\sin(20°)/n)))$ =0.6795.

In an embodiment, the method of determining the pattern seen by the orientation camera 910 is to begin with the base pattern at α=0, β=0, γ=0. First rotate the pattern by the angle α while viewing the retroreflector face-on. Second determine the angle β of the fold axis by constructing the line to lie on the front face and be perpendicular to the incident plane that includes the beam of light from the tracker and the normal vector of the front face. Third, determine the tilt angle γ by finding the angle of incidence of the beam (angle between the beam of light and the normal vector of the front face). Shrink the minor axis of the ellipse by a factor equal to cos(γ). Calculate the width w of the eye using the formula above: $w=D\cos(\theta)(1-\sqrt{2}\tan(a\sin(\sin(\theta)/n)))$, where D is the diameter of the front face and θ is the angle of incidence of the light in air. Use this information to construct the eye of two elliptical segments. The pattern of lines within the eye shrinks in the direction of the minor axis by the same amount as the minor axis shrinks relative to the major axis. Fourth, to represent the intersection lines as seen by the orientation camera, draw the two large dashed triangles shown in 42. These dashed triangles indicate the edges of the cube corner before the cylinder is cored out, as shown for example in FIG. 22A. The intersection lines are found by connecting the endpoints of the opposing triangles. Constructions used to obtain the patterns of FIGS. 41B-41F are shown in FIGS. 42B-42F, respectively.

Figure 43:
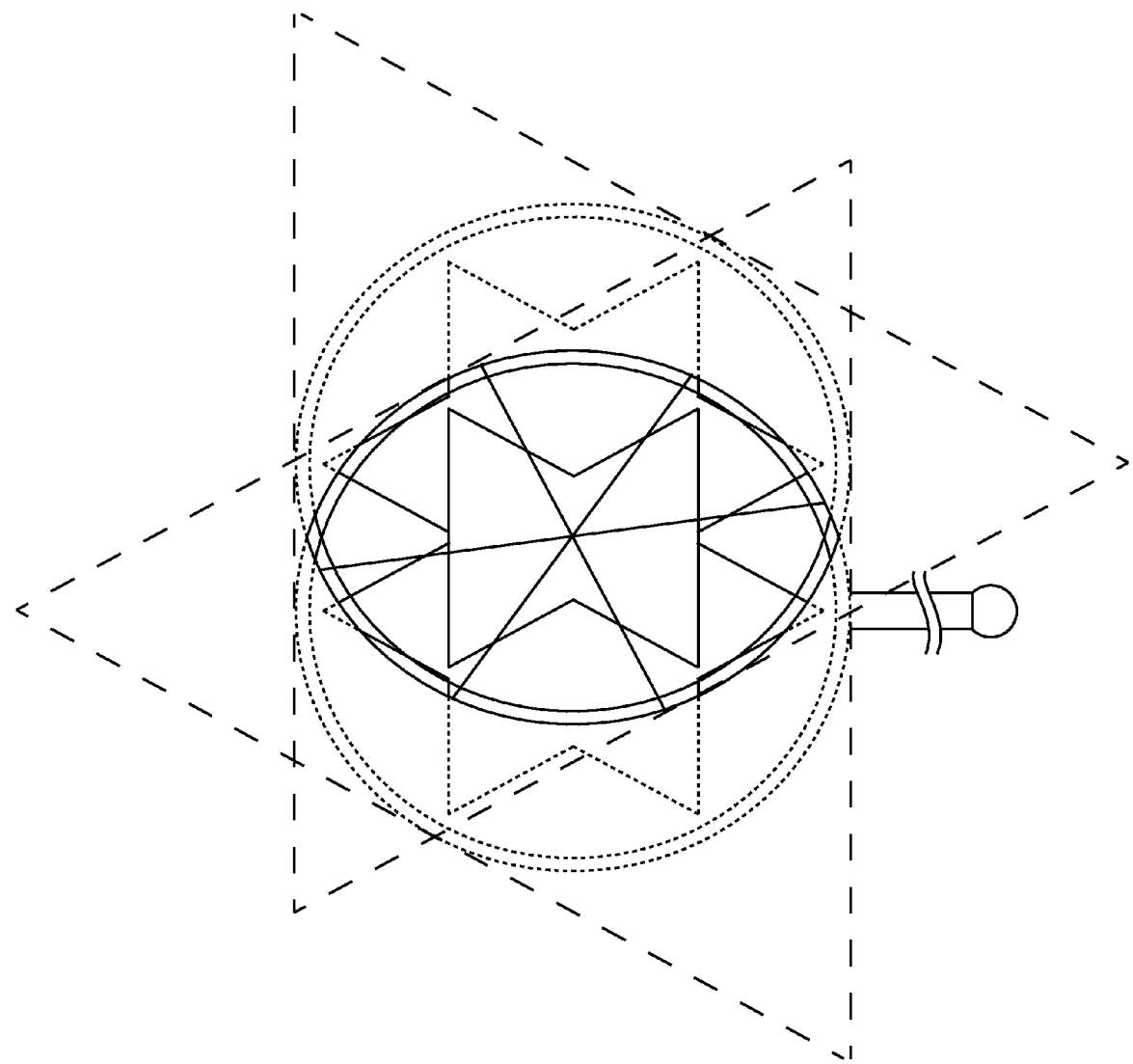
FIG. 43 shows the imaged pattern obtained for the same pitch and yaw angles but different roll angles.
Figure 44A:
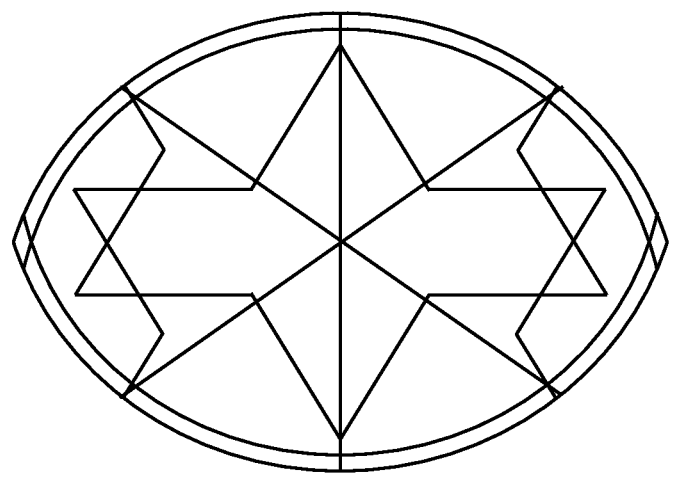
FIGS. 44A and 44B show a direct comparison of the two imaged patterns obtained for two different roll angles.
Figure 44B:
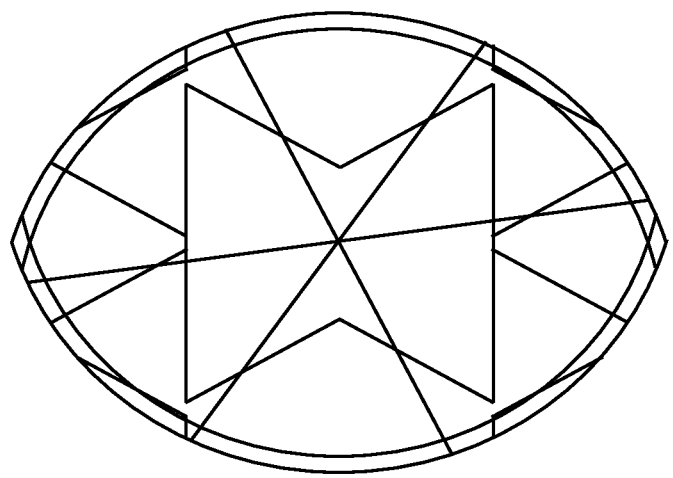

Changes in the angles β and γ, or equivalently changes in pitch and yaw, result in the same eye pattern—in other words, the same elliptical segments in the same position on the orientation camera. However, if the roll angle α changes, the pattern of lines inside the eye also change. A construction for the case in which α=90 degrees, β=90 degrees, and γ=20 degrees is shown in FIG. 43. FIGS. 44A and 44B compare the effect of changing the roll angle from 0 to 90 degrees while leaving the tilt angles β, γ the same. However, the lines within the eye contain information not only about the roll angle but also about the β and γ angles.

In an embodiment, the orientation camera 910 captures an image of the glass cube-corner retroreflector having marked intersection lines, a circle 4010 and a six-pointed star 4020 on the front face. An approximate orientation of the retroreflector is known from previous measurements. In an initial measurement, the retroreflector may be held in a known orientation to remove ambiguity resulting from the symmetry of the retroreflector pattern on the image captured by the orientation camera 910.

Image processing methods may be used to determine parameters to represent equations for each of the straight and curved line segments. FFT and binning method described herein above may be used to determine the angles of the three directions of the line segments of the six-pointed star 4020 and the three directions of the three intersection lines. In an embodiment, the curved portions of the eye are masked before the FFT is performed to reduce noise in the FFT/binning result.

The angles obtained from the FFT/binning calculation may be used to provide a first guess for the parameters α, β, γ. Alternatively, a first guess may be provided by the last (recent) calculation of the parameters. A merit function (also known as an objective function) is devised to determine the goodness-of-fit of the pattern determined using the assigned values of α, β, γ compared to the imaged data. By first determining parameters that represent the equations of the straight and curve line segments and the calculated angles, the angles α, β, γ may be determined quickly using iterative methods used in optimization, particularly if equations are developed to extract parameters representing the expected line segments for the given values of α, β, γ. The use of such equations results in an analytical Jacobian matrix, which converges quickly. Weight functions may be used to characterize the relative importance of the different elements of the merit function. In most cases, the optimization procedure is to minimize the merit function, which includes a sum of squared terms.

Figure 45:
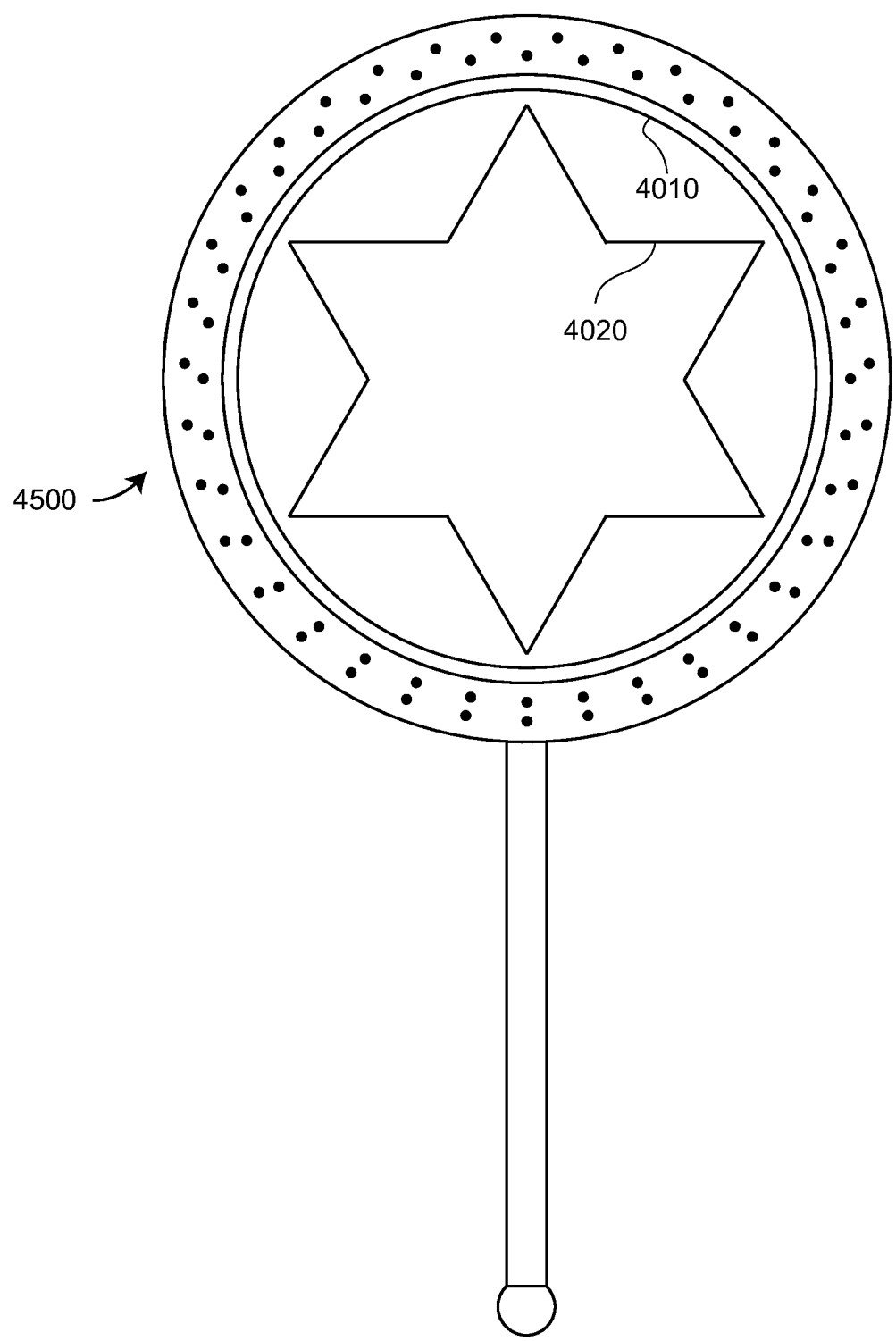
FIG. 45 shows a retroreflector with marks further including a collection of light points in a ring near the periphery.

In an embodiment illustrated in FIG. 45, an imaged target 4500 further collection of illuminated spots in a region 4510 outside the retroreflector as shown in FIG. 45. In an embodiment, the illuminated spots include an inner collection of spots 4512 and an outer collection of spots 4514. The illuminated spots may be light sources (such as LEDs), reflective spots, or transparent regions behind which a light is provided to shine through the transparent regions. In an embodiment, there are a different number of spots in the inner and outer region, which provides a way of unambiguously determining the roll angle of the target 4500.

Figure 46:
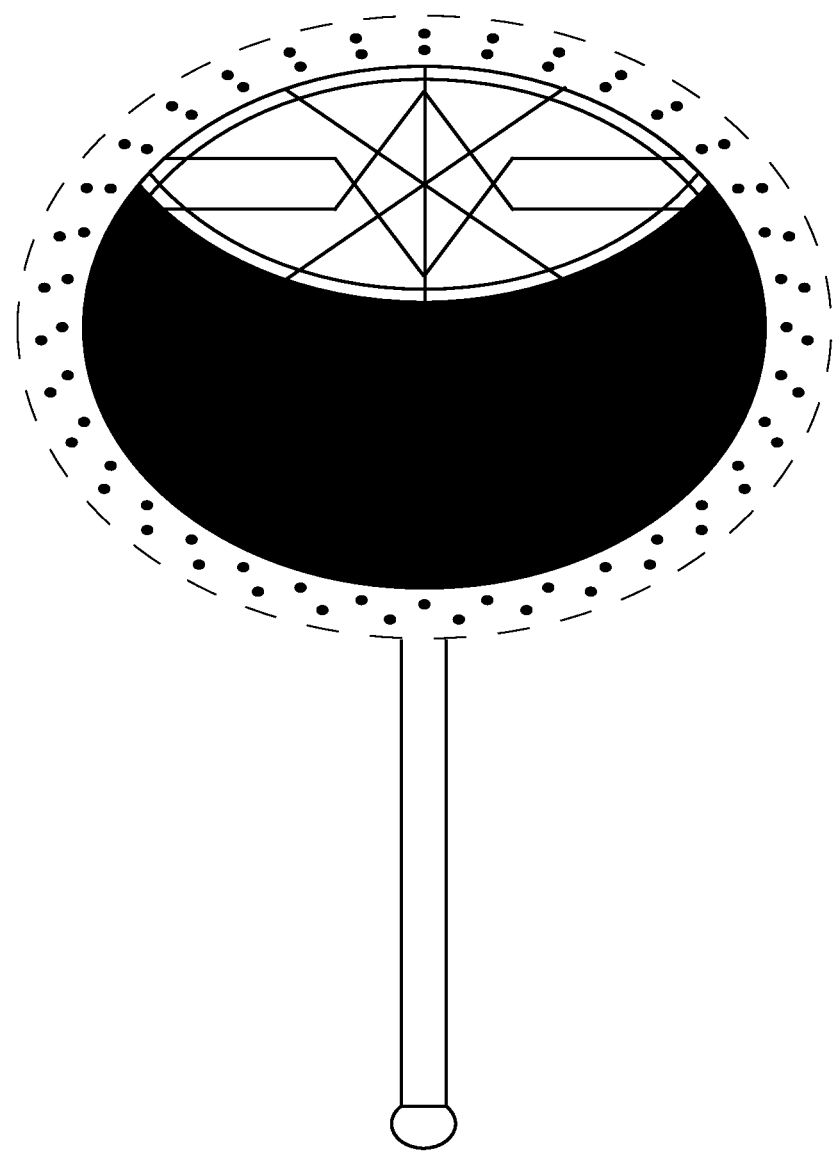
FIG. 46 shows the imaged marks and light points of FIG. 45 when the probe tilt angle is changed.

FIG. 46 shows the effect of the appearance of the target 4500 when tilted at an angle of 40 degrees. Besides providing roll information, the illuminated spots 4512 and 4514 also provide an additional measure of scale to help determine the pitch and yaw angles (or equivalently fold and tilt angles).

There are many ways for a processor to calculate the three orientational degrees of freedom of a six-DOF retroreflector such as the retroreflector 4000 of FIG. 40 or the retroreflector 2300 of FIG. 27 based at least in part on the retroreflector marks imaged on an orientation camera such as the orientation camera 910 of FIG. 13. In one simple method, the angles of lines in a 2D image are directly entered into a formula to determine the formula using a direct calculation. Such a direct method is described in patents '758 and '014 described herein above. A disadvantage with this approach is that it throws out information on the spatial relationship among marks, thereby throwing away important information available to improve accuracy in the three determined orientation angles of the retroreflector. This is especially the case when the image includes elliptical segments from an eye formed by the outer circular edges of the retroreflector front face, as in FIG. 28B, or by a circular ring (thin annulus) placed near the outer edge of a circular retroreflector front face, as in FIGS. 31A, 31B. It is also especially the case when marks are placed on the front face of a glass retroreflector prism as in FIG. 40 or in FIG. 37 and when the number of imaged straight lines in the 2D image exceeds three, as in FIGS. 41A-F.

Figure 48:
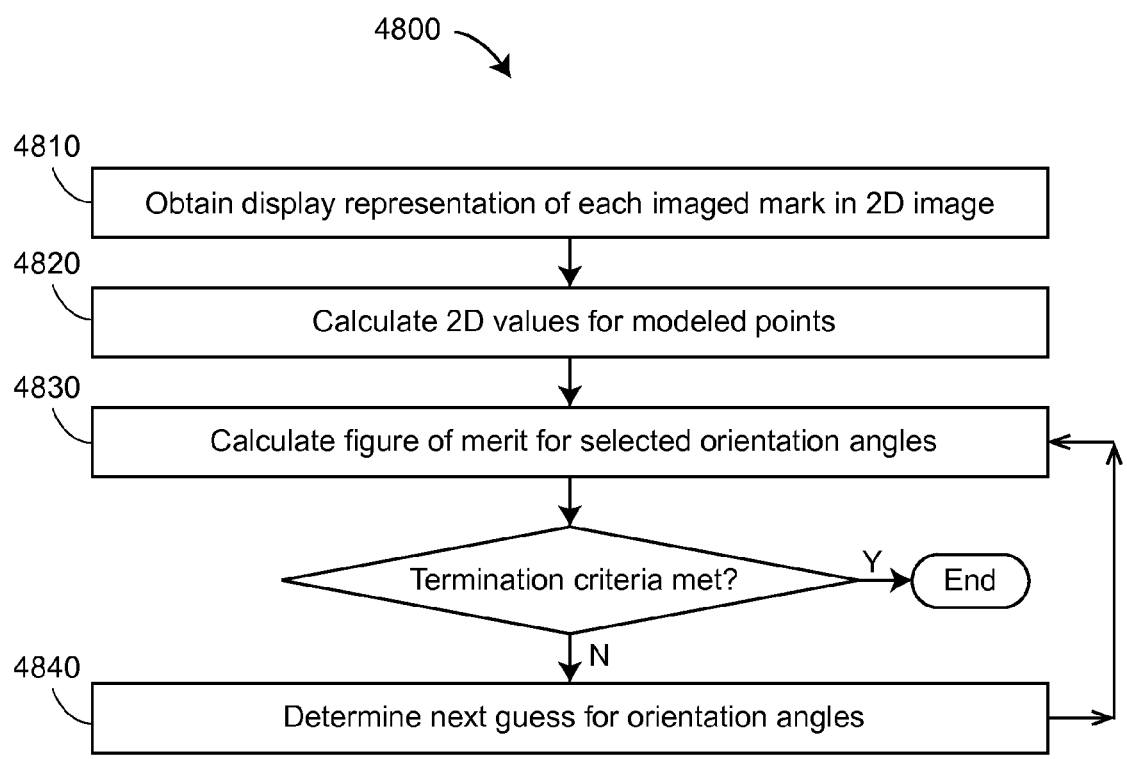
FIG. 48 illustrates steps in a procedure for determining three orientation angles of a glass retroreflector prism that includes marks, according to an embodiment.

A method 4800 shown in FIG. 48 is now described for taking full advantage of the redundant information provided by the multiple lines (straight and curved lines). As a first example, we consider the case in which a retroreflector is a glass prism having four faces, three mutually orthogonal planar reflective faces and a front face. The three reflective faces mutually intersect to form a first intersection line, a second intersection line, and a third intersection line. A mark is placed on each of these intersection lines to produce a first intersection mark, a second intersection mark, and a third intersection mark. In an embodiment, the mark is obtained as a natural result of a cube-corner replication process, which results in a fillet between reflective surfaces. A mark such as a fillet scatters light away from the direction of the incident light, resulting in a dark line in the 2D image. The circular edges of the front face of the glass prism also provides two natural marks that appear as elliptical lines that demark the transition from light to dark. Another example of a mark is a circle (annulus) placed near the outer circular edge of the prism front face. Marks on a front face of a glass prism retroreflector, such as circular or straight marks, may be, for example, black chrome-on-glass.

Figure 47:
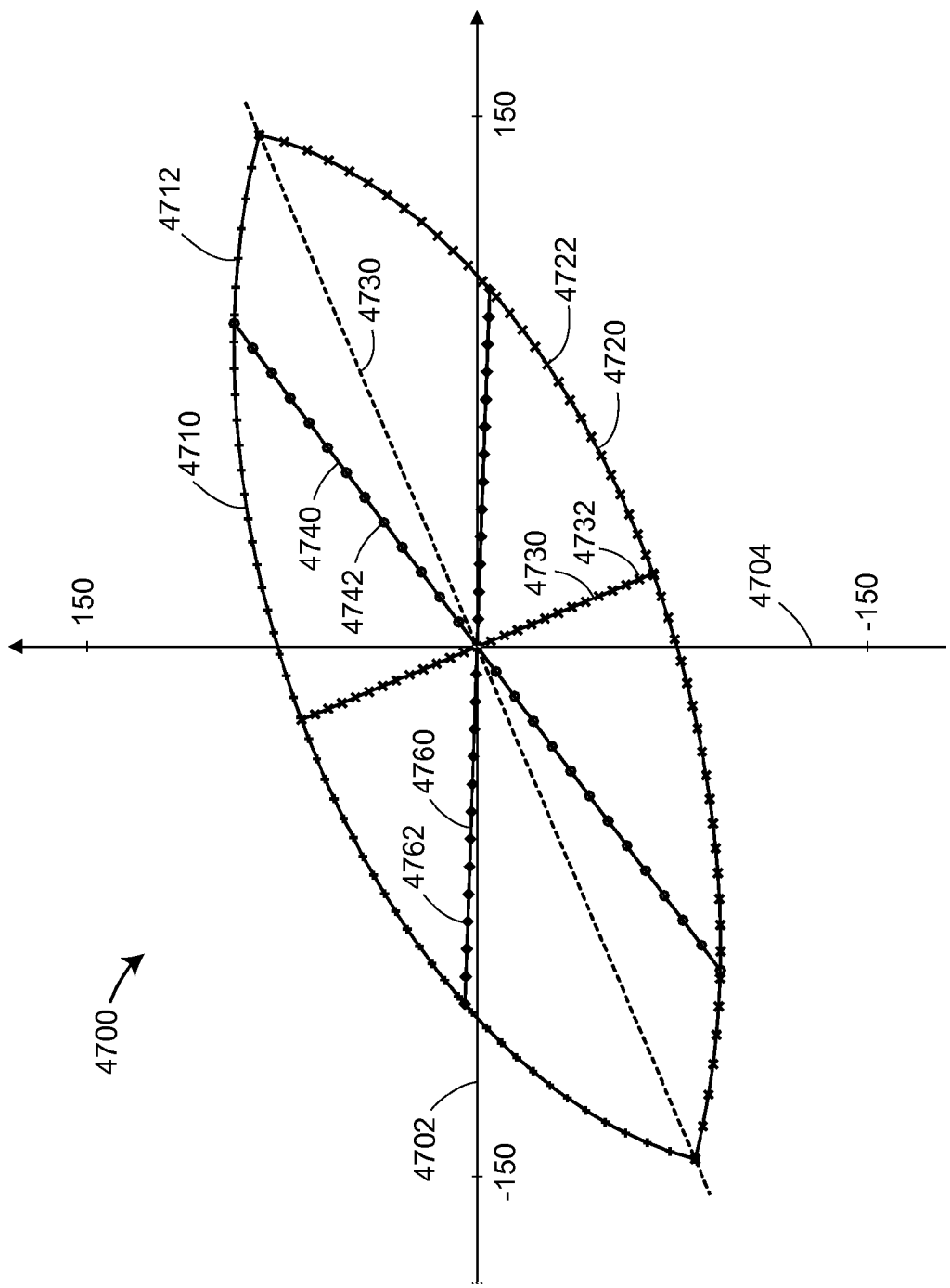
FIG. 47 illustrates a mathematical representation for marks on a retroreflector when projected onto a 2D image, with sample points selected for determining 2D coordinates along the representations.

An example of a 2D image of such marks is shown in FIG. 47. In the example shown in this figure, the roll angle is α=20 degree, the fold angle is β=30 degrees, and the tilt angle is θ=40 degrees. The outer eye pattern includes an upper elliptical line segment 4710 and a lower elliptical line segment 4720. The two elliptical line segments intersect in a fold axis 4730. The imaged marks for the first, second and third intersection lines are 4730, 4740, and 4750, respectively. The x axis of the 2D image array is 4702 and they axis of the 2D image array is 4704. The indicated values of +/−150 on each of the x axis and y axis represent pixel values (+/−150 pixels). The three intersection marks intersect in a common point at the center of the eye. It is understood that in some embodiments, the marks 4730, 4740, and 4750 do not cover the entire length of the intersection lines. In this case, the marks may be extended to cover the whole length as shown here, or the analysis may be done with only with the visible portion of the marks.

In FIG. 47 the marks 4730, 4740, and 4750 are shown intersecting at $(x_0, y_0)=(0, 0)$ on the 2D image. In general, the lines will intersect at a non-zero position on the array and the values for $x_0$ and $y_0$ are left as free parameters to be solved in the computation described herein below. Similarly, the magnification of the camera system will cause the image 4700 to be slightly larger or smaller, and the magnification value m may also be left as a free parameter to be solved. Inclusion of $x_0$, $y_0$, and m in the computation that follows will be clear to one of ordinary skill in the art and is not explicitly included in the calculations discussed herein below.

In an embodiment, a first step is to obtain a display representation of each of the imaged marks in the 2D image. A second step is to calculate, for an assumed value for each of the three orientation angles (and the values for $x_0$, $y_0$, and m), the numeric values for a collection of points along the calculated marks. A third step is to obtain a figure of merit for the three selected orientation angles. This is done by comparing, for each point, the values of the modeled (calculated) mark and imaged mark to determine and a residual error value for each point. These residual errors are combined in the merit function to obtain the figure of merit. The fourth step is to calculate a next guess for the three orientation angles using mathematical methods known in the art. The third step is repeated using the new guess values. The calculation terminates when the residual errors are small enough according to a predetermined criterion or when the calculation is not leading to a small residual error.

The four steps above are now described in more detail. The first step 4810 is to obtain a display representation of each of the imaged marks in the 2D image. In the simplest case, the display representation is simply the 2D image. In an alternative approach, the imaged lines are mathematically processed to improve accuracy of the representation or to speed up later steps in the method described above. As an example of such mathematical processing, consider the transition from light to dark that appears at the outer edges of the front face, which is apparent in the illuminated eye region 2800 of FIG. 28. Two methods known in the art to determine such an edge are the gradient method and Laplacian method. The gradient method uses calculated maximum and minimum values in the first derivative of the image to determine images. Examples of spatial filters that use the gradient method are Roberts, Prewitt, and Sobel filters. The Laplacian method uses zero crossings in the second derivative of the image to determine edges. Many other filters are known in the art and are not described further herein. The edge detection methods described herein above may also be used with dark or light lines.

Many other methods of signal processing may be applied to the 2D image to improve accuracy and speed later steps. In one method, the angles associated with straight lines are determined using a combination of two-dimensional fast Fourier transforms and angle binning. This method is described in U.S. Patent Application No. '973 described hereinabove. An advantage of this method is that it eliminates extraneous noise to selectively extract those image elements that contribute to each of the angles. Other types of filter that may be used, such as low-pass filtering, may be used to smooth lines, which may be helpful in some instances.

To reduce image noise in fitting of line (curved and straight lines) to image lines, one possibility is to perform signal processing to extract characteristics of the lines, fit the lines to the original data (for example, by performing a least-squares fit that minimizes the sum of squared residual errors in a particular line), and then erase all the background light. This approach has the advantage of erasing background noise prior to performing the optimization procedure to obtain the best values for the three orientation angles.

The second step 4820 is to calculate, for an assumed value for each of the three orientation angles (and the values for $x_0$, $y_0$, and m), the 2D numeric values for a collection of points along the modeled (calculated) marks. To perform this step, equations are derived to represent the marks. In an embodiment depicted in FIG. 47, the radius of the front face of the prism is R=12.5 millimeters, the height of the cube corner is h=17.7 mm, the index of refraction of the prism glass is n=1.78, the angle of the roll angle "reference line" has an angle of $a_0$=90 degrees relative to the x axis of the 2D camera array, the magnification of the lens system is m=0.08, and the position of the eye center point is $x_0$=0, $y_0$=0, the pixel width is p=5 micrometer, the roll angle is α=90 degrees, the roll angle is α=20 degrees, the fold angle is β=90 degrees, and the tilt angle is γ=20 degrees. The radius and height are converted to pixel units by multiplying by m/p to obtain, in pixel units, R=200 pixels, h=282.8 pixels. Snell's law is used to calculate the distance from the front-face center to the beam entry point as T=h tan (a sin (sin ($\theta$)/n))=109.5 pixels. The separation parameter, defined as the distance from the distance from the front-face center to the beam entry point as seen from the tracker (camera) point of view, is t=T cos($\theta$)=83.9 pixels. The half-length of the eye is $\theta_L$=sqrt($R^2-T^2$)=267.3 pixels.

To simplify calculations, the two elliptical segments are calculated prior to rotation. The equations for the two unrotated segments as a function of x are y1(x)=t−cos($\theta$) sqrt($R^2-x^2$) and y2(x)=−t+cos($\theta$) sqrt($R^2-x^2$). The slopes of the first intersection line, the second intersection line, and the third intersection line are calculated, respectively, as m1=tan($a_0$+$\alpha$−$\beta$)=5.671, m2=tan($a_0$+$\alpha$+120°−$\beta$)=0.364, m3=tan($a_0$+$\alpha$+240°−$\beta$)=−0.839. They coordinates of the unrotated line segments as a function of x are, respectively, yL1(x)=x m1 cos (8), yL2(x)=x m2 cos(8), yL3(x)=x m3 cos($\theta$). After rotation of the elliptical segments by the fold angle $\beta$, the coordinates of the elliptical segments are calculated parametrically for the x and y coordinates: X1(x)=x cos($\beta$)−y1(x) sin($\beta$), X2(x)=x cos($\beta$)−y2(x) sin($\beta$), Y1(x)=x sin($\beta$)+y1(x) cos($\beta$), Y2(x)=x sin($\beta$)+y2(x) cos($\beta$).

Additional calculations are calculated to determine intersection points for each of the three intersection lines with the elliptical segments. Each line segment between the intersection points are subdivided into multiple sample points as exemplified by reference numbers 4712, 4722, 4742, 4752, 4762 for the upper elliptical segment, the lower elliptical segment, the first intersection line, the second intersection line, and the third intersection line, respectively. Additional modeled lines corresponding to marks placed on the front face may be similarly derived and the sample points along the line derived.

The third step 4830 is to calculate a figure of merit for the three selected orientation angles. This is done by comparing, for each point, the values of the calculated modeled mark and the imaged mark to determine and a residual error value for each point. Starting with one of the collection of sample points obtained from equations as illustrated above, a corresponding point on a mark is obtained. In an embodiment, an equation is obtained for each of the line image representations. In an alternative embodiment, the pixel image elements are used for each of the line image representations. The correspondence between the line representation and the sample points based on the assumed orientation angles may be obtained in a variety of ways. In one method, a line segment is drawn perpendicular from each line that contains a sample point to the representation of the image mark. Other methods of determining a correspondence between points may be used. If an image representation point has 2D values ($x_I$, $y_I$) and the modeled point has 2D values ($x_M$, $y_M$), the residual error for this point is ordinarily taken to be sqrt($(x_I-x_M)^2$+$(y_I-y_M)^2$).

As a part of the third step, the residual errors are combined in a merit function to obtain a figure of merit. A wide variety of merit functions may be used to obtain a figure of merit. A simple figure of merit is obtained as the sum of squared residual errors for each of the sample points. A simple variation of this figure of merit is obtained by weighting different residual errors differently for the different sample points. Ordinarily, a smaller figure of merit is better.

The fourth step 4840 is to calculate a next guess for the three orientation angles using mathematical methods known in the art. Such mathematical methods are usually referred to as optimization procedures. In these procedures, each guess is followed by an evaluation of the resulting figure of merit, and a new guess for each orientation angle obtained. In most cases, the optimization procedure will involve calculations that use a Jacobian matrix and, in some cases, a Hessian matrix. The optimization procedure terminates when termination criteria have been met. Usually the procedure terminates when additional iterations do not produce significant improvement in the figure of merit or when it appears that the iterations are not converging to a proper solution. Optimization methods are well known in the art and are not discussed further herein.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A non-transitory program storage device, readable by a programmable control device and comprising instructions stored thereon to cause the programmable control device to:
   obtain a two-dimensional (2D) image of markings on a retroreflector, the retroreflector being a glass prism having a first face, a second face, a third face, and a fourth face, the first face, the second face, and the third face being mutually perpendicular reflecting surfaces, the fourth face being a front face of the prism, the first surface and second surface intersecting in a first intersection line, the second surface and the third surface intersecting in a second intersection line, the third surface and the first surface intersecting in a third intersection line, the first intersection line having a straight first intersection mark, the second intersection line having a straight second intersection mark, the third intersection line having a straight third intersection mark, the front face having a first surface mark;
   determine a 2D mathematical representation of the markings on the retroreflector based at least in part on guess values for each of three orientation angles of the retroreflector;
   extract a first collection of 2D coordinates from the 2D mathematical representation and a corresponding second collection of 2D coordinates from the 2D image of markings;
   determine a figure of merit based at least in part on the first collection of 2D coordinates and the corresponding second collection of 2D coordinates; and
   adjust the guess values for the three orientation angles to improve the figure of merit.

2. The non-transitory program storage device of claim 1 wherein the first surface mark is an elliptical line segment.

3. The non-transitory program storage device of claim 1 wherein the first surface mark is a straight line.

4. The non-transitory program storage device of claim 1 wherein the 2D mathematical representation is a mathematical projection of the retroreflector markings in three dimensions onto an image plane in two dimensions.

5. The non-transitory program storage device of claim 1 wherein the first collection of 2D coordinates is obtained for points equally spaced along the 2D mathematical representation of the markings.

6. The non-transitory program storage device of claim 1 wherein the instructions applies image processing to the 2D image of markings before determining the corresponding second collection of 2D coordinates.

7. The non-transitory program storage device of claim 6 wherein the image processing includes spatial filtering.

8. The non-transitory program storage device of claim 7 wherein the image processing includes a filter operation selected from the group consisting of: Laplacian filter, gradient filter, and Fourier transform filter.

9. The non-transitory program storage device of claim 7 wherein the image processing further includes removing background patterns not extracted by the image processing.

10. The non-transitory program storage device of claim 6 wherein each of the second collection of 2D coordinates are selected to minimize the distance to a corresponding 2D coordinate of the first collection of 2D coordinates.

11. The non-transitory program storage device of claim 1 wherein the figure of merit is based at least in part on a sum of squared residual errors terms.

12. The non-transitory program storage device of claim 1 wherein the guess values for the three orientation angles are based at least in part on a Jacobian matrix.

13. A method for determining three orientational degrees of freedom of a retroreflector comprising:
   obtaining a two-dimensional (2D) image of markings on the retroreflector, the retroreflector being a glass prism having a first face, a second face, a third face, and a fourth face, the first face, the second face, and the third face being mutually perpendicular reflecting surfaces, the fourth face being a front face of the prism, the first surface and second surface intersecting in a first intersection line, the second surface and the third surface intersecting in a second intersection line, the third surface and the first surface intersecting in a third intersection line, the first intersection line having a straight first intersection mark, the second intersection line having a straight second intersection mark, the third intersection line having a straight third intersection mark, the front face having a first surface mark;
   determining a 2D mathematical representation of the markings on the retroreflector based at least in part on guess values for each of three orientation angles of the retroreflector;
   extracting a first collection of 2D coordinates from the 2D mathematical representation and a corresponding second collection of 2D coordinates from the 2D image of markings;
   determining a figure of merit based at least in part on the first 2D coordinates and the corresponding second 2D coordinates;
   adjusting the guess values for the three orientation angles to improve the figure of merit; and
   storing the three orientation angles.

14. A device for measuring three orientational degrees of freedom of a retroreflector comprising:
   a memory;
   an image sensor;
   a light source configured to emit a light to illuminate the retroreflector;
   a display communicatively coupled to the memory; and
   a programmable control device communicatively coupled to the memory, display, and image sensor, wherein the memory includes instructions for causing the programmable control device to perform the method of claim 13.

* * * * *